US012671591B2

(12) United States Patent
Sheehan

(10) Patent No.: US 12,671,591 B2
(45) Date of Patent: Jun. 30, 2026

(54) DISTRIBUTED AND ANONYMIZED TICKET EXCHANGE PLATFORM

(71) Applicant: C3N Technologies, Inc., Macon, GA (US)

(72) Inventor: Alexander Brantley Sheehan, Rockledge, FL (US)

(73) Assignee: C3N Technologies, Inc., Macon, GA (US)

( * ) Notice: Subject to any disclaimer, the term of this patent is extended or adjusted under 35 U.S.C. 154(b) by 0 days.

(21) Appl. No.: 18/869,196

(22) PCT Filed: May 25, 2023

(86) PCT No.: PCT/US2023/023580
§ 371 (c)(1),
(2) Date: Nov. 25, 2024

(87) PCT Pub. No.: WO2023/230265
PCT Pub. Date: Nov. 30, 2023

(65) Prior Publication Data
US 2025/0348872 A1     Nov. 13, 2025

Related U.S. Application Data

(60) Provisional application No. 63/345,785, filed on May 25, 2022.

(51) Int. Cl.
H04L 9/32          (2006.01)
G06F 21/62          (2013.01)
(Continued)

(52) U.S. Cl.
CPC ........ H04L 9/3239 (2013.01); G06F 21/6254 (2013.01); G06Q 20/389 (2013.01);
(Continued)

(58) Field of Classification Search
None
See application file for complete search history.

(56) References Cited

U.S. PATENT DOCUMENTS 10,903,980 B2 * 1/2021 Peterson ............... H04L 9/3239
10,931,461 B2 * 2/2021 Dilles ..................... G06F 21/33
(Continued)

FOREIGN PATENT DOCUMENTS

CA          3153499 A1 * 3/2021 ......... H04L 63/1466
CN     115699000 A * 2/2023 ........... H04L 9/3239
(Continued)

OTHER PUBLICATIONS

Google Patents English Language Translation of CN-115699000-A. https://patents.google.com/patent/CN115699000A/en?oq=CN-115699000-A (Year: 2023).*
(Continued)

*Primary Examiner* — Ayal I. Sharon
(74) *Attorney, Agent, or Firm* — Eversheds-Sutherland (US) LLP

(57) ABSTRACT

Techniques for a distributed and anonymized ticket exchange platform that may involve verifying a prospective member's identity using person identifiable information (PII), such as a driver's license, passport information, etc., upon registration. The prospective member's identity is validating using a variety of techniques, such as by contacting references and receiving confirmations that the prospective member is indeed genuine. A new account is created for the prospective member and an anonymized version of the PII is associated with the account.

12 Claims, 81 Drawing Sheets

(51) Int. Cl.

| | |
|---|---|
| *G06Q 10/02* | (2012.01) |
| *G06Q 20/06* | (2012.01) |
| *G06Q 20/38* | (2012.01) |
| *H04L 9/00* | (2022.01) |
| *H04L 9/40* | (2022.01) |

(52) U.S. Cl.
CPC .............. *H04L 9/3236* (2013.01); *H04L 9/40* (2022.05); *H04L 9/50* (2022.05); *H04L 63/0421* (2013.01); *H04L 63/10* (2013.01); *G06Q 10/027* (2025.08); *G06Q 20/065* (2013.01); *G06Q 2220/00* (2013.01); *H04L 2209/42* (2013.01); *H04L 2209/56* (2013.01)

(56) References Cited

U.S. PATENT DOCUMENTS

| | | | | |
|---|---|---|---|---|
| 11,496,446 | B1* | 11/2022 | Angara | ................. G06F 16/955 |
| 12,093,928 | B2* | 9/2024 | Kahn | ...................... G06Q 40/04 |
| 12,223,070 | B2* | 2/2025 | Adams | ................ G06F 21/6209 |
| 2013/0133048 | A1 | 5/2013 | Wyn-Harris | |
| 2017/0046689 | A1 | 2/2017 | Lohe et al. | |
| 2017/0085545 | A1 | 3/2017 | Lohe et al. | |
| 2017/0085562 | A1 | 3/2017 | Schultz et al. | |
| 2017/0109735 | A1 | 4/2017 | Sheng et al. | |
| 2018/0025334 | A1 | 1/2018 | Pourfallah et al. | |
| 2019/0109706 | A1* | 4/2019 | Peterson | ............... H04L 9/0825 |
| 2020/0374129 | A1* | 11/2020 | Dilles | ................... H04L 9/3273 |
| 2021/0064780 | A1* | 3/2021 | Riedel | ............... G06Q 20/3829 |
| 2021/0065267 | A1* | 3/2021 | Smith | ............... G06Q 20/4014 |
| 2021/0304200 | A1* | 9/2021 | Doney | .................. H04L 9/0825 |
| 2022/0237308 | A1* | 7/2022 | Caplovitz | .............. G06Q 20/36 |
| 2022/0358576 | A1* | 11/2022 | Diesch | .................. H04L 63/123 |
| 2022/0385477 | A1* | 12/2022 | Kravitz | ................. H04L 9/3247 |
| 2022/0391901 | A1* | 12/2022 | Park | .................... H04L 63/0823 |
| 2023/0086191 | A1* | 3/2023 | Jakobsson | ............. H04L 9/3231 |
| | | | | 705/66 |
| 2023/0281604 | A1* | 9/2023 | Robell | ................. G06Q 30/018 |
| 2023/0360042 | A1* | 11/2023 | Doney | ................. G06Q 20/065 |

| | | | | |
|---|---|---|---|---|
| 2024/0177145 | A1* | 5/2024 | Miele | ..................... G06Q 30/01 |
| 2024/0214194 | A1* | 6/2024 | Kapur | ..................... H04L 9/088 |
| 2024/0386118 | A1* | 11/2024 | Adams | ............... G06F 21/6209 |
| 2024/0412866 | A1* | 12/2024 | Wen | ........................ G16H 40/67 |

FOREIGN PATENT DOCUMENTS

| | | | | | |
|---|---|---|---|---|---|
| KR | 20250022766 | A | * | 2/2025 | ............. G06Q 50/16 |
| WO | WO-2019083517 | A1 | * | 5/2019 | ........... H04L 9/3213 |
| WO | WO-2020051365 | A1 | * | 3/2020 | ........... H04L 9/3273 |

OTHER PUBLICATIONS

Yang J, et al. "Proof-of-Familiarity: A Privacy-Preserved Blockchain Scheme for Collaborative Medical Decision-Making". Applied Sciences. 2019; 9(7):1370. https://doi.org/10.3390/app9071370 (Year: 2019).*

Preece, Joseph David. (2020). "Ticket to ride: an investigation into the use of blockchain technology in the rail industry". University of Birmingham. Ph.D. https://etheses.bham.ac.uk/id/eprint/12095/ (Year: 2020).*

Sha, Shi-Cho et al. "A Blockchain-Based Privacy Preserving Ticketing Service". Published in: 2018 IEEE 7th Global Conference on Consumer Electronics (GCCE). Oct. 9-12, 2018. https://ieeexplore. ieee.org/document/8574479 (Year: 2018).*

Al-Zaben, Nasr et al. "General Data Protection Regulation Complied Blockchain Architecture for PII Management". Published in: 2018 International Conference on Computing, Electronics & Communications Engineering (iCCECE). Aug. 16-17, 2018. https:// ieeexplore.ieee.org/abstract/document/8658586 (Year: 2018).*

Niya, Sina Rafati et al. "DeTi: A Decentralized Ticketing Management Platform". Journal of Network and Systems Management (2022) 30: 62. https://doi.org/10.1007/s10922-022-09675-3 (Year: 2022).*

Google Patents English Language Translation of KR-20250022766-A. https://patents.google.com/patent/KR20250022766A/en?oq=KR-20250022766-A (Year: 2025).*

PCT International Search Report and Written Opinion for PCT/ US2023/023580, mailed Aug. 31, 2023 (8 pages).

* cited by examiner

Cross Cutting Concerns

| IT Governance: Ecosystem Consensus, Quality Control, Resource mgt, Project mgt |
| Security: Identify, Project, Detect, Respond, Recover |
| Infrastructure: Cloud, Grid, Desktop |
| Infrastructure: Build Pipeline, Software Distribution |
| Distributed Storage |
| Distributed Ledger |
| Observability |
| Messaging |

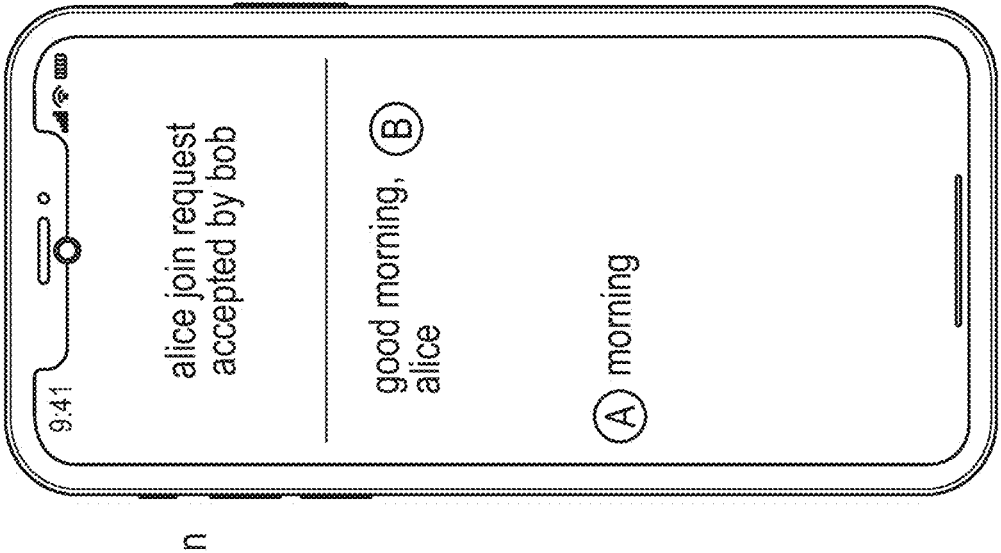
1. Alice Clicks on Bob's Group to Join
2. Alice waits Until Bob Accepts her Request
3. Alice Reads Bob's Message and Responds
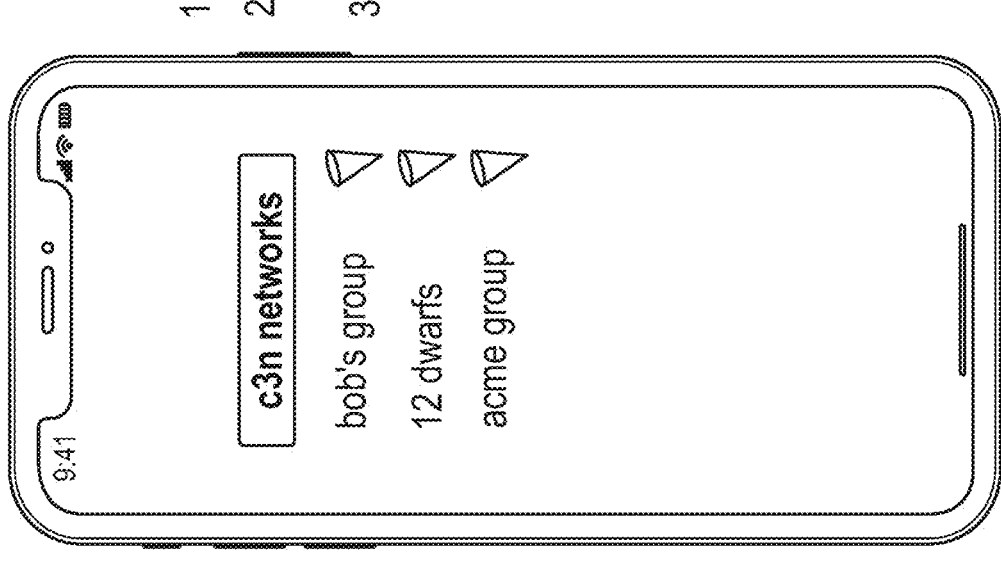
FIG. 19

9:41

Ⓐ    Ⓑ

Join    bob's group

Proof requested
send drivers license?

Yes    No

9:41

Ⓒ    Ⓓ

Join    bob's group

Proof requested
send drivers license?

Yes    No more proof requested

Take self photo and send?

Yes    No alice

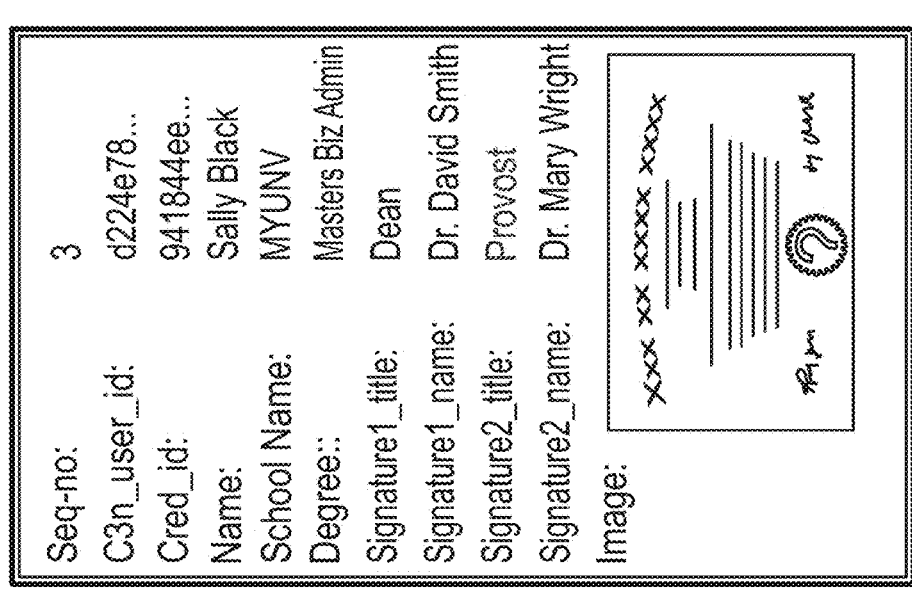

Seq-no:              3
C3n_user_id:         d224e78...
Cred_id:             941844ee...
Name:                Sally Black
School Name:         MYUNV
Degree::             Masters Biz Admin
Signature1_title:    Dean
Signature1_name:     Dr. David Smith
Signature2_title:    Provost
Signature2_name:     Dr. Mary Wright
Image:

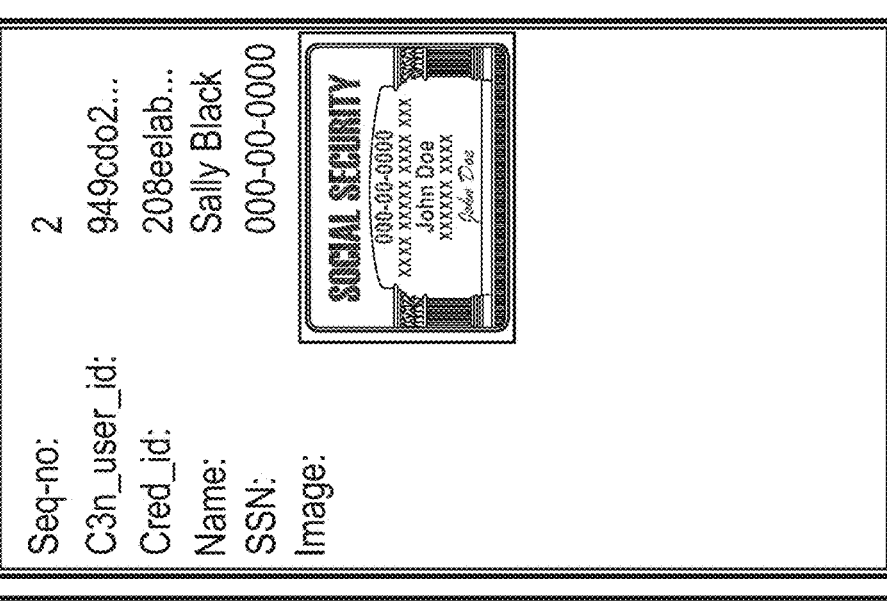

Seq-no:              2
C3n_user_id:         949cdo2...
Cred_id:             208eelab...
Name:                Sally Black
SSN:                 000-00-0000
Image:

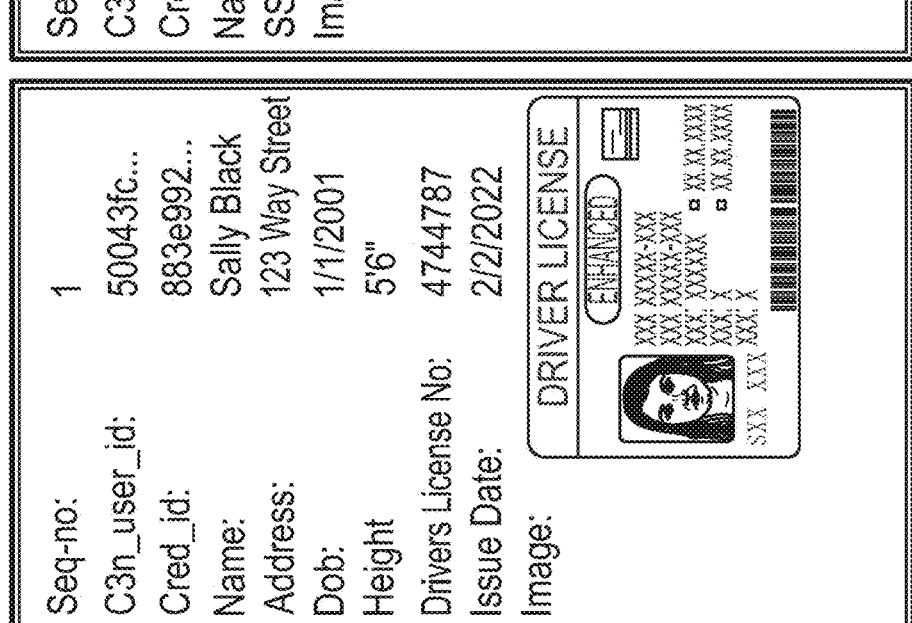

Seq-no:              1
C3n_user_id:         50043fc...
Cred_id:             883e992...
Name:                Sally Black
Address:             123 Way Street
Dob:                 1/1/2001
Height:              5'6"
Drivers License No:  4744787
Issue Date:          2/2/2022
Image:

FIG. 25

| | |
|---|---|
| Seq_no: | 3 |
| Cred_id: | QYNTUxOQ |
| Name: | Sally black |
| School name: | MYUNV |
| Degree: | Masters biz admin |
| Signature1_title: | Dean |
| Signature1_name: | Dr. David smith |
| Signature2_title: | Provost |
| Signature2_name: | Dr. Mary wright |
| Image: | | c3n_user_id:        e2403fc2...
name:               sally black
email:              Sallyb@c3n.eco
pwd_hash:           8882beef...
created_at:         1/1/2024
hash:               b399ee23
valid_until:        1/1/2030    ⑫

FIG. 30

Bob's Email

From:     alice@c3n.eco

Subject:     Nostrud Exercitaullamco

Ut enim ad miveniam,
quis nostrud exercitaullamco

▨    attachment.zip

[ Reply ]    [ Cancel ]

FIG. 37

← →   ③    Jewel Emails   [Config] [New] ①

| Name | Email | |
|------|-------|--|
| citibank | *@citibank.com | [Details] |
| PNC Bank | *@pnc.com | [Details] |
| Wells Fargo | therealme@c3n.eco | [Details] |

FIG. 38

PARTIES

| Id | Description |
|----|-------------|
| VendorE9 | Camdybar co. |
| UserB2 | Hungry User |

ASSETs

| Id | Owner, | Description |
|----|--------|-------------|
| A23F | VendorE9 | Snickers Bar |
| 934A | UserB2 | $1 |

RULES

| Id | Description |
|----|-------------|
| 7349 | Vending-logic-99 |

FIG. 46

PARTIES

| Id | Owner | Description |
|----|-------|-------------|
| 9471 | UserD3 | Car Seller |
| 1198 | UserE9 | Car Buyer |
| 2177 | UserA6 | Validator |

ASSETs

| Id | Owner, | Description |
|----|--------|-------------|
| 0035 | UserD3 | Car Deed for civic |
| 8825 | UserE9 | $2500 |

RULES

| Id | Description |
|----|-------------|
| 8482 | Car-Sale-84 |

FIG. 47

Distributed Grid

Fedora 201

$49.99

⑩

☆☆☆☆☆　1150

Ⓣ　③

| Sla Tx History | min ⟶ max | ⬭ |
| Citizenship: | min ⟶ max | ⬭ |
| Manager: | min ⟶ max | ⬭ |
| Stars: | min ⟶ max | ⬭ |
| Followed | min ⟶ max | ⬭ | ⑯ |
| Recommendations: | min ⟶ max | ⬭ |
| Certifications: | min ⟶ max | ⬭ |
| Test Scores: | min ⟶ max | ⬭ |
| C3N Score: 2.43 | | ⑱ |

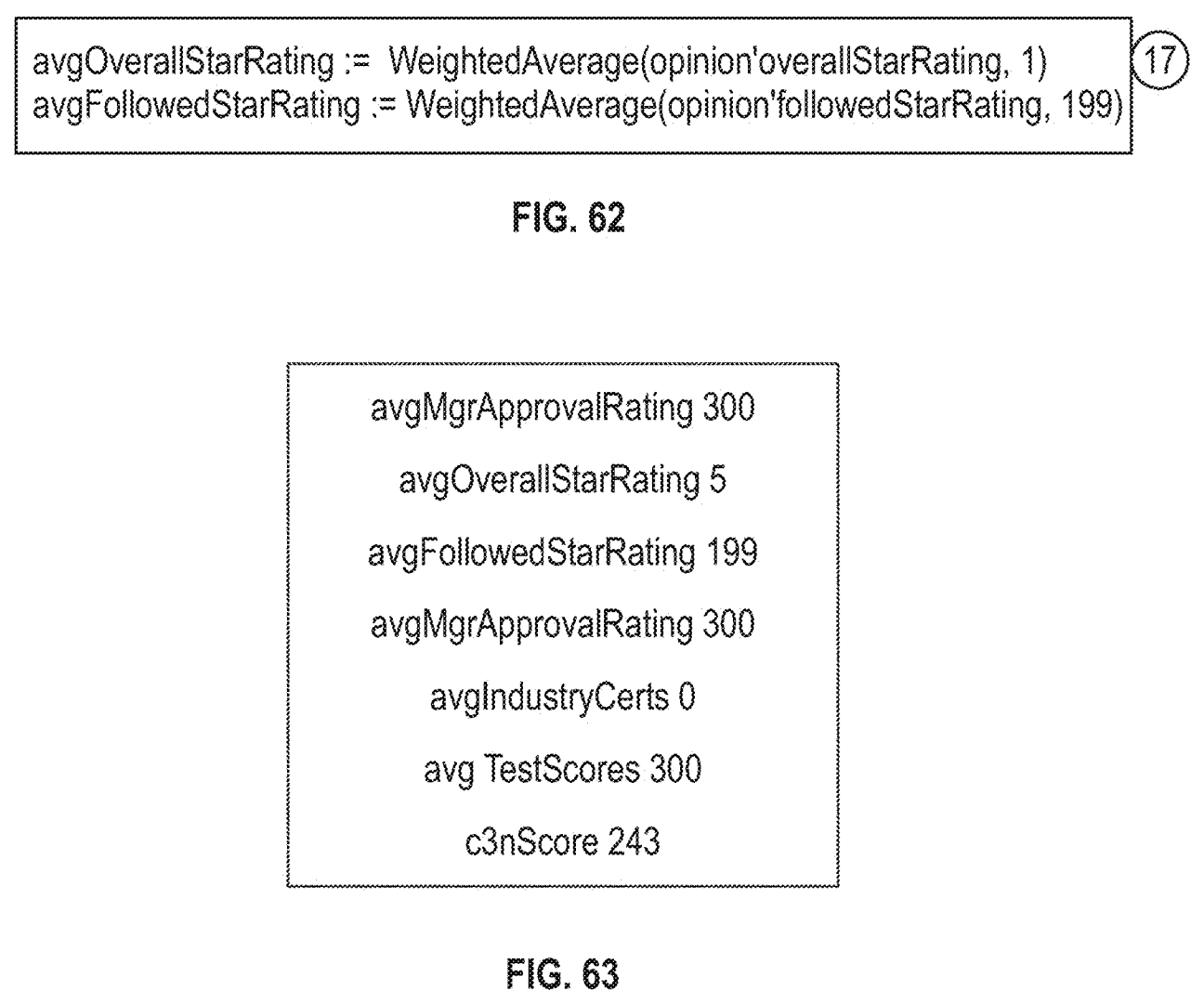

⑰ avgOverallStarRating := WeightedAverage(opinion'overallStarRating, 1)
avgFollowedStarRating := WeightedAverage(opinion'followedStarRating, 199))

FIG. 62 avgMgrApprovalRating 300 avgOverallStarRating 5 avgFollowedStarRating 199 avgMgrApprovalRating 300 avgIndustryCerts 0 avg TestScores 300 c3nScore 243

FIG. 63

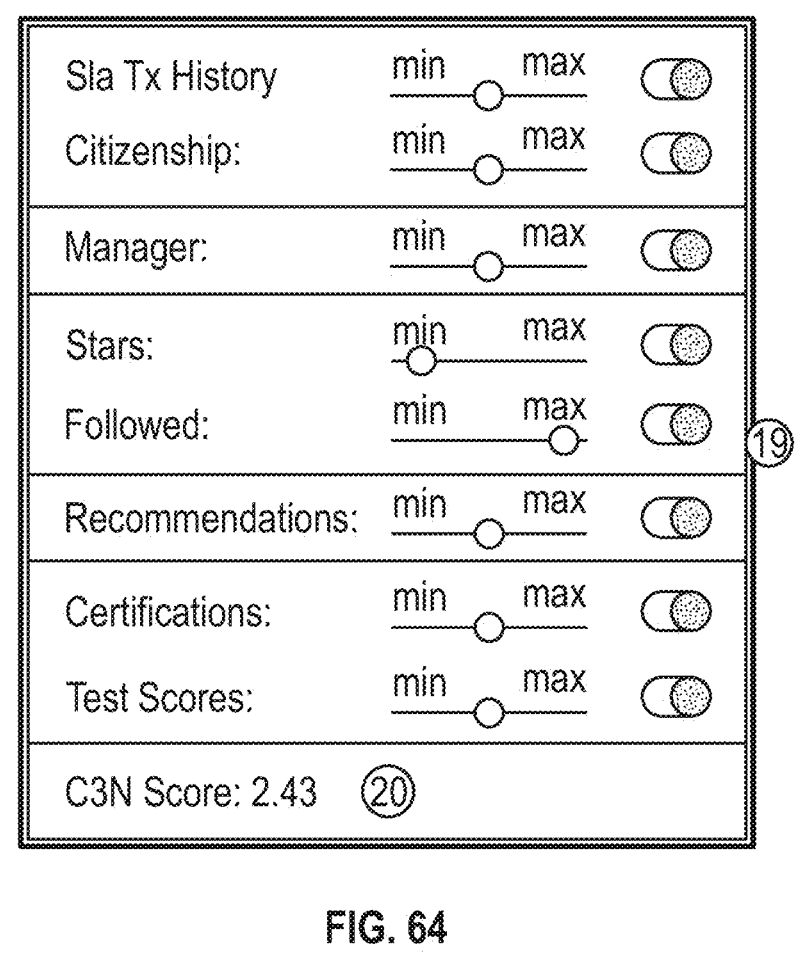

Sla Tx History    min   max

Citizenship:    min   max

Manager:    min   max

Stars:    min   max

Followed:    min   max   19

Recommendations:    min   max

Certifications:    min   max

Test Scores:    min   max

C3N Score: 2.43   20

FIG. 64

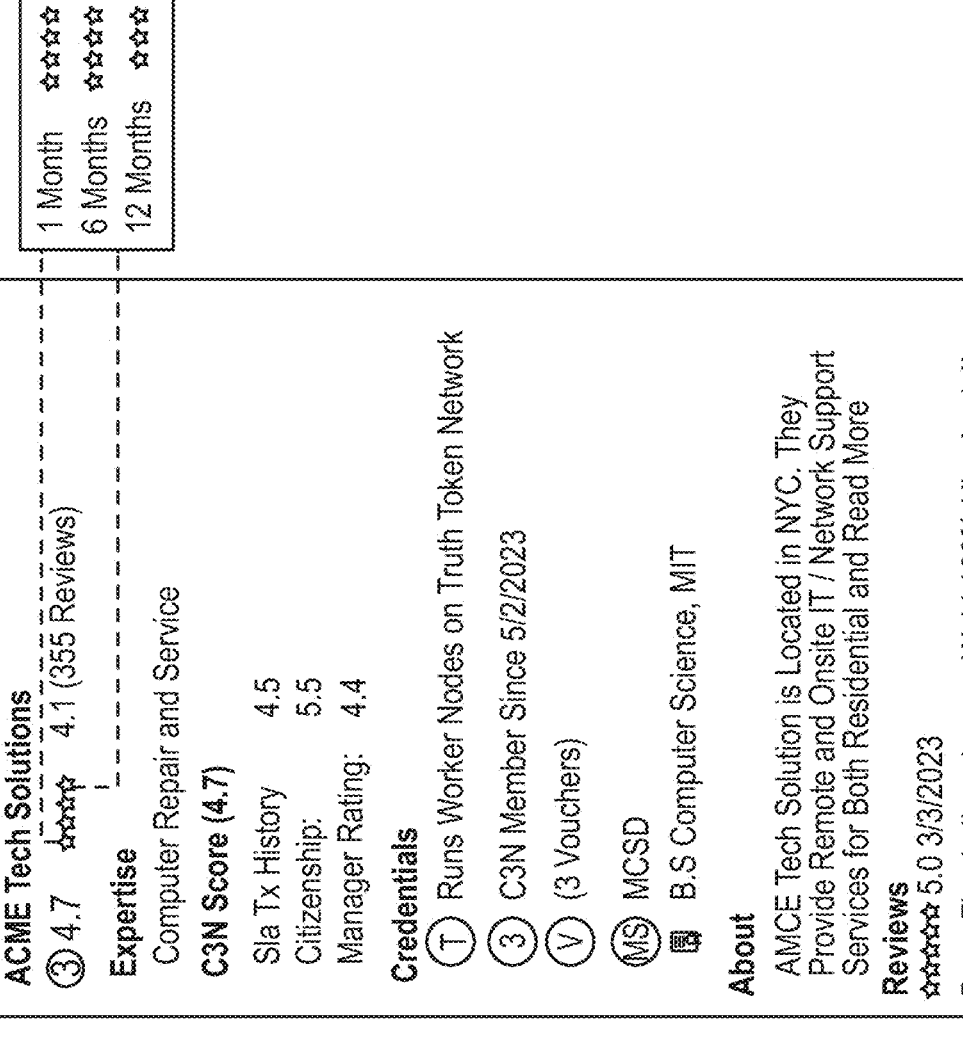

1 Month   ☆☆☆☆
6 Months   ☆☆☆☆
12 Months   ☆☆☆

ACME Tech Solutions

Ⓐ 4.7   ☆☆☆☆   4.1 (355 Reviews)

Expertise
Computer Repair and Service

C3N Score (4.7)

Sla Tx History   4.5
Citizenship:   5.5
Manager Rating:   4.4

Credentials

Ⓣ Runs Worker Nodes on Truth Token Network

③ C3N Member Since 5/2/2023

Ⓥ (3 Vouchers)

Ⓜ MCSD

🎓 B.S Computer Science, MIT

About

AMCE Tech Solution is Located in NYC. They Provide Remote and Onsite IT / Network Support Services for Both Residential and Read More

Reviews

☆☆☆☆☆ 5.0 3/3/2023
Barry Fixed all my Issues. Wold 100% Hire Again!!
☆☆☆☆ 4.0 3/3/2023
Was Initially Skeptical, But Barry Fixed my Connectivity Problems. Was Professional, But Expensive.

---

ACME Tech Solutions
Vouched for the Following

Ⓥ NVIDIA

Great Place to Work
Cool Technology With a Great CEO and New Headquarters.
Paid Consulting Bills on Time.

Ⓥ Alberta Motor Association

I Have Been a Reseller of Hosting Through Blumenthals.com for a Number of Years and Have Appreciated AAA'S Helpful Advice on Web Hosting Issues as Well as Blumenthals.com's Reliable Service Ⓥ Mke's Marketing

Mike has got to be One of the Savviest Guys in Local Search Marketing. He Spots Problems with Local and does Industy-Leading Research on what it Takes to Rank in Local. Definitely a go-to Guy for Online Marketing Services.

FIG. 66

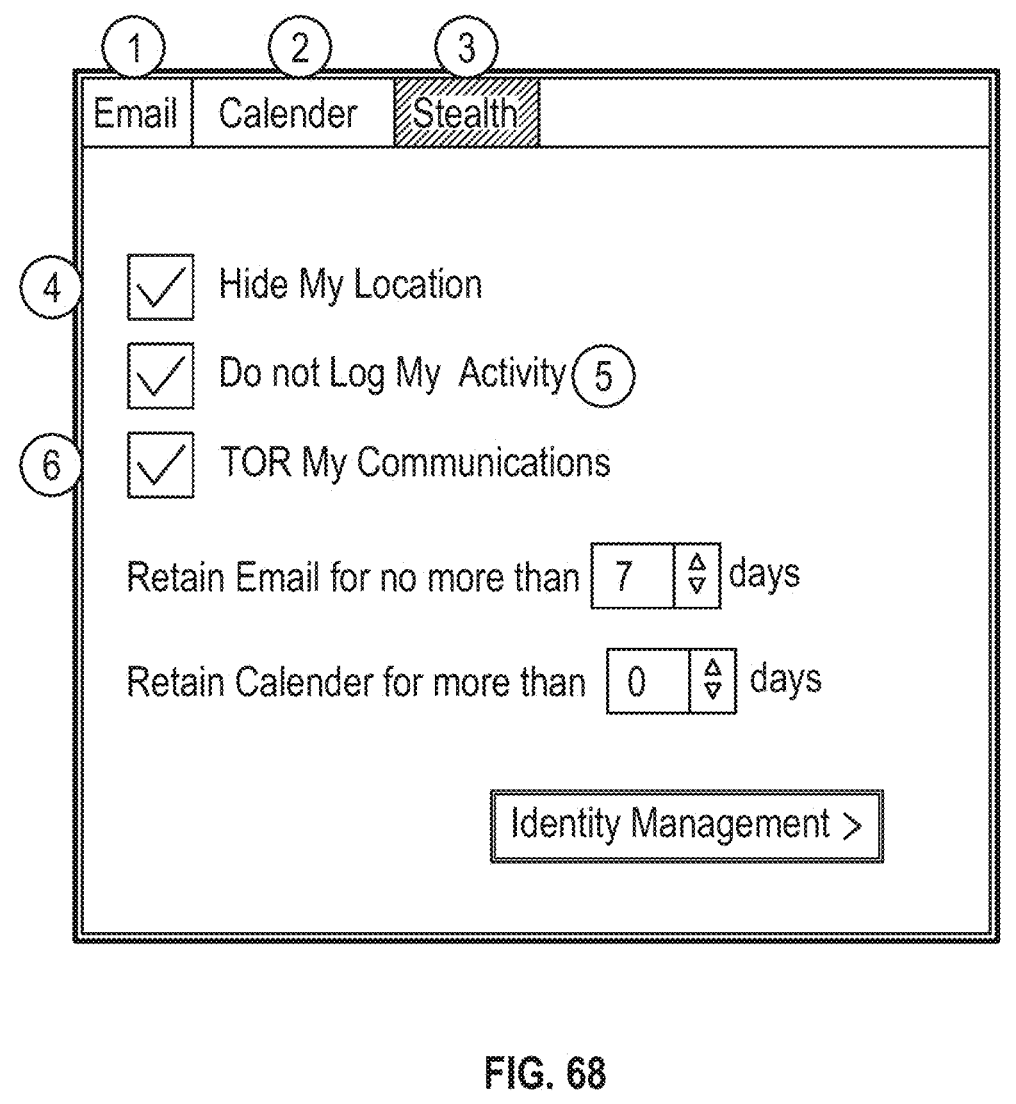

| Email | Calender | Stealth |

④ ☑ Hide My Location

☑ Do not Log My Activity ⑤

⑥ ☑ TOR My Communications

Retain Email for no more than [ 7 ▲▼ ] days

Retain Calender for more than [ 0 ▲▼ ] days

[ Identity Management > ]

FIG. 68

Cross Cutting Concerns

| |
|---|
| IT Governance: Ecosystem Consensus, Quality Control, Resource mgt, Project mgt |
| Security: Identify, Project, Detect, Respond, Recover |
| Infrastructure: Cloud, Grid, Desktop |
| Infrastructure: Build Pipeline, Software Distribution |
| Distributed Storage |
| Distributed Ledger |
| Observability |
| Messaging |

DISTRIBUTED AND ANONYMIZED TICKET EXCHANGE PLATFORM

CROSS REFERENCE TO RELATED APPLICATION(S)

This application claims the priority benefit of PCT/US2023/023580, filed on May 25, 2023, which claims priority to U.S. Provisional Patent Application No. 63/345,785 filed May 25, 2022, entitled "C3N-BASED SYSTEMS, NETWORKS, AND ECOSYSTEMS".

The present application is related to concurrently filed PCT patent application PCT/US2023/023573, filed May 25, 2023, entitled "IDENTITY SERVICE AND BLOCK-CHAIN"; concurrently filed PCT patent application PCT/US2023/023575, filed May 25, 2023, entitled "FAST SMART CONTRACT PROCESSING AND VALIDATION"; concurrently filed PCT patent application PCT/US2023/023576, filed May 25, 2023, entitled "DISTRIBUTED PEER-TO-PEER AND CLOUD INFRASTRUCTURE"; concurrently filed PCT patent application PCT/US2023/023588, filed May 25, 2023, entitled "TECHNIQUES FOR ANONYMISING USER ACTIVITY".

All of the applications listed above are hereby incorporated herein by reference in their entireties.

TECHNICAL FIELD

Techniques described herein relate to a distributed and anonymized ticket exchange platform.

BACKGROUND

There are many shortcoming with existing ticket exchange platforms. In addition to the perceived high cost of tickets, here has been widespread criticism for ticket scalping and the practice of bots quickly buying up tickets, leaving would-be legitimate purchasers with limited availability or no tickets at all. This can be particularly frustrating for popular events or concerts, where tickets can sell out very quickly. This can cause frustration to both the sellers (e.g., music artists) and buyers (e.g., fans).

BRIEF DESCRIPTION OF THE DRAWINGS

FIG. 19 depicts establishing a connection with a C3N network to facilitate wireless group chat capabilities, according to at least one embodiment of the present disclosure.

FIG. 25 depicts examples of credential data and associated images found in the body of a blockchain block, according to at least one embodiment of the present disclosure.

FIG. 30 depicts C3N user registration, according to at least one embodiment of the present disclosure.

FIG. 37 depicts an encrypted attachment in C3N email, according to at least one embodiment of the present disclosure.

FIG. 38 depicts a graphical interface for configuring email jewels, according to at least one embodiment of the present disclosure.

FIG. 46 depicts parties, assets, and rules in connection with a hypothetical C3N smart contract, in relation to the vending machine example, according to at least one embodiment of the present disclosure.

FIG. 47 depicts parties, assets, and rules in connection with a hypothetical C3N smart contract, in relation to the car sale and title transfer example, according to at least one embodiment of the present disclosure.

FIG. 62 depicts code changes may be implemented that can be implemented to change how ratings are determined, according to at least one embodiment of the present disclosure.

FIG. 63 depicts the results of code change to change ratings, according to at least one embodiment of the present disclosure.

FIG. 64 depicts an example showing how a user can use a combination of on/off toggles and sliders to impact the C3N score, according to at least one embodiment of the present disclosure.

FIG. 66 depicts C3N products and services ratings, according to at least one embodiment of the present disclosure.

FIG. 68 depicts stealth configurations for C3N personal accounts. C3N personal accounts come with an email (1) and calendar (2) apps, according to at least one embodiment of the present disclosure.

Figure 1:
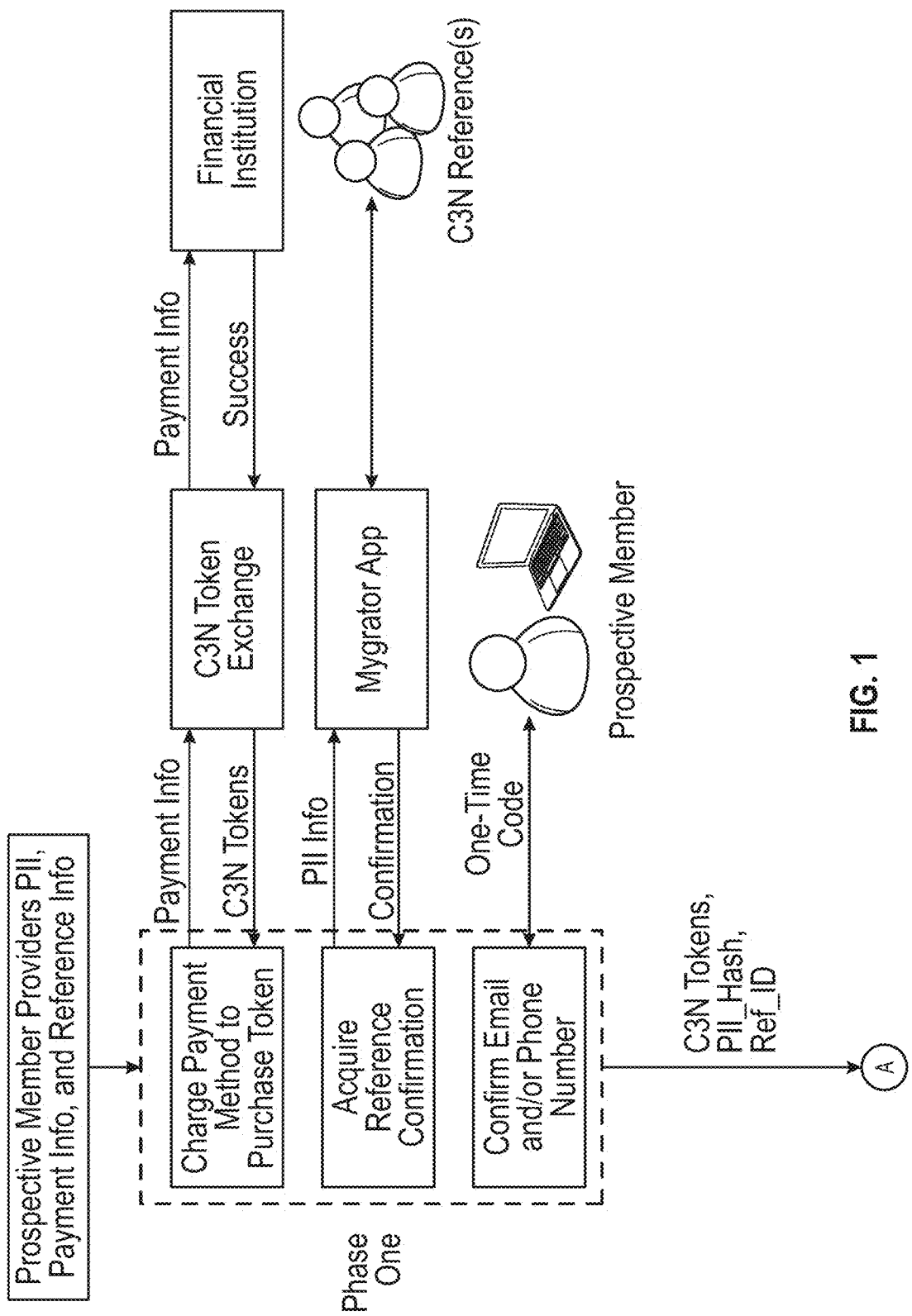
FIG. 1 illustrates an example computing environment in which a distributed and anonymized ticket exchange platform may be implemented, according to at least one embodiment of the present disclosure.
Figure 1:
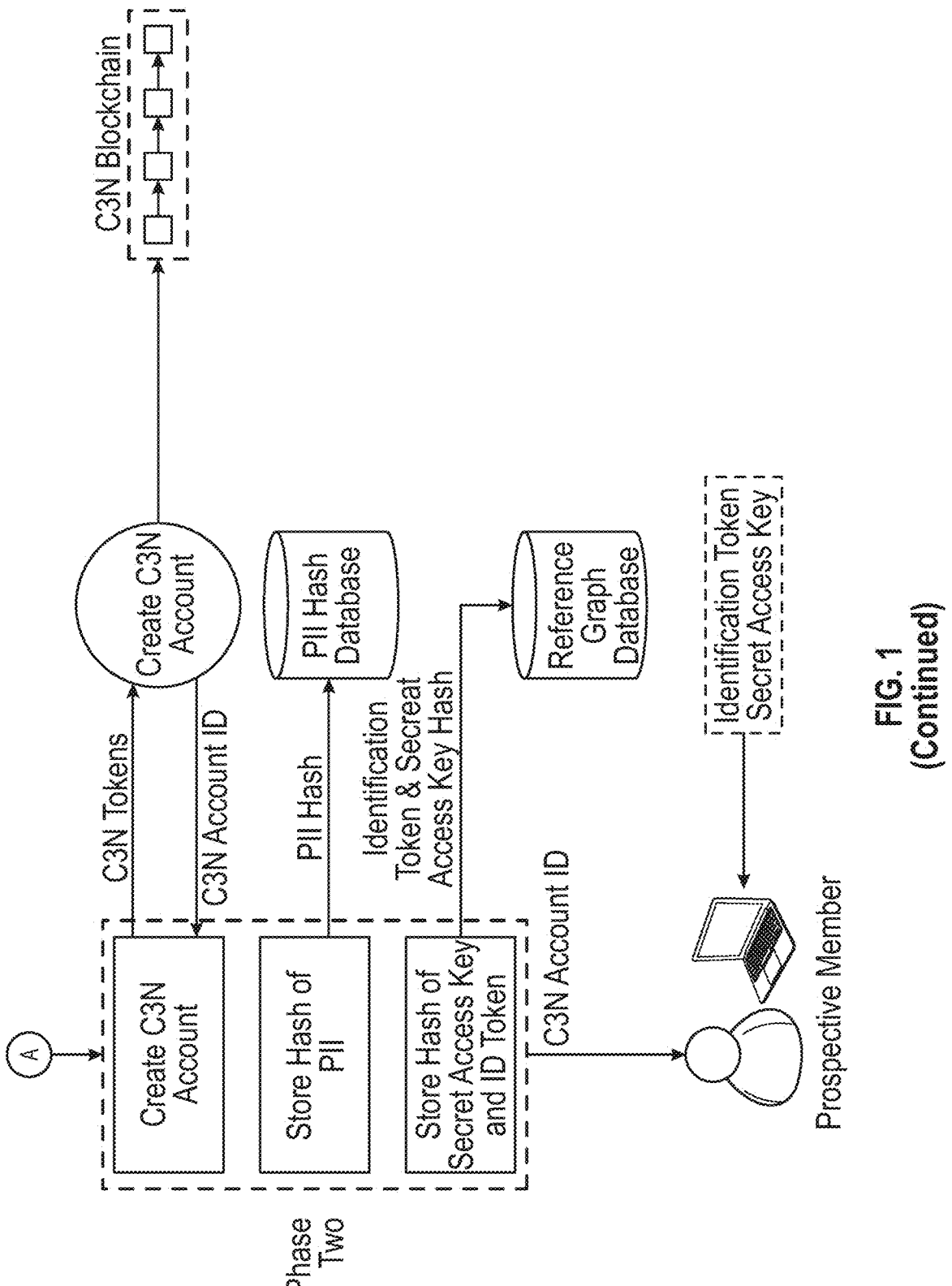

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Techniques for a distributed and anonymized ticket exchange platform that may involve verifying a prospective member's identity using person identifiable information (PII), such as a driver's license, passport information, etc., upon registration. The prospective member's identity is validating using a variety of techniques, such as by contacting references and receiving confirmations that the prospective member is indeed genuine. A new account is created for the prospective member and an anonymized version of the PII is associated with the account.

According to one or more embodiments, a method described herein, comprises: determining, by one or more processors of a computer system, a blockchain registration request for a prospective member to join a blockchain network, comprising person identifiable information (PII), payment information, and reference information; providing by the one or more processors of the system, the payment information to a token exchange; obtaining, by the one or more processors of the system, control of tokens that can be used on the blockchain network; determining, by the one or more processors of the system and from the reference information, one or more references and corresponding reference contact informations; providing, by the one or more processors of the system, reference requests for the one or more references to vouch for the prospective member via the reference contact informations; obtaining, by the one or more processors of the system, one or more confirmations from the one or more references for the prospective member; confirming, by the one or more processors of the system, contact information with the prospective member; determining, by the one or more processors of the system and using a one-way function, a PII hash of the PII; creating, by the one or more processors of the system, a blockchain account for the prospective member, wherein the tokens are deposited to the blockchain account, wherein the prospective member is in possession of a secret access key that is usable to control the blockchain account; and activating, by the one or more processors of the system, a smart contract of the blockchain network to transfer at least a portion of the tokens to another member in exchange for a non-fungible token that represents a ticket.

In various embodiments, a method is described herein above and/or below, wherein a video call or video interview is conducted to obtain the PII.

In various embodiments, a method is described herein above and/or below, wherein the PII is stored in memory and discarded after the PII hash is determined.

In various embodiments, a method is described herein above and/or below, wherein an identification token and a hash of the secret access key are stored in a reference graph database.

In various embodiments, a method is described herein above and/or below, wherein an initial trust score is calculated for the prospective member based at least in part on the token and trust of the one or more references.

According to one or more embodiments, a system described herein comprises: one or more processors; and memory storing executable instructions that, as a result of execution, cause the system to: determine a blockchain registration request for a prospective member to join a blockchain network, comprising person identifiable information (PII), payment information, and reference information; provide the payment information to a token exchange; obtain control of tokens that can be used on the blockchain network; determine, and from the reference information, one or more references and corresponding reference contact informations; provide reference requests for the one or more references to vouch for the prospective member via the reference contact informations; obtain one or more confirmations from the one or more references for the prospective member; confirm contact information with the prospective member; determine, using a one-way function, a PII hash of the PII; create a blockchain account for the prospective member, wherein the tokens are deposited to the blockchain account, wherein the prospective member is in possession of a secret access key that is usable to control the blockchain account; and activate a smart contract of the blockchain network to transfer at least a portion of the tokens to another member in exchange for a non-fungible token that represents a ticket.

In various embodiments, a system is described herein above and/or below, wherein a video call or video interview is conducted to obtain the PII.

In various embodiments, a system is described herein above and/or below, wherein the PII is stored in memory and discarded after the PII hash is determined.

In various embodiments, a system is described herein above and/or below, wherein an identification token and a hash of the secret access key are stored in a reference graph database.

In various embodiments, a system is described herein above and/or below, wherein an initial trust score is calculated for the prospective member based at least in part on the token and trust of the one or more references.

According to one or more embodiments, a non-transitory computer readable medium described herein stores executable instructions that, as a result of execution by one or more processors, cause the one or more processors to: determine a blockchain registration request for a prospective member to join a blockchain network, comprising person identifiable information (PII), payment information, and reference information; provide the payment information to a token exchange; obtain control of tokens that can be used on the blockchain network; determine, and from the reference information, one or more references and corresponding reference contact informations; provide reference requests for the one or more references to vouch for the prospective member via the reference contact informations; obtain one or more confirmations from the one or more references for the prospective member; confirm contact information with the prospective member; determine, using a one-way function, a PII hash of the PII; create a blockchain account for the prospective member, wherein the tokens are deposited to the blockchain account, wherein the prospective member is in possession of a secret access key that is usable to control the blockchain account; and activate a smart contract of the blockchain network to transfer at least a portion of the tokens to another member in exchange for a non-fungible token that represents a ticket.

In various embodiments, a non-transitory computer readable medium is described herein above and/or below, wherein a video call or video interview is conducted to obtain the PII.

In various embodiments, a non-transitory computer readable medium is described herein above and/or below, wherein the PII is stored in memory and discarded after the PII hash is determined.

In various embodiments, a non-transitory computer readable medium is described herein above and/or below, wherein an identification token and a hash of the secret access key are stored in a reference graph database.

In various embodiments, a non-transitory computer readable medium is described herein above and/or below, wherein an initial trust score is calculated for the prospective member based at least in part on the token and trust of the one or more references.

FIG. 1 illustrates an example computing environment in which a distributed and anonymized ticket exchange platform may be implemented, according to at least one embodiment of the present disclosure.

According to at least one embodiment of the present disclosure, a distributed and anonymized ticket exchange system is implemented herein. Various aspects of the system are implemented using a decentralized, distributed network—this is depicted in FIG. 1 as a blockchain network. The blockchain network of FIG. 1 may refer to a consensus-based blockchain may refer to a peer-to-peer electronic ledger implemented as a decentralized system. A ledger may comprise multiple blocks wherein a genesis block is a first block of the ledger and all other blocks reference a previous block. In at least some embodiment, each block (except the genesis block) includes a hash of the previous block to which that block became chained together to create an immutable record of the block to the blockchain ledger which cannot be modified, deleted, or otherwise altered. In other words, it is highly unlikely that any individual or organization will be capable of tampering with operation of the blockchain network.

According to one aspect of the present disclosure, member registration in the context of a ticket exchange platform is described herein. A prospective member may refer to an individual, entity, or computing resources being utilized on their behalf. A prospective member may desire to perform various activities such as to browse, select, and purchase tickets for a concert or other event or venue. Further, the prospective member may wish to keep details regarding any of his activities private from various entities in the ecosystem, such as financial institutions. However, this does not necessarily mean that the prospective member will be able to keep all information private. For example, a prospective member may still need to authorize a payment transaction with a financial institution, and the financial institution will be able to determine who is making the purchase (i.e., the prospective member's identity), the amount of the purchase, the time of purchase, etc. However, other aspects of the transaction may be kept secret—for example, the financial institution may be unaware of what the tickets are for (e.g., to attend a conservative conference), what seats were purchased, or other details that are not required by the financial institution.

In some cases, the financial institution may have certain compliance requirements that they are bound by, such as anti-money laundering (AML) laws. While ensuring maximum privacy is a goal for the overall system, it is still possible to share a defined and limited amount of information regarding the nature of the transactions in order to comply with application laws and regulations of a jurisdiction and nothing more. In various embodiments, the stage one node incorporates the use of a Zero-Knowledge Succinct Non-Interactive Argument of Knowledge (ZK-SNARKS) protocol to perform privacy preserving operations on the member's sensitive data while also allowing the payment processor to comply with AML rules and regulations.

A distributed node (e.g., blockchain node) may receive It is a computer or device that participates in the network by maintaining a copy of the blockchain's complete transaction history and contributing to the blockchain network's consensus mechanism. Each node stores a copy of the blockchain's entire transaction history, typically in the form of a distributed ledger. This ledger contains a sequence of blocks, where each block includes a set of transactions, a reference to the previous block (creating a chain), and other metadata. Nodes can participate in various aspects of the blockchain network, including but not limited to: token exchange, reference validation, identity validation, blockchain transaction validation, blockchain network participation, consensus protocols, block creation and/or mining, block propagation, and so on and so forth. Nodes may participate in some or all aspects of the blockchain network.

Nodes may be selected to perform various aspects of the blockchain network. The selection process may involve a weighted selection process in which nodes with higher trust scores are generally selected for performing phase one operations. Node may perform registration and identity verification processes. The verification process may involve a human that acts as an identity verification agent. The agent may be an employee of an organization that operates the node. Regardless, the verification process may involve the prospective member provide scanned copies or clear images of government-issued identification documents such as a passport, driver's license, or ID card.

The identity verification may involve the presentation of such documents through a video call or video interview in which the prospective member is interviewed by the agent and the prospective member will present the documents to the agent over the video call or video interview. During the call, the agent can compare the prospective member's appearance with the identification documents provided and ask them to show their ID during the call for additional verification. The agent may request proof of address to validate the member's current residence, for example, in the form of a utility bill or a bank statement showing the prospective member's name and address.

In various embodiments, prospective members can optionally provide references to existing members that can vouch for the identity of the prospective member. The node or operating agent may contact any references provided to verify that they know each other. A reference graph may be generated to establish a degree of trust. The more connected the references are to other members of the network, the greater the value of the reference, generally. In some embodiments, members can inherent some or all of the trust that has been earned by their references. Accordingly, different references can provide confirmations that contribute to another member's trust score within the blockchain ecosystem.

In some cases, a trusted third-party background check service can perform a background check. This may be limited to only certain members or when members wish to participate in certain aspects of the blockchain network. For example, in order to operate a node that perform the identity registration and identity verification processes, the agents and/or owners of such nodes may be subject to the rigorous background check to demonstrate that they have not been previously convicted of identity theft or other crimes related to the handling of sensitive information, such as the personally identifiable information (PII) of prospective members that are furnished during the registration process.

In various embodiments, a member may provide payment information, for example in the form of credit card information, that can be used to purchase tickets or make other exchanges within the blockchain ecosystem. The blockchain network may provide the payment information to a token exchange system. The token exchange system may facilitate an exchange of a fiat currency (e.g., US dollars) to a cryptocurrency (e.g., Bitcoin, Ethereum, C3N). The token exchange may provide the payment information to a financial institution—for example, a banking institution, which deducts the specified amount, makes a transfer, places a hold, or otherwise facilitates the transfer of a fiat currency to a C3N bank account. Assuming this transfer is successful, a corresponding amount of C3N tokens (e.g., a type a cryptocurrency) is transferred to the member's account. The member is able to place an order specifying the amount of cryptocurrency they wish to purchase (e.g., Bitcoin, Ethereum, C3N) using their deposited fiat currency. They would indicate their desired exchange rate or choose a market order to execute the trade at the prevailing market rate. The token exchange would match the user's buy order with a corresponding sell order from another user or liquidity provider on the exchange platform. This ensures that the user can acquire the desired cryptocurrency at the agreed-upon exchange rate. Once the buy order is matched, the token exchange would execute the transaction on behalf of the user. This involves transferring the corresponding amount of cryptocurrency from the seller's account to the buyer's account on the exchange. The token exchange would utilize its own internal infrastructure, including blockchain nodes, to confirm and record the transaction details. This includes updating the balances of the buyer and seller on the exchange's internal ledger.

The blockchain node(s) associated with the blockchain network would validate and process the transaction initiated by the token exchange. The node(s) would verify the transaction's validity, ensure the member has sufficient funds, and update the blockchain's ledger accordingly to reflect the transfer of cryptocurrency ownership. Once the transaction is processed by the blockchain node(s) and included in a block, it goes through a series of confirmations to establish its permanence on the blockchain. The number of required confirmations may vary depending on the specific cryptocurrency network and its security protocols. Once the transaction has received an adequate number of confirmations, the member's personal wallet or the designated external wallet would reflect the updated balance, confirming the successful exchange of fiat currency to cryptocurrency.

Figure 2:
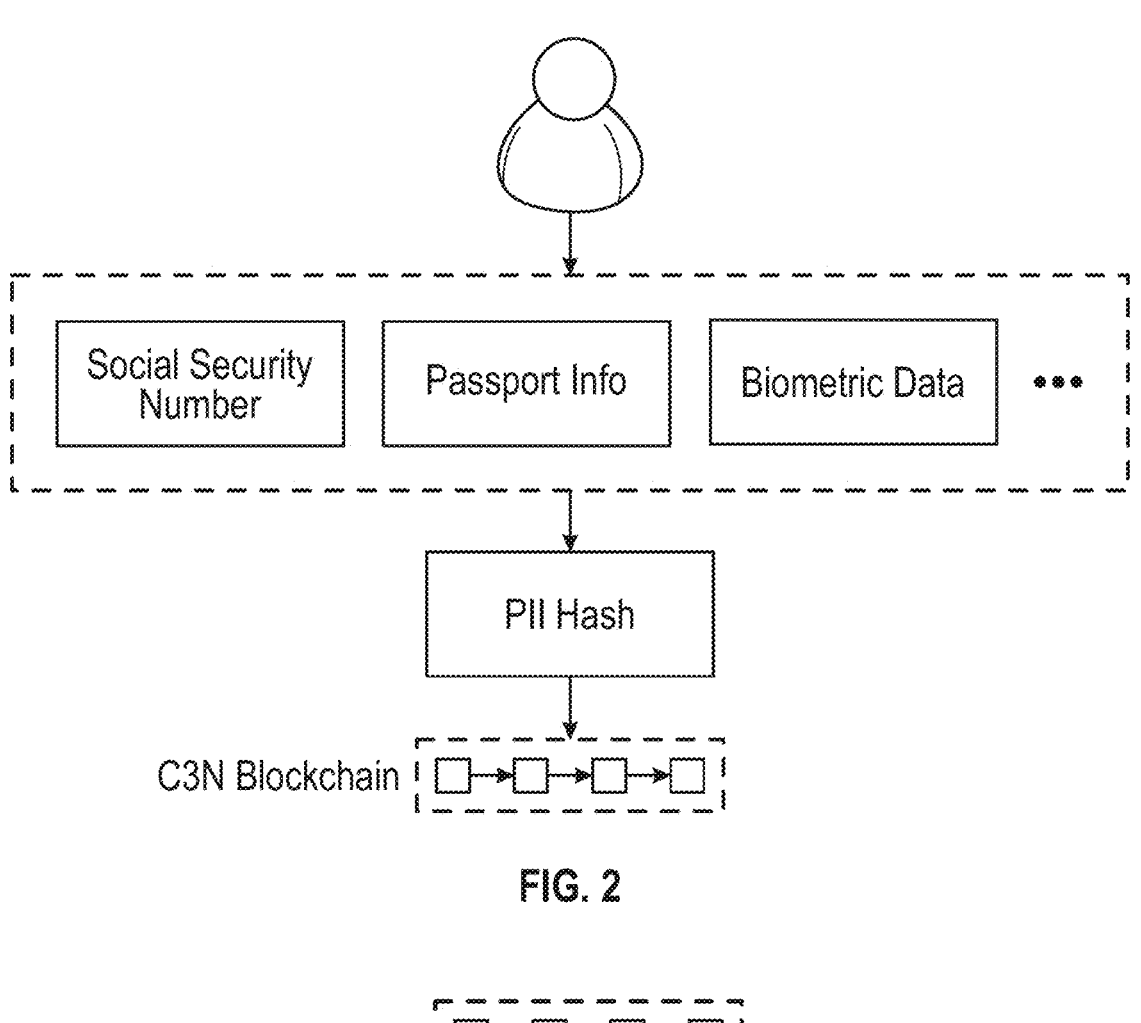
FIG. 2 depicts an environment in which anonymized PII data is stored on a blockchain, according to at least one embodiment of the present disclosure.

FIG. 2 depicts an environment in which anonymized PII data is stored on a blockchain, according to at least one embodiment of the present disclosure. In various embodiments, the member's sensitive data—for example, PII information that can be used to uniquely identify the member—is anonymized. The anonymization of the user's identity can be performed using a pre-image resistant function. Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that $f(x)=y$ is below a specified threshold), second pre-image resistance (given an input $x_1$, the probability of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x_1)=f(x_2)$ for different $x_1$ and $x_2$ is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

As an example, a one-way hash function may be used to generate a hash output based on a member's social security number or other information that can be used to uniquely identify the member. Another example might be a government issued drivers license, passport number, or other such information that is uniquely owned by the member. The PII hash may be generated by the node in phase one, for example, while the identity validation is performed. The hash function takes the input and produces a fixed-size string of characters called the hash value or digest. The resulting hash value is unique to the input data, and even a small change in the input will produce a significantly different hash output. A feature of the hash output is that it may be significantly smaller in size than the PII that it is generated from, meaning that the storage of a PII hash rather than the PII itself or a ciphertext of the PII may be much smaller in size and reduce the amount of storage space needed on the ledger.

Once the PII hash is generated, the PII plaintext may be discarded. In various embodiments, the PII plaintext is only temporary held in memory by the node and never transmitted or recorded to the distributed ledger, even in an encrypted format where it would potentially be decryptable by a party with a corresponding cryptographic key. Instead, a hash of the PII is used in phase two.

Phase two involves the creation of the member account. The member account may have a corresponding account number. Control of tokens or other digital assets described herein may be associated to the account. The account number and the control of tokens may be broadcasted to the latest block of the blockchain ledger.

Once a prospective member has been verified and has passed all verification checks, the user may receive a blockchain account identifier. Typically, the member will have an initial balance of zero tokens, but can, in some cases, have some non-zero starting amount, for example, staked by one of the references of the member. The member may also be in possession of a secret access key that can be used to prove ownership of the associated account and to perform various activities, such as making a purchase.

In various embodiments, the PII hash generated in phase one is stored in a publically accessible data store. The data store may be a decentralized database. In some embodiments, the PII hash is stored on an immutable ledger. The PII hash can be retrieved by other nodes later on to verify the identity of the member. For example, if the member presents the PII hash at a later point in time to make a second purchase, the PII hash can be used to verify that it was the same member. In this way, the PII hash can be viewed as a consistent "fingerprint" or persistent identity of the member, regardless of the account identifier. This can be used to prevent banned members from attempting to create new accounts or to verify that a purchaser has not previously been involved in scalping or other activity that should bar him or her from making future purchases.

The member will furthermore have access to a secret access key that is not known to any other parties, including the registration nodes, any worker nodes, the financial institution. The secret access key may be used by the member to facilitate blockchain activity such as to interact with a smart contract to buy a ticket or perform other exchanges involving the fungible and/or non-fungible tokens that are assigned to the account. An identification token and a hash of the secret access key may be stored in a reference graph. The data store may have a tuple of information that is stored as identifier, reference id, and secret key hash. The identification token and secret access key can be used by a candidate to authenticate with the C3N network. The network stores nothing of value to any entity except the PII hash and reference graph that is used to prevent fraud. There is no direct storage of PII-either in plaintext or encrypted form—in any of the C3N stores.

Figure 3:
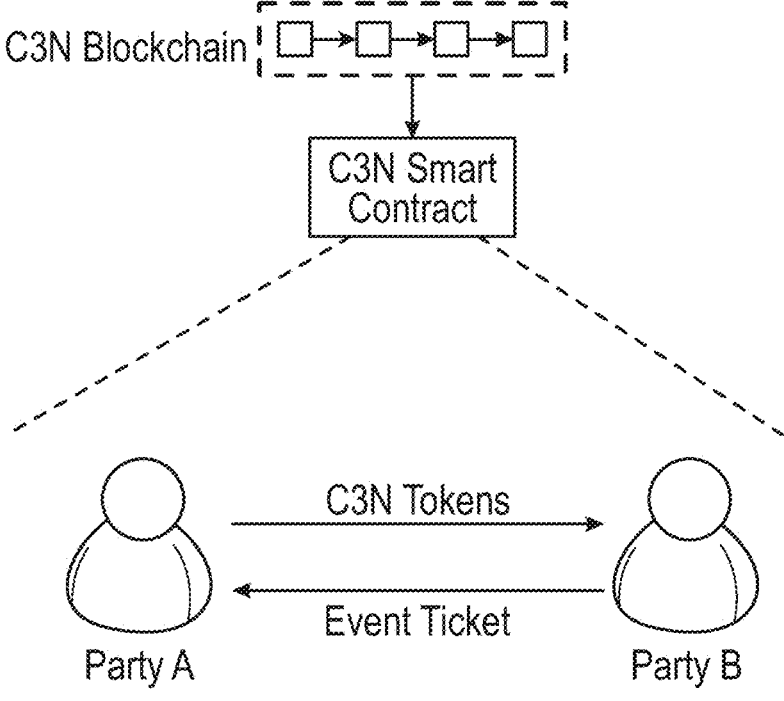
FIG. 3 depicts an example of an identity verification using C3N blockchain identity services, according to at least one embodiment of the present disclosure.

FIG. 3 depicts an example of an identity verification using C3N blockchain identity services, according to at least one embodiment of the present disclosure.

When a transaction is broadcasted to the C3N network, each node receives it and validates its authenticity and integrity. Validation rules depend on the specific blockchain protocol, but will, in various embodiments involve checking digital signatures, verifying transaction inputs and outputs, and ensuring the transaction adheres to consensus rules. Nodes communicate with each other using a peer-to-peer network. They exchange information about transactions, blocks, and other network-related data. This communication allows nodes to propagate transactions and blocks throughout the network, ensuring that all nodes have the latest information. Nodes participate in the consensus mechanism, which is a protocol or algorithm that ensures agreement on the state of the blockchain among all participating nodes. Popular consensus mechanisms include Proof of Work (PoW), Proof of Stake (POS), and variations like Delegated Proof of Stake (DPOS) or Practical Byzantine Fault Tolerance (PBFT). The consensus mechanism determines how new blocks are added to the blockchain and how conflicts or forks are resolved. In a PoW-based blockchain, nodes compete to solve a computational puzzle (mining) to create a new block. Once a node finds a solution, it broadcasts the newly created block to the network. Other nodes validate the block and, if valid, add it to their local copy of the blockchain. Nodes participating in PoS or other consensus mechanisms may have different processes for block creation.

Each node verifies incoming blocks received from other nodes to ensure they meet the consensus rules. This includes confirming that transactions within the block are valid, the block's hash is correct, and that the block fits into the existing blockchain structure. Invalid blocks are rejected, preventing malicious or incorrect information from being added to the blockchain. Validated blocks are shared with other nodes in the network. Nodes broadcast new blocks they receive to their peers, ensuring the propagation of the latest blockchain state across the network. This decentralized communication helps maintain the consistency and integrity of the blockchain.

Depending on the blockchain protocol, nodes may be incentivized for their participation. In PoW-based blockchains, miners receive rewards (e.g., cryptocurrency tokens) for successfully mining a block. In PoS-based blockchains, nodes may earn rewards based on the number of tokens they hold or their staking activity. These incentives encourage node participation and help secure the network. A member's C3N score may be increased through participation in the blockchain protocol.

In a ZK-SNARKS protocol, a prover can prove to a verifier that they know a particular piece of information, without revealing the information itself. This is achieved by using advanced cryptographic techniques to generate a proof that demonstrates the validity of the claim, without revealing any of the underlying data. As part of a ZK-SNARKS protocol, the node may act as a prover and the financial institution may act as a verifier. In an illustrative ZK-SNARKS protocol, the verifier creates a circuit that represents the transaction, specifying the inputs, outputs, and the constraints that must be satisfied for the transaction to be considered valid. The circuit is designed in a way that allows for efficient proof generation and verification. The circuit may, for example, encode various AML requirements, fraud detection and prevention, or other such verification logic that the financial institution would otherwise wish to perform in order to authorize a financial transaction.

Continuing with the example ZK-SNARKS protocol, the payment processor creates a common reference string (CRS) that is used by both the prover and verifier to generate and verify the proof. The CRS is generated using a trusted setup process that ensures the security and integrity of the protocol. The member then provides the inputs to the circuit, such as the amount to be transferred, the destination account, and the source of funds. The prover also generates a witness for the inputs, which is a set of auxiliary information that is used to prove the validity of the inputs. The member may provide authentication and/or authorization information—for example, the financial institution may provide the member a message (e.g., email, text message, smartapp notification), that includes a one-time code to authorize the transaction.

Returning to the circuit, the circuit and the witness are used to generate a set of constraints that must be satisfied for the transaction to be considered valid. These constraints are used to generate a polynomial that represents the transaction. The prover selects a random number, called a secret key, and uses it to generate a polynomial that represents the witness. This random polynomial may be referred to as the "witness polynomial". The coefficients of this polynomial correspond to the values in the witness that the prover is trying to prove knowledge of. For example, if the witness includes the user's private key, the witness polynomial might include a coefficient that corresponds to that private key value. The prover then generates a commitment to the witness polynomial, which is a mathematical object that can be publicly verified by the verifier without revealing any information about the witness polynomial itself. The commitment is constructed using the polynomial and the secret key, and can be used to demonstrate that the polynomial is well-formed and satisfies certain constraints. When the verifier receives the proof and the commitment, they can use the commitment to verify that the witness polynomial is valid without actually seeing the polynomial itself. This allows the verifier to confirm that the prover has knowledge of the witness and has correctly constructed the proof, without revealing any sensitive data.

The prover, in various embodiments, generates a proof by using the polynomial representing the witness and the polynomial representing the transaction to construct a commitment that can be verified by the verifier. The commitment is constructed in such a way that it reveals nothing about the underlying data, except for the fact that it satisfies the constraints of the circuit. The verifier receives the proof and the CRS, and uses them to verify the proof. The verifier does not have access to the witness or the transaction data, but can use the CRS and the commitment to verify that the transaction satisfies the constraints of the circuit.

In the context of FIG. 1, the example ZK-SNARKS protocol described above can be used to prove that a transaction is compliant with a set of customizable constraints that can be defined by the financial institution authorizing the transaction. For example, a first financial transaction may have a first set of constraints that encodes compliance with AML rules and its own internal policies, and a second financial transaction may have a second set of constraints that encodes compliance with the AML rules and a different set of internal policies. Regardless, when the member makes a payment, the ZK-SNARKS protocol can be used to generate a proof that the transaction complies with AML regulations, without revealing any information about the member or the transaction itself.

To achieve this, the payment processor can use ZK-SNARKS to create a proof that the transaction satisfies certain AML criteria, such as the source of funds, the destination of funds, and the amount of funds being transferred. The proof can then be submitted to the AML compliance authority, which can verify the proof without seeing any sensitive data about the user or the transaction.

In at least some embodiment, a "blockchain" or "blockchain network" refers to any and all suitable forms of distributed ledgers, which includes consensus-based blockchain and transaction-chain technologies, permissioned and un-permissioned ledgers, shared ledgers, and more. Non-limiting examples of blockchain technology include Bitcoin and Ethereum, although other examples of blockchain technologies are also contemplated in the scope of this disclosure. While Bitcoin and Ethereum may be described in connection with various embodiments of this disclosure, those embodiments are to be construed merely as illustrative examples and not limiting. For example, alternative blockchain implementations and protocols are contemplated within the scope of the present disclosure.

A blockchain network may refer to a peer-to-peer electronic ledger implemented as a decentralized system. A ledger may comprise multiple blocks wherein a genesis block is a first block of the ledger and all other blocks reference a previous block. In at least some embodiment, each block (except the genesis block) includes a hash of the previous block to which that block became chained together to create an immutable record of the block to the blockchain ledger which cannot be modified, deleted, or otherwise altered. A block may include one or more blockchain transactions. A blockchain transaction may refer to a data structure that encodes the transfer of control of a digital asset between users of the blockchain network. For example, a blockchain transaction may transfer control of a digital asset from a source address to a destination address. The blockchain transaction may be signed with a private key associated with the address which can be cryptographically verified using a corresponding public key that is made available to other parties of the blockchain network. In at least one embodiment a blockchain transaction includes a transaction input and a transaction output.

In some embodiment, a blockchain transaction is validated before it is committed to the blockchain ledger as part of a block. Blockchain nodes may be used to verify blockchain transactions, which may include verifying digital signatures of transactions, verifying that a purported owner of a digital asset is actually the owner by inspecting the blockchain ledger to verify that control of the digital asset was transferred to the purported owner and that the purported owner has not elsewhere transferred control of the digital asset (meaning that the purported owner was previous the owner of the digital asset but has previously transferred control to another entity).

Validity in the blockchain context may be consensus based, and a transaction may be considered valid if a majority of nodes agrees that the blockchain transaction is valid. In at least some embodiments, a blockchain transaction references an unspent transaction output (UTXO) that is used to validate the transaction by executing the UTXO locking and unlocking script. If the UTXO locking and unlocking script executes successfully (e.g., by evaluating to TRUE and any other validation operations). Accordingly, a blockchain transaction is written to a blockchain ledger when it is validated by a node that receives the transaction and is added to a new block by a node (e.g., miner) and actually mined by being added to the public ledger of past transactions. In at least some embodiment, a blockchain transaction is considered to be confirmed when a certain number of subsequent blocks are added to the blockchain ledger, whereinafter the blockchain transaction becomes virtually irreversible.

A blockchain transaction output may include a locking script that "locks" a digital asset by specifying a condition that is to be met in order for the encumbrance to be lifted or unlocked (e.g., to allow control of the digital asset to be transferred to another user). A locking script may be referred to as an encumbrance. An unlocking script may be a corresponding script that in combination with the locking script, removes an encumbrance on digital assets. A locking script and unlocking script may be combined to form executable code that, if executed to completion or to yield a specific result, indicates that the unlocking script is valid and that the encumberance may be removed. For example, "scriptPubKey" is a locking script in Bitcoin and "scriptSig" is an unlocking script.

It should be noted that while blockchain technology is perhaps most widely known for its use cryptocurrency, there are many other applications for blockchain technologies for providing secure systems. A secure system may refer to a system in which functionality-such as the exchange of digital assets between two or more entities—is cryptographically verifiable. A secure system may be robust to failure. A secure system may be immutable such that information that is committed to the blockchain ledger cannot be unilaterally modified by an individual. A secure system may provide additional assurances, such as assurances of confidentiality, integrity, authenticity, and nonrepudiation. Confidentiality may refer to assurances that certain information is not made publicly available (e.g., the underlying identity of a blockchain address may be kept secret or unknown). Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. Nonrepudiation may refer to assurances that a party that digitally signs a blockchain transaction cannot deny the authenticity of the transaction.

Mining may refer to the process of validating blockchain transactions along a blockchain network. Validating blockchain transactions may involve a process of securing and verifying blockchain transactions (e.g., organized as blocks) along a blockchain. Mining may be a process that helps maintain network security by ensuring that valid blocks are recorded on a blockchain ledger. Generally speaking, participants in a mining process can be rewarded for using computing resources (e.g., compute resources such as CPUs) to solve computational algorithms. Mining can be done in various ways. Proof-of-work (POW) and proof-of-stake (POS) consensus are two non-limiting examples of how mining can be done.

Proof-of-stake may refer to a consensus algorithm in which validators secure new blocks before they are added to a blockchain network. In a POS mining algorithm, a node may participate in the mining process by staking an amount of digital assets. The POS may be a deterministic concept that states individuals are allowed to mine or validate new blocks equal to proportionally to the amount staked—in other words, the more digital assets a node stakes, the greater mining power the node has. In some cases, greater mining power means that a node has more opportunity to validate blocks and be rewarded. Opportunity may refer to probabilistic opportunity, in which a probability $p1>p2$ does not necessarily guarantee that a first node with higher probability $p1$ actually mines more than a second node with lower probability $p2$ over a specific period of time. However, long-run, expected value of miners with larger staked amounts may be greater than those of miners with smaller staked amounts.

A node may become a miner by staking an amount of digital assets from the miner's blockchain wallet by transferring digital assets to a bound wallet. Miners, who may be called validators, delegates, or forgers, may be chosen or voted for randomly by holders of digital assets on the blockchain network. For a node to be chosen as a staker, the node needs to have deposited a certain amount or value of digital assets into a special staking wallet. In at least some embodiments, miners are entitled to forge or create new blocks proportional to the amount staked. In some embodiments, mining is managed by a service provider, which provides the computing resources that are needed to record new data to a ledger.

POS blockchain networks may have several important differences from POW blockchain networks. In general, anyone with enough digital assets can validate transactions on a blockchain network, and the benefits of specialized hardware such as application-specific integrated circuits (ASICs) is less pronounced than in POW blockchain networks. Generally speaking, POS blockchain networks may be more energy efficient and environmentally friendly than POW blockchain networks. Non-limiting examples of POS blockchain networks include: DASH; NEO; Lisk; Stratis; PIVX; OkCash; and more. Generally speaking, in a POW blockchain network, nodes with greater computing power are more likely to mine new blocks, whereas in POS blockchain networks, nodes with greater staking amounts are more likely to validators.

Figure 4:
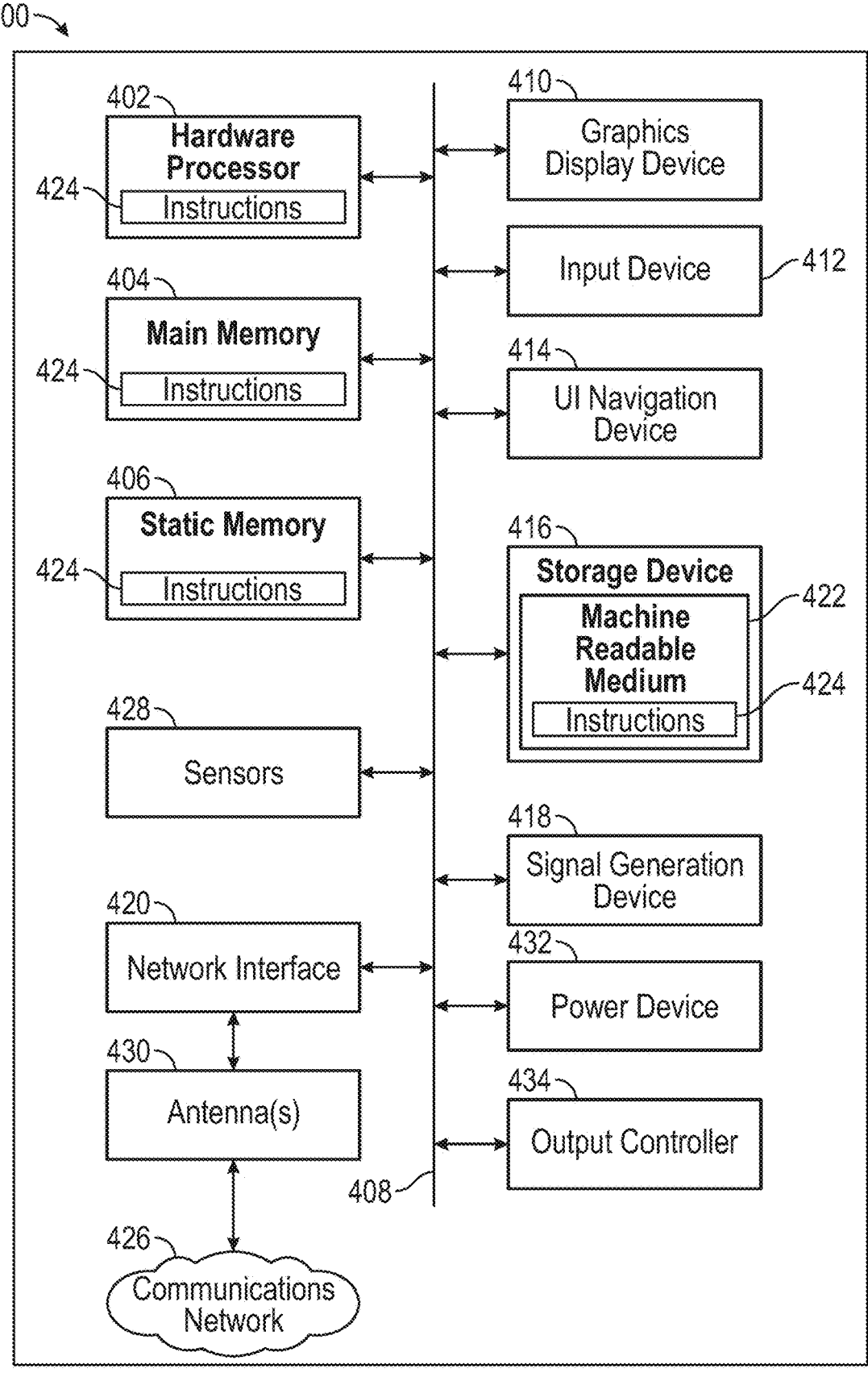
FIG. 4 illustrates a block diagram of an example of a machine or system upon which any one or more of the techniques (e.g., methodologies) discussed herein may be performed.

FIG. 4 illustrates a block diagram of an example of a machine 400 or system upon which any one or more of the techniques (e.g., methodologies) discussed herein may be performed. In other embodiments, the machine 400 may operate as a standalone device or may be connected (e.g., networked) to other machines. In a networked deployment, the machine 400 may operate in the capacity of a server machine, a client machine, or both in server-client network environments. The machine 400 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include any combination of the illustrated components. For example, the machine 400 may include a hardware processor 402 (e.g., a central processing unit (CPU), a graphics processing unit (GPU), a tensor processing unit (TPU) including an artificial intelligence application-specific integrated circuit (ASIC), a hardware processor core, or any combination thereof), a main memory 404 and a static memory 406, some or all of which may communicate with each other via an interlink (e.g., bus) 408. The machine 400 may further include a power management device 432, a graphics display device 410, an alphanumeric input device 412 (e.g., a keyboard), and a user interface (UI) navigation device 414 (e.g., a mouse). In an example, the graphics display device 410, alphanumeric input device 412, and UI navigation device 414 may be a touch screen display. The machine 400 may additionally include a storage device (i.e., drive unit) 416, a signal generation device 418 (e.g., a data signal), a network interface device/transceiver 420 coupled to antenna(s) 430, and one or more sensors 428, such as a sound detecting sensor (e.g., a microphone), accelerometers, magnetometers, location sensors, and the like. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.1 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software.

Figure 5:
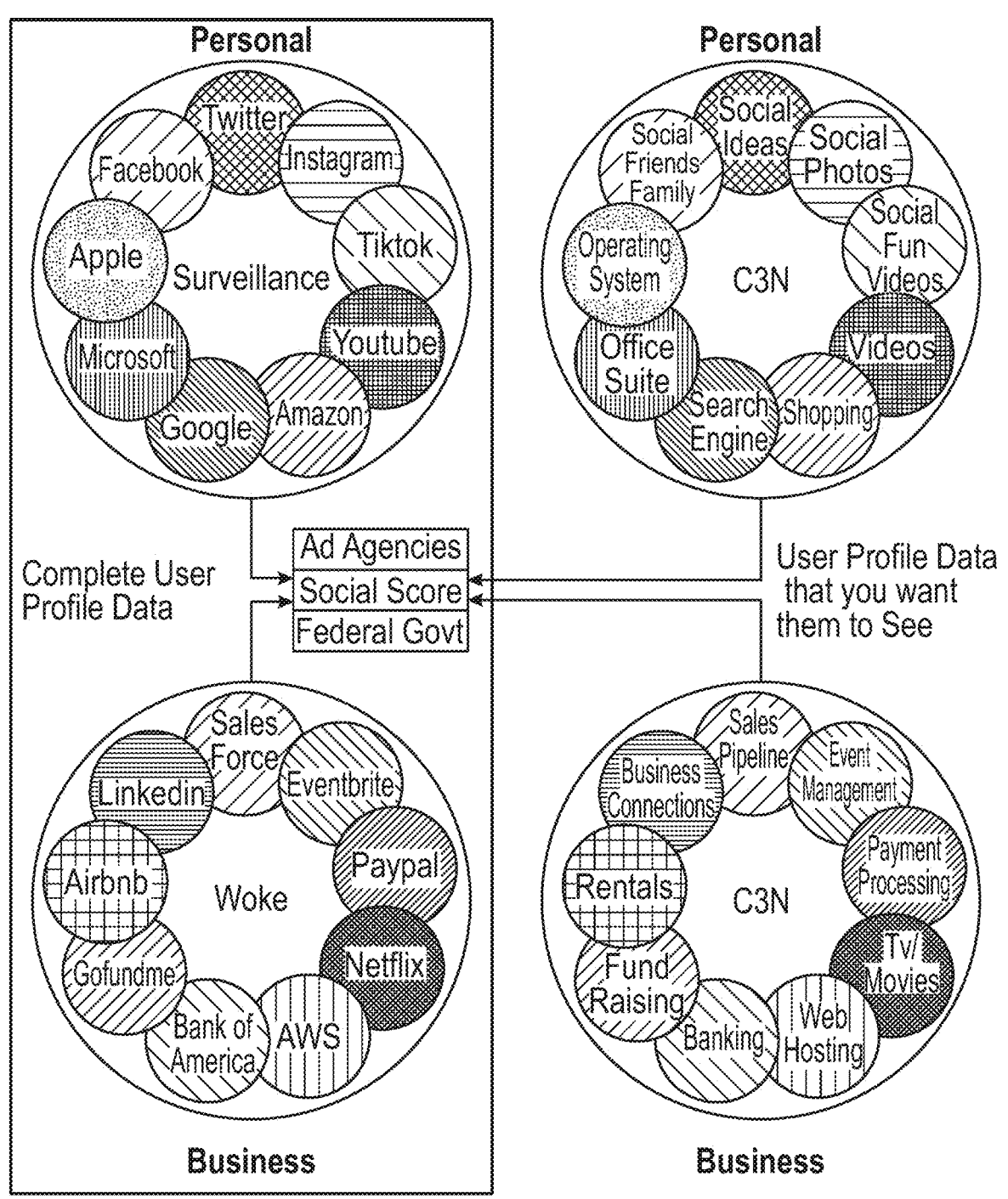
FIG. 5 depicts a Venn Diagrams representing various social media and social network platforms (left) and the C3N ecosystem (right), according to at least one embodiment of the present disclosure.

FIG. 5 depicts a Venn Diagrams representing various social media and social network platforms (left) and the C3N ecosystem (right).

A single app reduces memory footprint and reduces, improves performance, reliability and security. C3N provides feature parity with a consistent backend & frontend technology. New C3N features can be shared.

Participating in the C3N ecosystem is like having an insurance policy against:

Invasion of privacy

Doxxing from malicious actors

Censoring speech.

Seizure of bank accounts.

Banning participation in commerce

Blocking business advertisements

C3N flips the existing, platform-centric model upside down, putting the individual in control of their own data profile, while enabling participation in the profits of the network.

In at least one embodiment of the present disclosure, one solution-which may be referred to herein as the "C3N ecosystem"—can replace all the heterogeneous Social media and social networking apps and services.

Rather than use different apps for different platforms, all with their own heterogeneous tech stacks, full of technical debt, C3N provides a different kind of solution for its users. One that would include a single social media app (with sub-apps: Facebook-like app, TikTok-like app, LinkedIn-like app, etc.) C3N's backend allows all the subapps to share the same, consistent, high-speed C3N infrastructure. C3N authenticates its users and allow them to use alias accounts that are tied to their real account, but only the user and C3N know about the connection.

Alias Accounts

C3N authenticates the user and allows the user to create and use alias accounts within (and outside) the C3N ecosystem. This way, even if other parties manage to get C3N accounts, they will still not be able to identify the actual identity behind a C3N alias.

Figure 6:
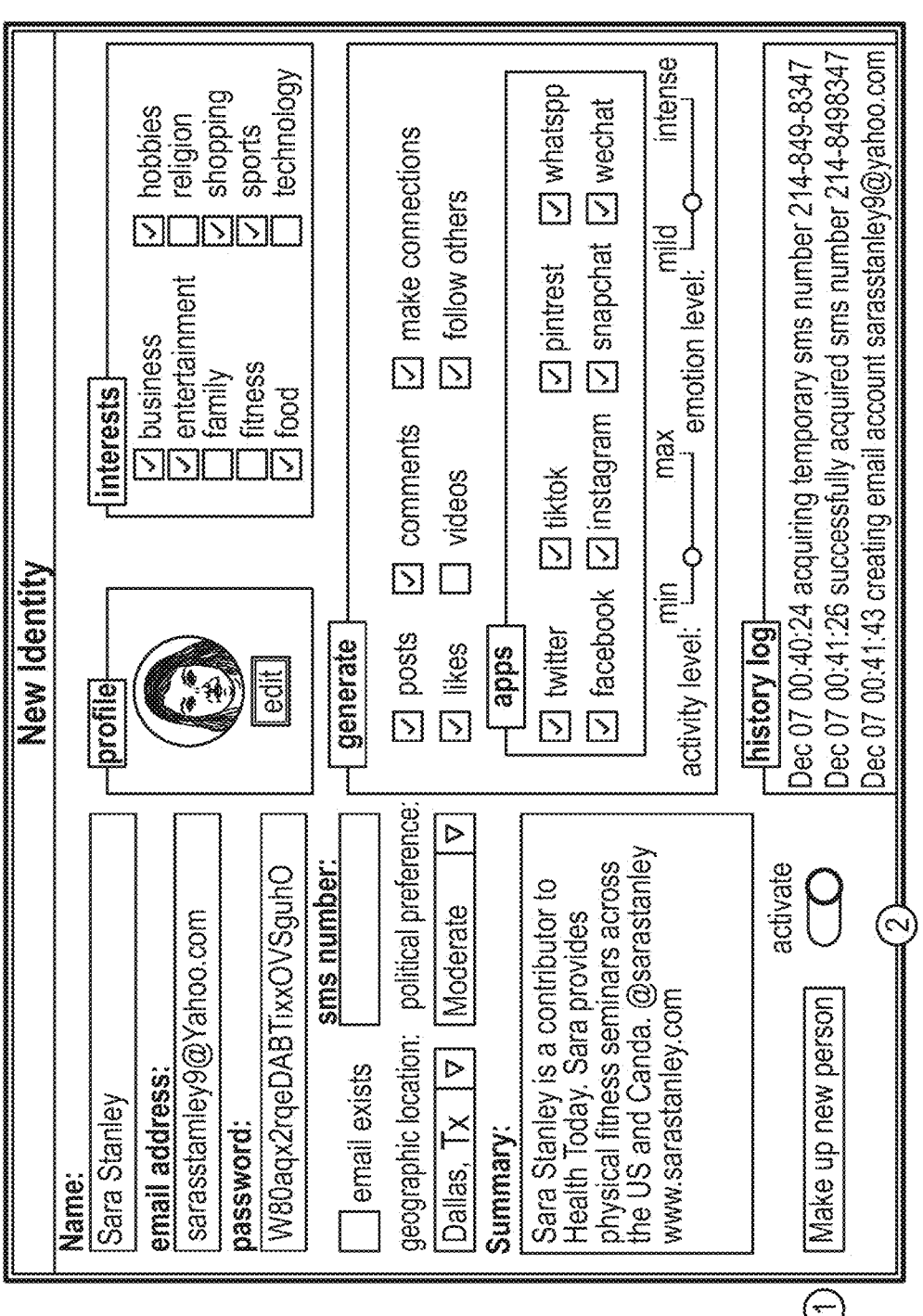
FIG. 6 depicts a graphical interface for creating a new identity, according to at least one embodiment of the present disclosure.

FIG. 6 depicts a graphical interface for creating a new identity. In at least one embodiment of the present disclosure, clicking (1) <Make up new person> will (re) populate the fields. Clicking (2) <activate> will create the email account. (3) The system will acquire a temporary SMS phone number where necessary for registration purposes. (4) The system will generate social media activity on the user's behalf as the user's new identity for each app selected by the user.

Figure 7:
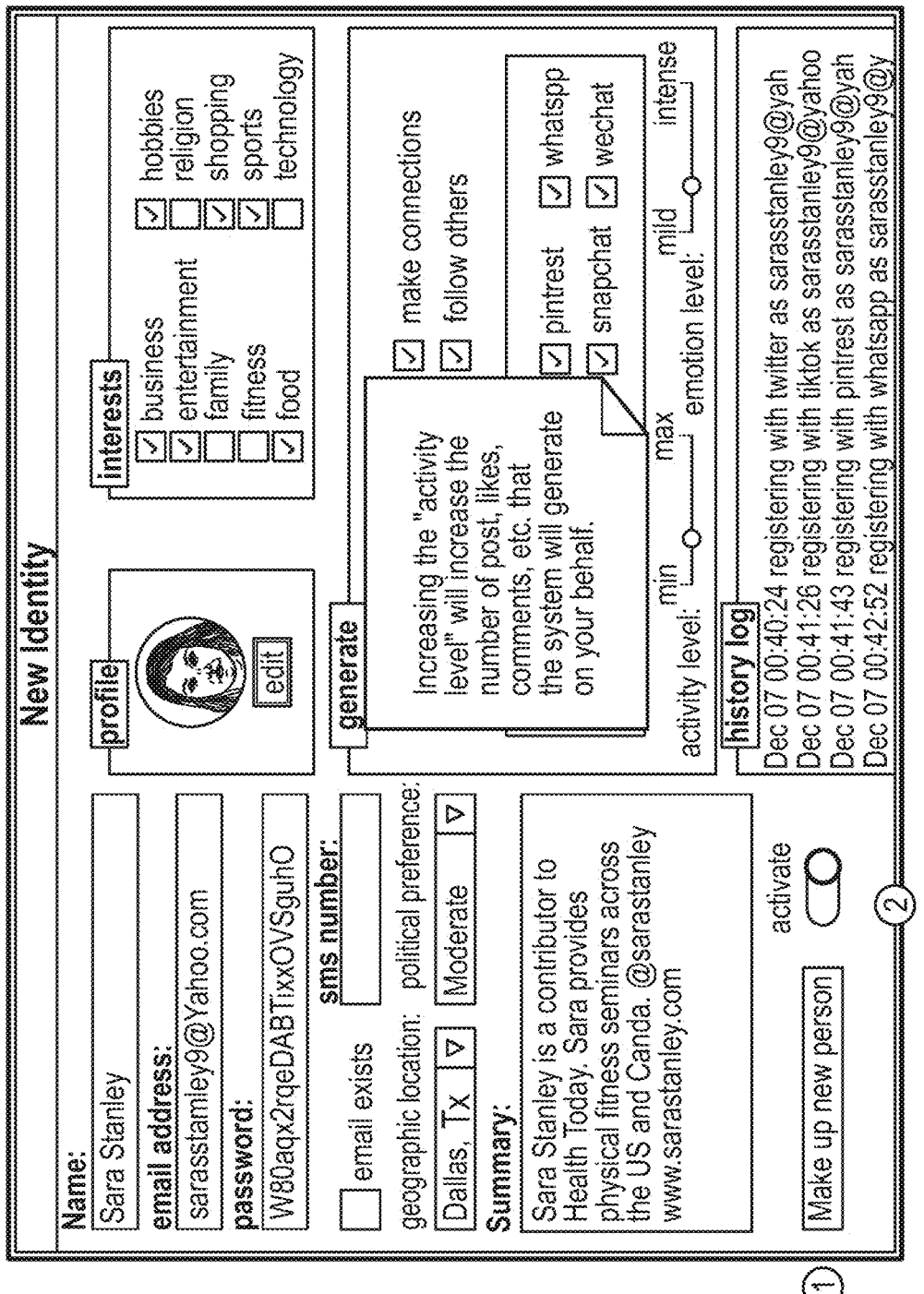
FIG. 7 depicts a graphical interface for creating a new identity, according to at least one embodiment of the present disclosure.

FIG. 7 depicts a graphical interface for creating a new identity. In at least one embodiment of the present disclosure, if a user check (1) "email exists" and (2) enter the user's own email address and SMS number, then (3) the user will receive all registration notifications. (4) The user will be directed to respond to all registration emails and SMS messages. (5) This will directly link the user to his or her new personality.

In at least one embodiment of the present disclosure, a user can use this technique to change what platforms thinks the user think and the personal preferences that platforms are able to trace back to the user. The user can specify their own photo or let the system generate a fake one.

Users can use their real identity and alias accounts in many ways. For example, the user could use their real identity to post innocuous, non-controversial information. If they wanted to click <Like> on Donald Trump's posts on a social media platform, they could do so using one of their alias accounts. That way, the social media platform might profile their alias as being conservative, without affecting the user's real identity.

This social profile and user aliasing feature will enable the C3N user to obfuscate the user's activities and make profiling of a user's behaviors more difficult. After a while, with enough C3N users distorting a social media platform's user profiles, all of their user profile data will become inaccurate, unreliable and worthless. Their social scoring system will be running on garbage data, thereby making it more difficult for social media platforms to target individual users based on a user's preferences or beliefs that the user wishes to keep private.

C3N Deployment Architecture

In at least one embodiment of the present disclosure, C3N is able to replace social media platforms with a streamlined, container-based, consistent architecture. By adhering to the following principles, C3N is able replace multiple, heterogeneous social media and/or social network platform solutions:

Use Golang for all backend business logic components, except where it is necessary to use Rust to improve performance Deploy application service logic to containerized environments.

Use C3N git repository to manage source code

Use C3N container registry to manage application service containers

Use C3N deployment pipeline to build containers.

Use C3N container management server and agents manage code updates to devices in the field Use Golang infrastructure components (may also consider using Rust for extreme performance where necessary)

Figure 8:
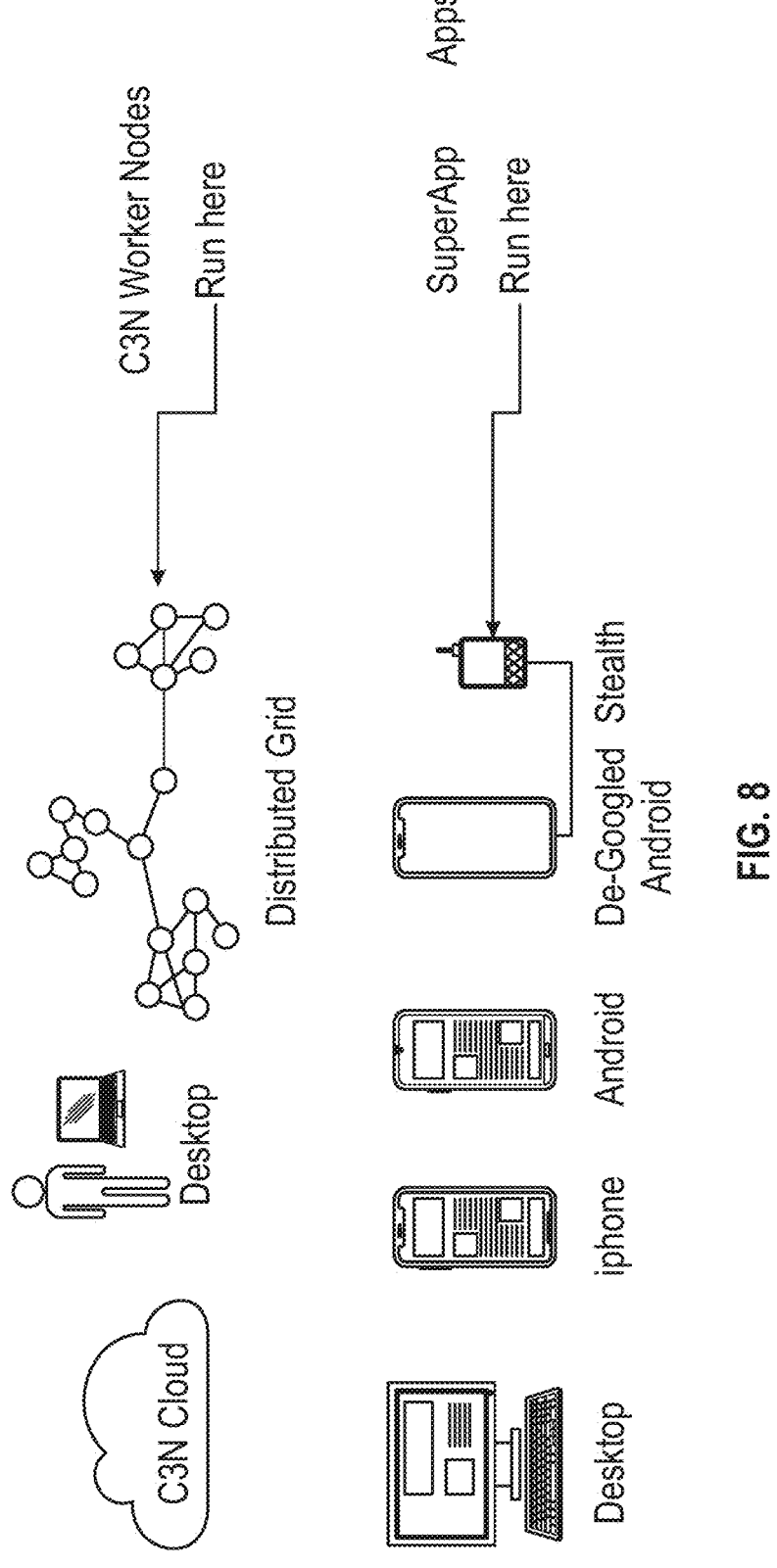
FIG. 8 illustrates C3N worker nodes and SuperApp apps, according to at least one embodiment of the present disclosure.

FIG. 8 illustrates C3N worker nodes and SuperApp apps. In at least one embodiment of the present disclosure, C3N worker nodes run services in cloud, on desktops or on nodes in C3N grid. C3N worker nodes may be implemented as a machine, as described in connection with FIG. 4.

Users access C3N apps, like SuperApp on their desktop computers or mobile phones. Additionally, users can purchase a de-Googled phone and if they have the Stealth service then they can truly communicate anonymously and without the fear of interception by eavesdroppers.

Entry, Relay and Exit Nodes

Figure 9:
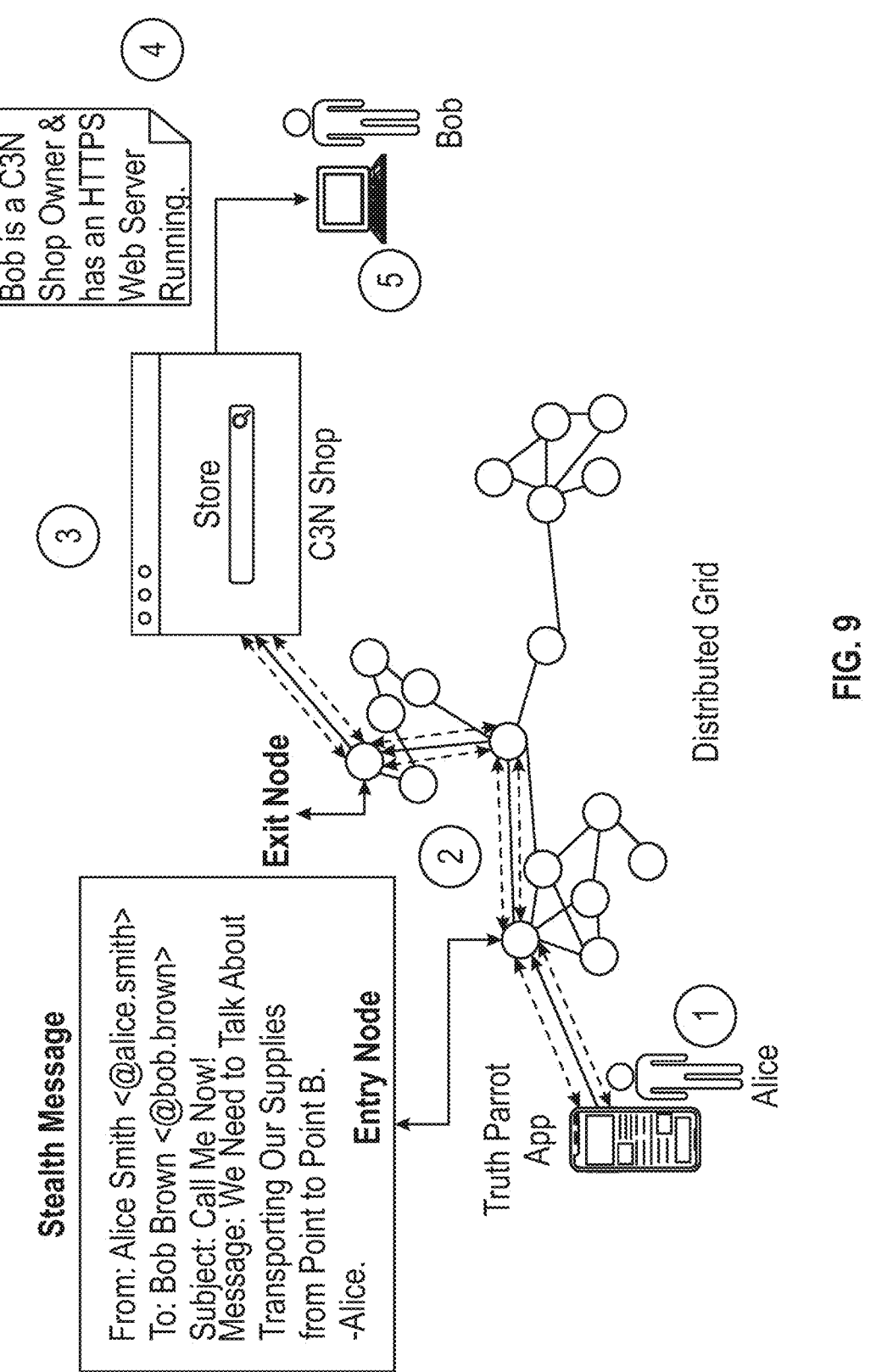
FIG. 9 depicts a distributed grid for cloaking network communications, according to at least one embodiment of the present disclosure.

Systems and methods for cloaking network communications are described herein. FIG. 9 depicts a distributed grid for cloaking network communications.

(1) The SuperApp App initiates fake sessions that imitate real user interactions with C3N shops (mostly during periods of low overall network activity). (3) C3N shop nodes drop fake packets but keep the non-fake sessions alive. Nodes in between cannot see the HTTP payload containing Alice's message.

To Alice, it looks like she's using a typical messaging app, but behind the scenes, (2) C3N is cloaking their communications in the midst a lot of innocuous/fake, random user/shop interactions: Other real and fake C3N user interactions are occurring continuously and simultaneously.

(4) C3N delivers the message to Bob's inbox like any other message and indicates that Alice's message is stealth.

(5) Bob receives encrypted message and his secure messaging app (SMA) decrypts it so that the message can be displayed, unencrypted in his SMA app's inbox.

TOR Protocol

Figure 10:
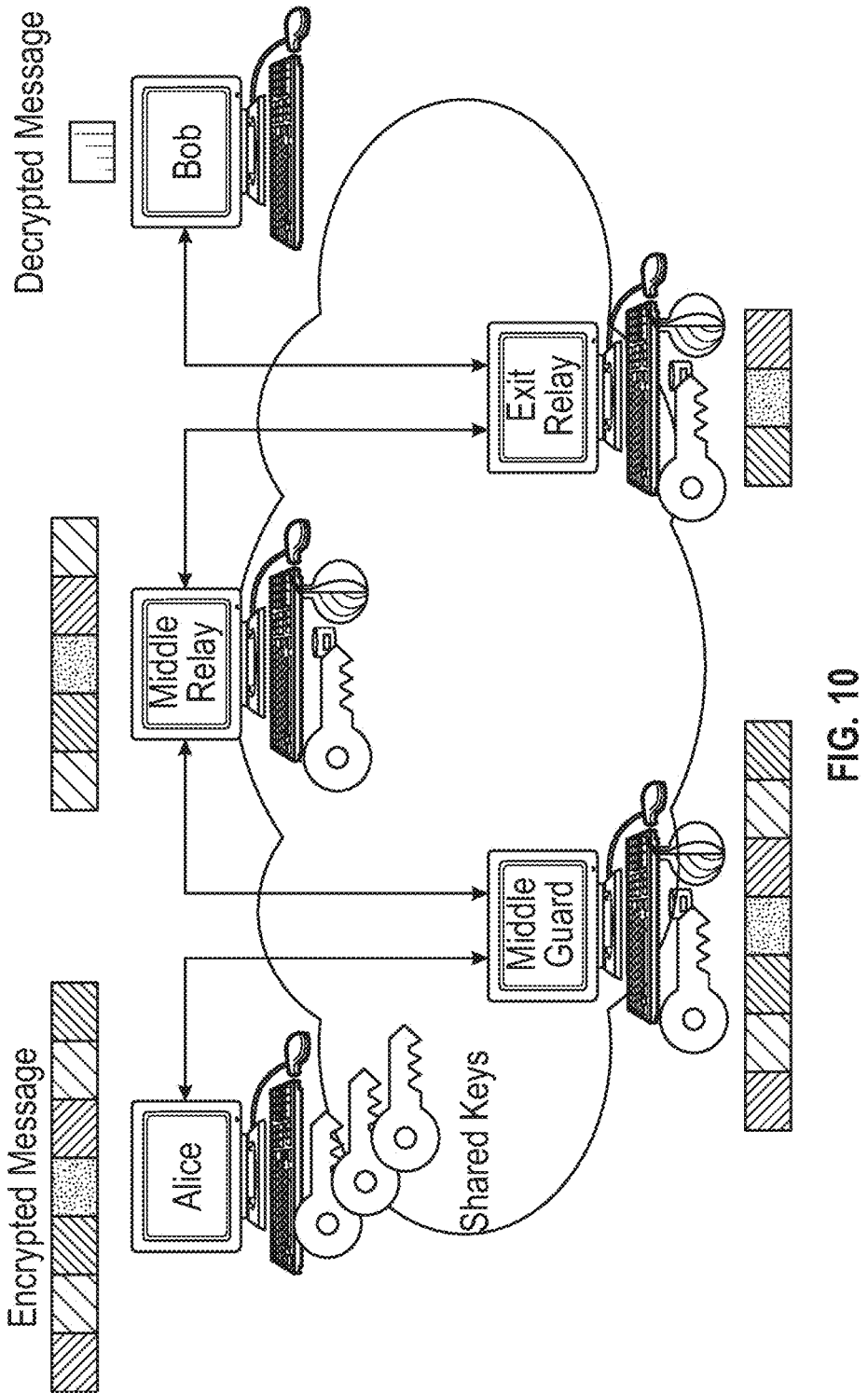
FIG. 10 depicts how C3N uses features from the Onion Routing Protocol (ORP) for anonymous communication over the C3N computer network, according to at least one embodiment of the present disclosure.

In at least one embodiment of the present disclosure, FIG. 10 depicts how C3N uses features from the Onion Routing Protocol (ORP) for anonymous communication over the C3N computer network.

In various embodiments, one or more of the following features are implemented based on ORP features:

1. Messages are of constant length
2. Messages wrapped and encrypted using shared keys: Each node, except the final exit node, only knows who the source address of the message and after decrypting what they can see, what the next node's address is.

In various embodiments, one or more of the following features are implemented differently from ORP features:

1. There can be any number of nodes between Alice and Bob.
2. Since Alice and Bob uses the C3N SMA app, the message can be encrypted over all node traversals, including the exit node.

3. The C3N network creates extra (noise) communications to help make message correlation impossible. Costs: extra bandwidth and minor computation. Benefits: communication looks like normal web traffic.

4. Added Privacy: It looks like Alice browsed a few of Bob's web site pages (in addition to a lot of others) but instead sent Bob a stealth message.

C3N Overlay Network—Stealth Communication

Figure 11:
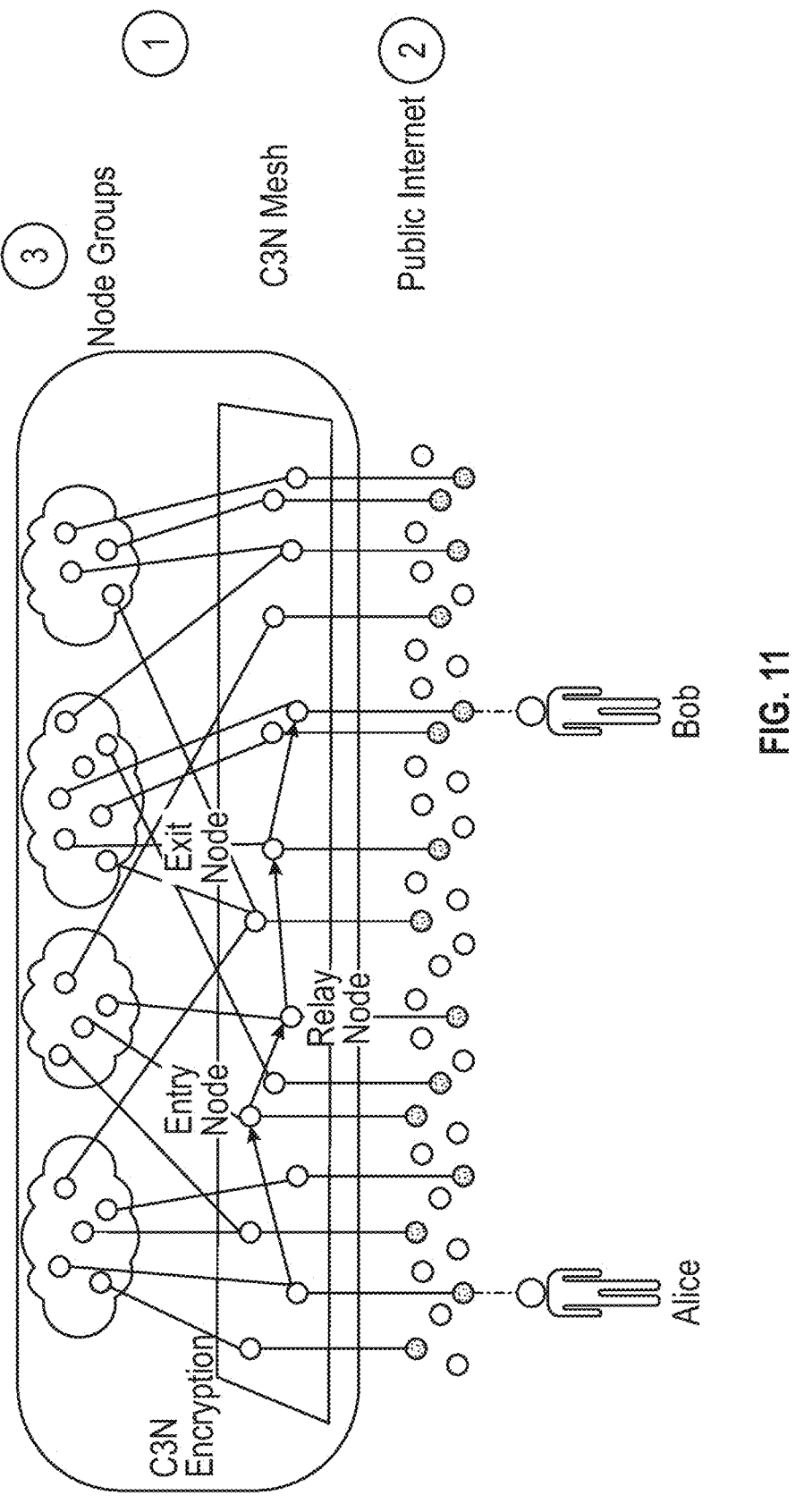
FIG. 11 depicts an overlay network to create a secure and private ecosystem of C3N producers and consumers, according to at least one embodiment of the present disclosure.

FIG. 11 depicts an overlay network to create a secure and private ecosystem of C3N producers and consumers.

In at least one embodiment of the present disclosure, systems and methods of using an overlay network to create a secure and private ecosystem of C3N producers and consumers over the public internet and through corporate firewalls are described herein. At least one embodiment of the present disclosure is described in connection with FIG. 11.

In at least one embodiment of the present disclosure, C3N members operate not only on the public internet, but also within the (1) C3N overlay network. Hence, C3N operates as an overlay network, hiding in plain sight, maintaining C3N members' end-to-end encryption (security) and privacy.

In at least one embodiment of the present disclosure, C3N stealth communication and commerce interactions are encrypted end-to-end. C3N can visit any internet site, global C3N sites and any subnets they're a member of. Internet service providers (ISP) can see traffic, but it looks like normal HTTPs traffic and they will be unable to determine which parties are communicating with each other.

Since this is a dynamic, encrypted, overlay network, it can operate on top of any TCP/IP network. The (1) public internet above represents the current world wide web network whose precursor network was the ARPANET. But the C3N mesh is not limited to that. For example, if other, separate TCP/IP based networks are developed, C3N could operate in stealth mode in that network, too.

(3) Node groups are collections of C3N nodes working together towards a common goal. Many services will require redundancy. For example, the purpose of a storage node group would be to provide storage capabilities for some user(s) of the C3N ecosystem. Redundancy will be required, which means multiple nodes are required. There is security in having multiple backup nodes located in geographically separated locations.

C3N Node—Leader Election

In at least one embodiment of the present disclosure, systems and methods for coordinating work in a distributed environment are described herein.

Node owner: C3N members that own and manage C3N producer nodes that provide compute resources for the C3N ecosystem. Example: nodes that provide VPN service.

Leader: The node in a cluster of nodes that tells the other nodes what to do. Example: the master node in a cluster of C3N worker nodes providing storage service, i.e., the one that accepts write requests. The other nodes make replica copies of what is originally written on the leader/master node.

Depending on the task, a number of nodes will be required. In at least one embodiment of the present disclosure, the C3N system will allow node owners to select their own nodes as the members of a node group. This makes sense when, for example, a node-owner is configuring a set of on-premises nodes. Other times, the C3N ecosystem will add member nodes based on availability and geographic location, etc.

In at least one embodiment of the present disclosure, a leader of the node group aka "cluster" will be required, for example, in a storage node group to be the master node, where data is initially written. The other nodes can store copies of all the files in the master/leader node.

In at least one embodiment of the present disclosure, the rules for C3N node leader election are as follows:

As soon as the members of the node group are selected, the nodes will be ordered based on their C3N score. The node with the highest C3N score will be the leader.

In case there are multiple nodes with the same C3N score, the node with the earliest created_at timestamp will be selected as the leader.

In the extremely rare case of multiple nodes with the same created_at timestamp, a leader with the lowest MAC address will be selected as the leader.

All nodes are given the C3N scores of the other nodes. If there are any ties, the nodes with equal C3N scores will share their created_at timestamp; the earliest timestamp wins.

At initialization time, and at every time period T1, each non-leader node will communicate with the leader node with a handshake, "hi", to verify the leader is alive. The leader will wait for a period of time T2 for each non-leader to communicate.

If the leader does not receive a message from node-2, then the leader will communicate with other member nodes, "seen node-2?". If any nodes return "yes", then leader will retry with a "hi" message to node-2. If the leader has received messages from more than the minimum_viable_quorum number then the leader will request that the C3N ecosystem provide another node to replace node-2 and will message all other nodes to message "you've been dropped" to node-2 and will cease to communicate with node-2.

When all non-member nodes respond to the leader's "hi" message, the leader will continue operations as normal as the master node for the cluster.

When any new node is added to the cluster, it will send it's C3N score to all the other nodes in the network with a "just joined" message and all the nodes will respond with a "welcome" message and their C3N score values. If there are any ties, the nodes with equal C3N scores will share their created_at timestamp; the earliest timestamp wins.

This distributed leader election algorithm helps ensure that the most trusted C3N node is always the leader.

Leader nodes will be compensated with digital assets, for example, in the form of fungible tokens, for serving the C3N ecosystem as the leader node in its cluster, thereby incentivizing nodes to increase their reputation/C3N score. Tokens may be represented by the symbol ' Ⓣ '.

Unified App for Managing Social Media Interactions Across Platforms

Systems and methods for using a single app to manage all social media interactions are described herein.

In at least one embodiment of the present disclosure, C3N will provide a list of different types of social media apps, appealing to different demographics: Friends/Family (like Facebook), Business (like LinkedIn), Ideas (like Twitter), Photos/Videos (ranging from Instagram/Pintrest/TikTok)

A user might select two modes: Friends/Family and Business. Modes can also be considered "apps" (that all run under the single C3N app context.)

Business mode differs from Personal mode. A user's friends are now called contacts. The lists of a user's friends is separate and distinct from the list of work contacts. When a user add a friend, the user can indicate the relation (family, friend, acquaintance) for work the user would indicate the contact's company, role and title.

The user can create "groups" of apps. For example a "business" group and a "personal" group.

Each app has a separate list of users, but C3N provides sync capabilities. The user may decide they only want to maintain two lists: A business list of contacts and a personal list of friends. The Business and Ideas apps can share the same list. Add a user to the LinkedIn-like app and that user can be auto-sync'd to the Twitter-like app. Similarly, if the user has both the Facebook-like and TikTok-like apps enabled, when a user is added to the FB-like app that user can be sync'd to the TikTok app, automatically or auto-with a confirmation, "Do you want to sync this user to all your personal apps? Yes/No"

Groups, Events and Blogs behave similarly in all apps, but they have separate data sets. C3N will allow users to auto-synchronize data in those data sets, similar to the auto-sync feature between users in different apps.

Some things are different, e.g., shops exist in personal apps, whereas companies exist in business apps.

Some apps have app-specific features, e.g., Job Market (where Employers post jobs and Candidates post their resumes) exists in the business app, but not in personal apps. In the LinkedIn-like business app, users can create a Resume page that is easily shared with prospective employers.

After the user registers, they will be presented with a step-by-step "wizard" app that will allow them to select which application profiles they want to use: Facebook, Twitter, LinkedIn, TikTok, and so forth, and they will be able to group the apps one-for-one or many-to-one.

For example, if the user selects LinkedIn and Twitter and groups them together under the C3N "Business" app, C3N will combine the capabilities of LinkedIn and Twitter into a single "app". When the user submits a post in their Business app, all users that are using the LinkedIn and/or Twitter apps will be able to see their posts.

An extreme example would be where the user selects all the available apps and groups them under a single app group. On the other extreme, the user can select all the available apps and not create any app groups. When more than three app selections are configured, the app icon in the top left will become a hamburger menu icon and the user must single tap (mobile) or single-click (desktop) the menu, which will present the list of apps from which the user can select an app.

In at least one embodiment of the present disclosure, under the hood, the C3N social media app will implement nearly every feature of all existing social media and social networking apps, starting with Twitter, then Facebook. Eventually, all app features will be implemented. See feature road map for details.

Since C3N will be a single app, there will be no duplication of logic. For example, users can create posts with photos and videos and text using Facebook, LinkedIn and Twitter, but those are three separate apps, all with their own unique tech stack. The C3N design is modular: the CreatePost feature in it's Facebook-like app will be the same implementation for the CreatePost feature in it's Twitter-like app, only with a few configuration differences, that slightly modify the behavior/appearance of that feature in each app. For example, the Facebook-like app Post might allow the user to enter 25,000 characters, where as the Twitter-like app may limit that text to 300 characters.

In at least one embodiment of the present disclosure, C3N will allow the user to create separate icons for each subapp and interact with them as though they are separate apps, but in reality there will be one social media app with different features and look/feel.

Figure 12:
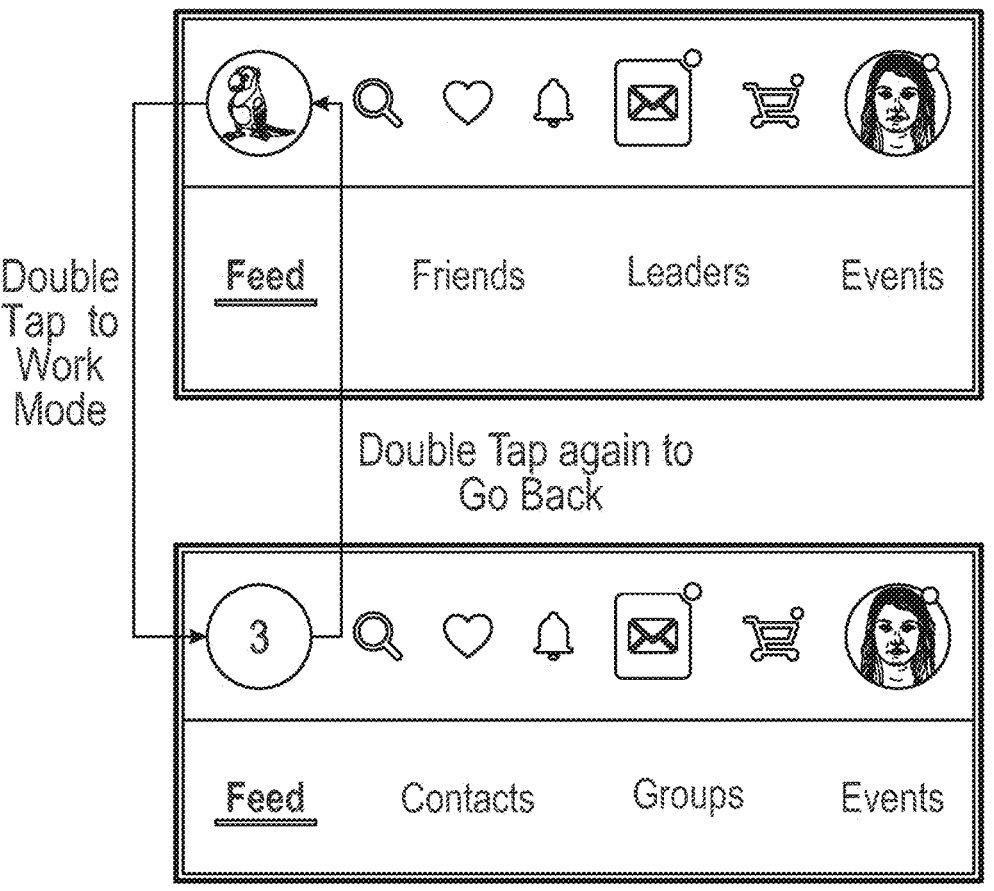
FIG. 12 depicts a graphical interface in which users can alternate between modes on a sub-app, according to at least one embodiment of the present disclosure.

FIG. 12 depicts a graphical interface in which users can alternate between modes by double tapping (on mobile phones) or double-clicking (on desktops/laptops) the logo in the top left of the screen.

In at least one embodiment of the present disclosure, there will be only one Progressive Web App (PWA) app for the user to install. This is novel since currently, users must install different apps for each mode/app, e.g., Facebook, LinkedIn, Twitter v. only one C3N app that provides all app types via a double tap.

Multi-Function, Pluggable, Sharable, Lean Tech Stack

Figure 13:
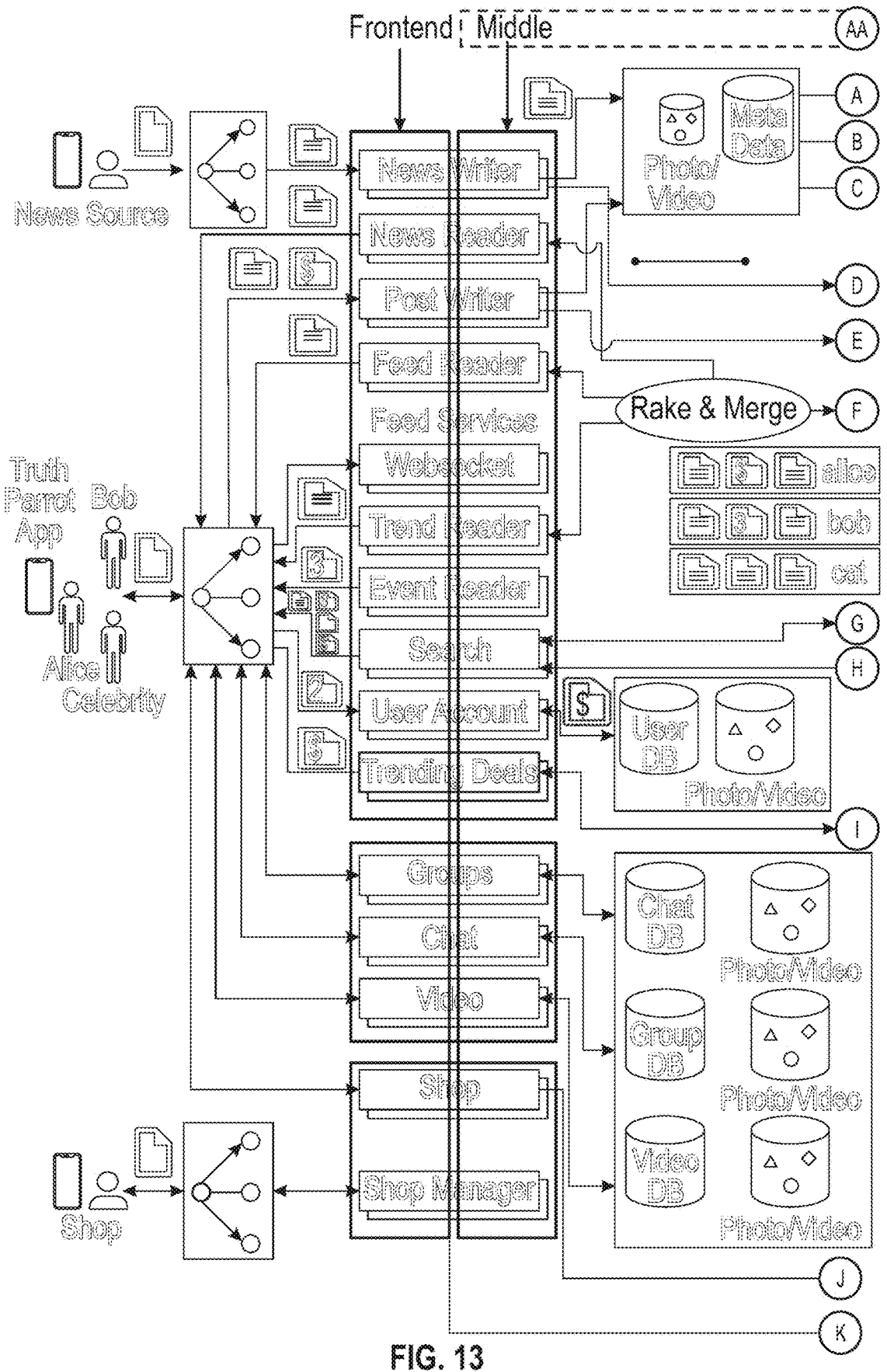
FIG. 13 illustrates an architectural design in which sub-apps are implemented using a shared stack, according to at least one embodiment of the present disclosure.
Figure 13:
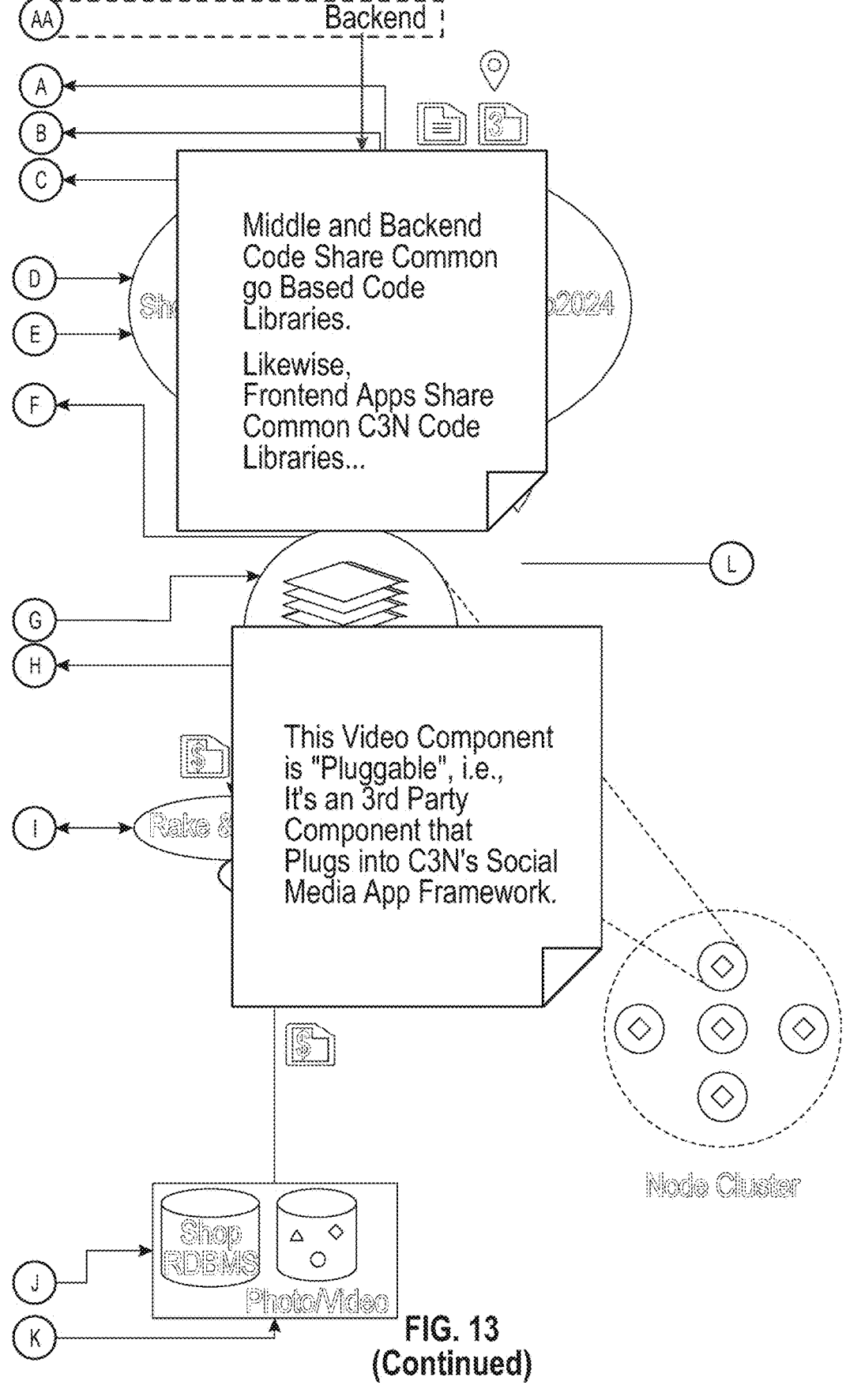

FIG. 13 illustrates an architectural design in which sub-apps are implemented using a shared stack.

In at least one embodiment of the present disclosure, all C3N social media (sub) apps will share the same tech stacks. The Facebook-like and Twitter-like social media apps are examples of "sub-apps".

In at least one embodiment of the present disclosure, the front-end side of the apps will use the same Javascript libraries and the same CSS framework and share other common assets, e.g., images. That way, when an improvement is made to one app, e.g., the News Reader, the re-usable parts of the improvement will be shared with the other apps, e.g., Post Reader, Trend Reader, etc. This gives C3N a huge advantage over the current, heterogeneous tech stacks of all the different social media and social networking apps.

In at least one embodiment of the present disclosure, C3N's social media middle and backend components are modular and will share common Go (golang) based components. Component-based design allows C3N's development to scale efficiently, with much code reuse. When Facebook and Twitter add a feature, there are two separate Social media and social networking development teams, two separate tech stacks, two separate, heterogeneous sets of development, test, user acceptance testing and production environments, all requiring differing specialties to support all the different technology choices.

In at least one embodiment of the present disclosure, all middle and backend components are as lightweight as possible, capable of being deployed in a distributed grid computing environment on low powered compute devices. Initially, the C3N social media framework will be deployed to the C3N cloud. A future iteration will be able to run completely in an unstoppable distributed grid deployment architecture.

C3N Web Proxy and VPN Service

Figure 14:
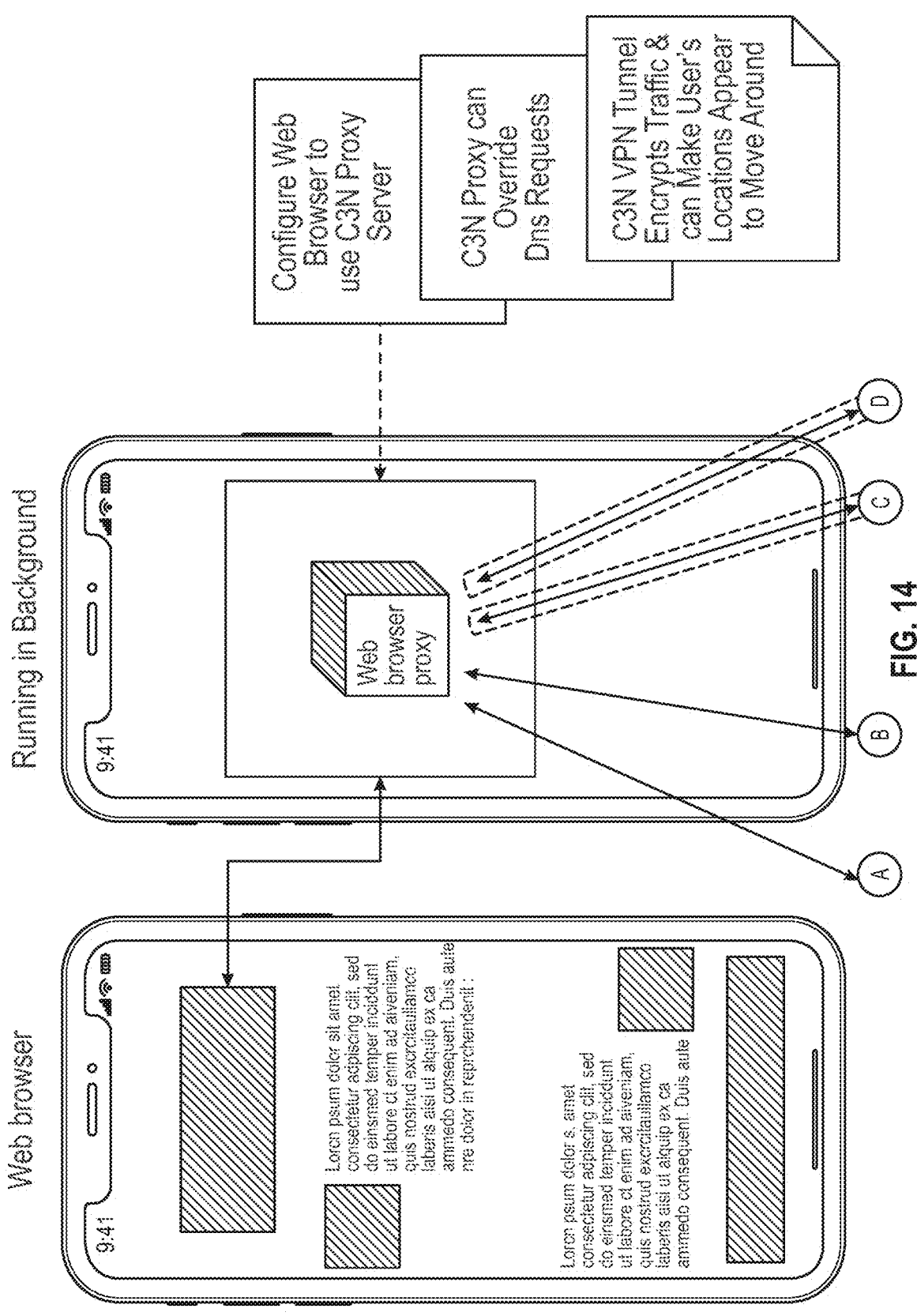
FIG. 14 depicts a web browser proxy that can be utilized to provide VPN services for C3N users, according to at least one embodiment of the present disclosure.
Figure 14:
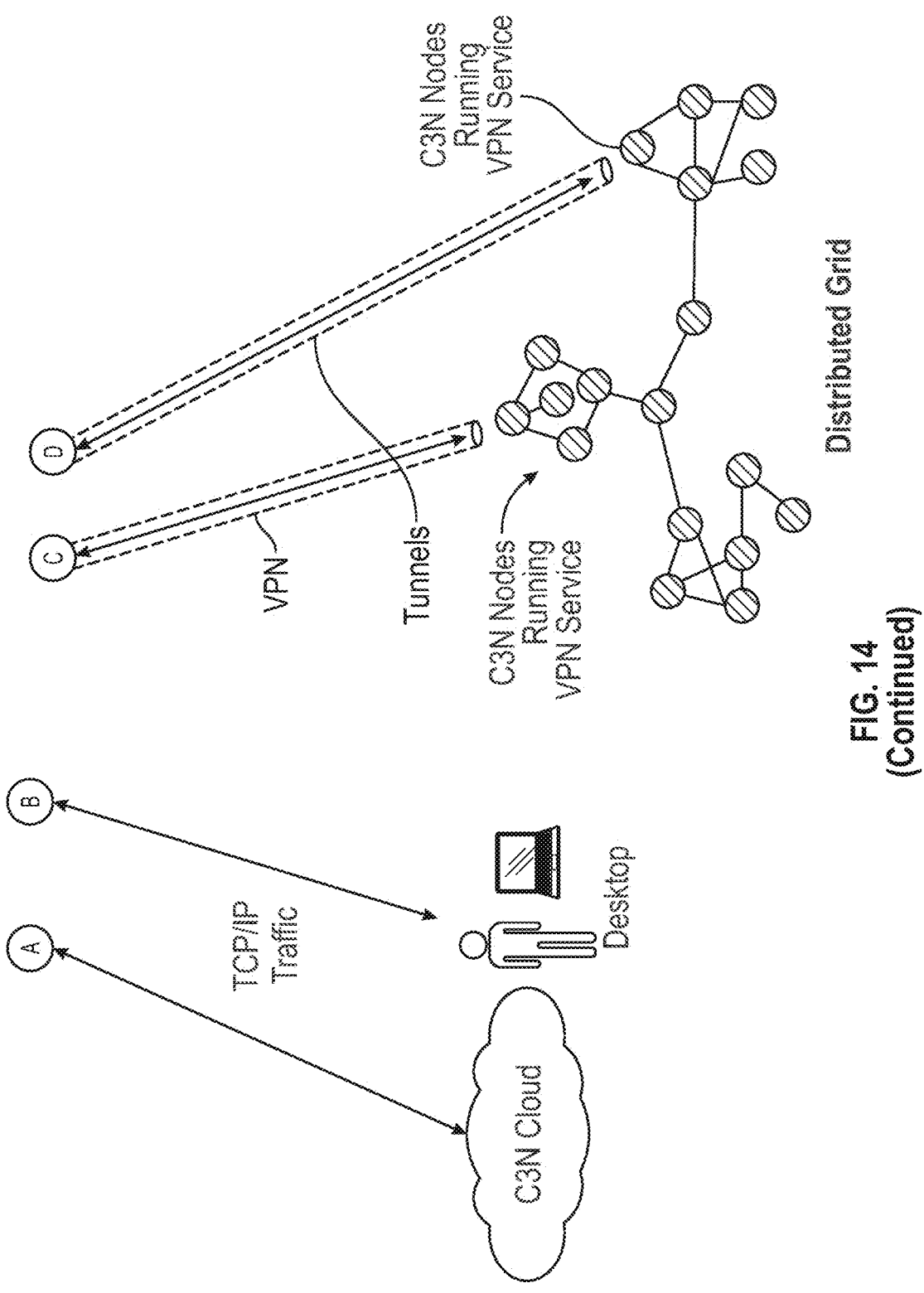

FIG. 14 depicts a web browser proxy that can be utilized to provide VPN services for C3N users.

System and methods for providing VPN service for C3N users are described herein.

In at least one embodiment of the present disclosure, one of the C3N container-based services deployed to the user's device will be the C3N web browser proxy server. In order to benefit from the services of the C3N proxy server, the user's web browser must be configured to use this proxy server.

The Web Browser Proxy and VPN services provide unparalleled privacy and security. Whereas other proxy and VPN services require that traffic be routed through a 3rd party data center, C3N's solution runs completely within the C3N ecosystem.

Proxies as described herein may be discussed in greater detail below, in connection with the disclosures relating to C3N email app.

No longer must users worry about whether they can trust the VPN server through which their internet traffic flows. The C3N user will be able to configure the minimum C3N Score of the VPN node(s) that they use to cloak their web traffic. The C3N user can select a geographic area where they'd like to appear. Additionally, they'll be able to select "move around" to tell the C3N proxy to automatically and periodically change their endpoint location, i.e., the C3N nodes running the VPN service at the other end of their VPN tunnel.

C3N Wireless Networking and Chat App

In at least one embodiment of the present disclosure, systems and methods for communication across various distances between C3N users in a network are described herein.

In at least one embodiment of the present disclosure, C3N nodes can be connected via the public internet, typically via ethernet or wifi, or via the C3N wireless network. We'll focus on the C3N wireless network. C3N node devices equipped with wireless equipment connect to form a mesh network (1).

In at least one embodiment of the present disclosure, by default, C3N nodes do not automatically scan the vicinity for other nodes. This serves to retain privacy and conserve battery power. Node scanning can be performed as needed by foreground C3N apps in order to perform their communication functions properly.

In at least one embodiment of the present disclosure, in the absence of a wifi (or if the C3N user removed their phone's SIM chip for reasons of privacy), with the C3N transceiver connected via the phone's USB-C connector, Alice and Bob (below) can communicate with each other and can even bridge C3N network clusters that would otherwise be too far apart to connect. (2)

In at least one embodiment of the present disclosure, since the bandwidth over the wireless connection is limited, C3N will determine which apps are available for use over the C3N wireless "grid" network. This may be made obvious by disabling apps on the C3N node that are not connectable and enabling those that are. For example, when using a smart phone, tapping an app that is not C3N wireless-capable may display a notification informing the user, "This app is not C3N wireless network capable".

Note that this grid can serve as an alternate network in case the internet becomes unavailable. As long as there are devices within the minimum range, the C3N network could stretch the length of the US.

Figure 15:
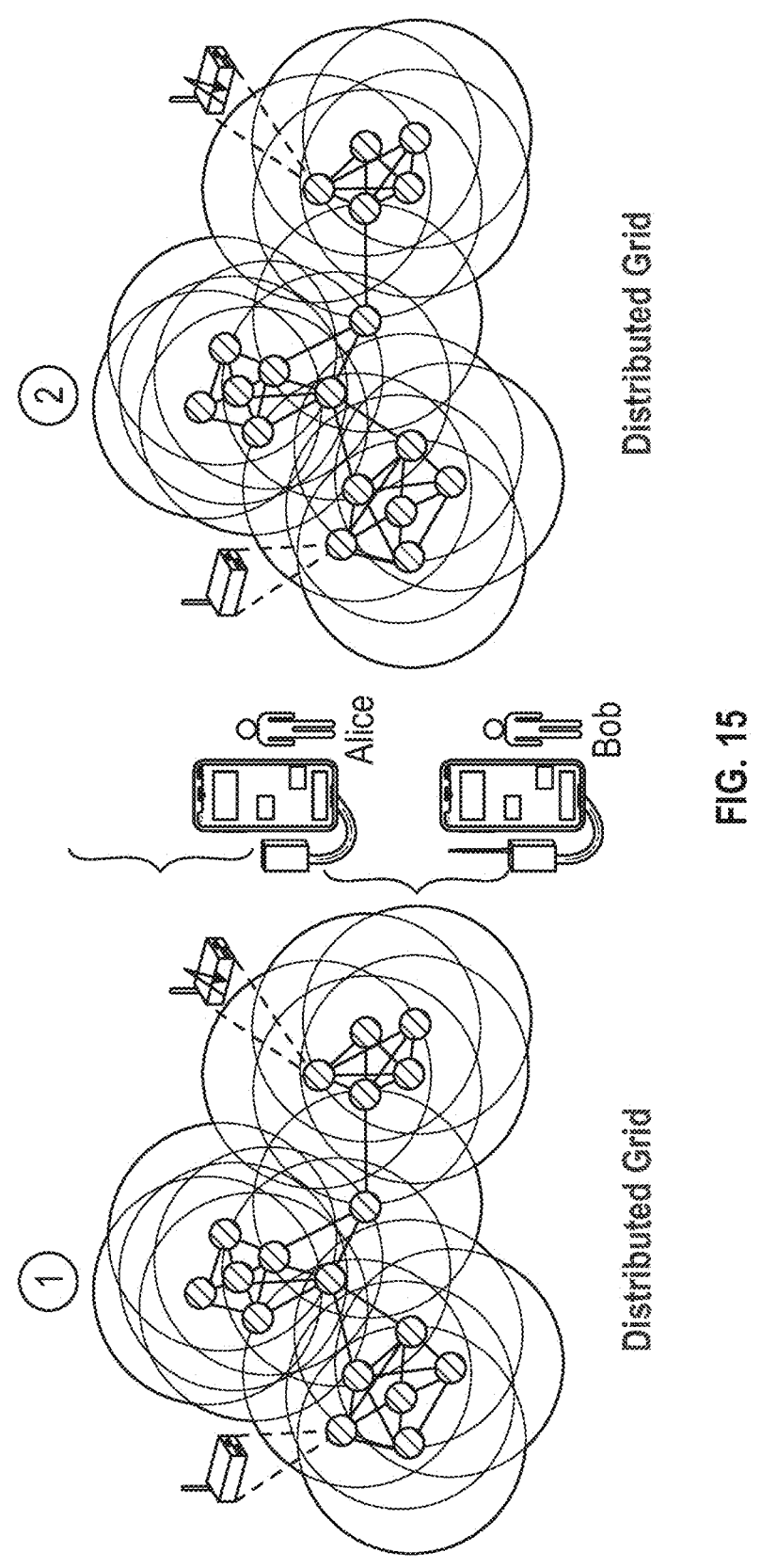
FIG. 15 depicts two C3N distributed networks that are bridged using a wireless transceiver, according to at least one embodiment of the present disclosure.

FIG. 15 depicts two C3N distributed networks that are bridged using a wireless transceiver.

As depicted in FIG. 15, two separate C3N distributed networks are bridged by Alice's C3N wireless transceiver (2). Wireless transceivers can communicate to any node in the C3N network that is equipped with a wireless communication transceiver. The current long distance range varies based on obstructions in between the nodes and ranges from about 0.5 kilometer to over 100 kilometers on Earth.

In at least one embodiment of the present disclosure, when equipped with a specialized antenna, C3N wireless nodes can communicate with Low Earth orbit satellites.

Figure 16:
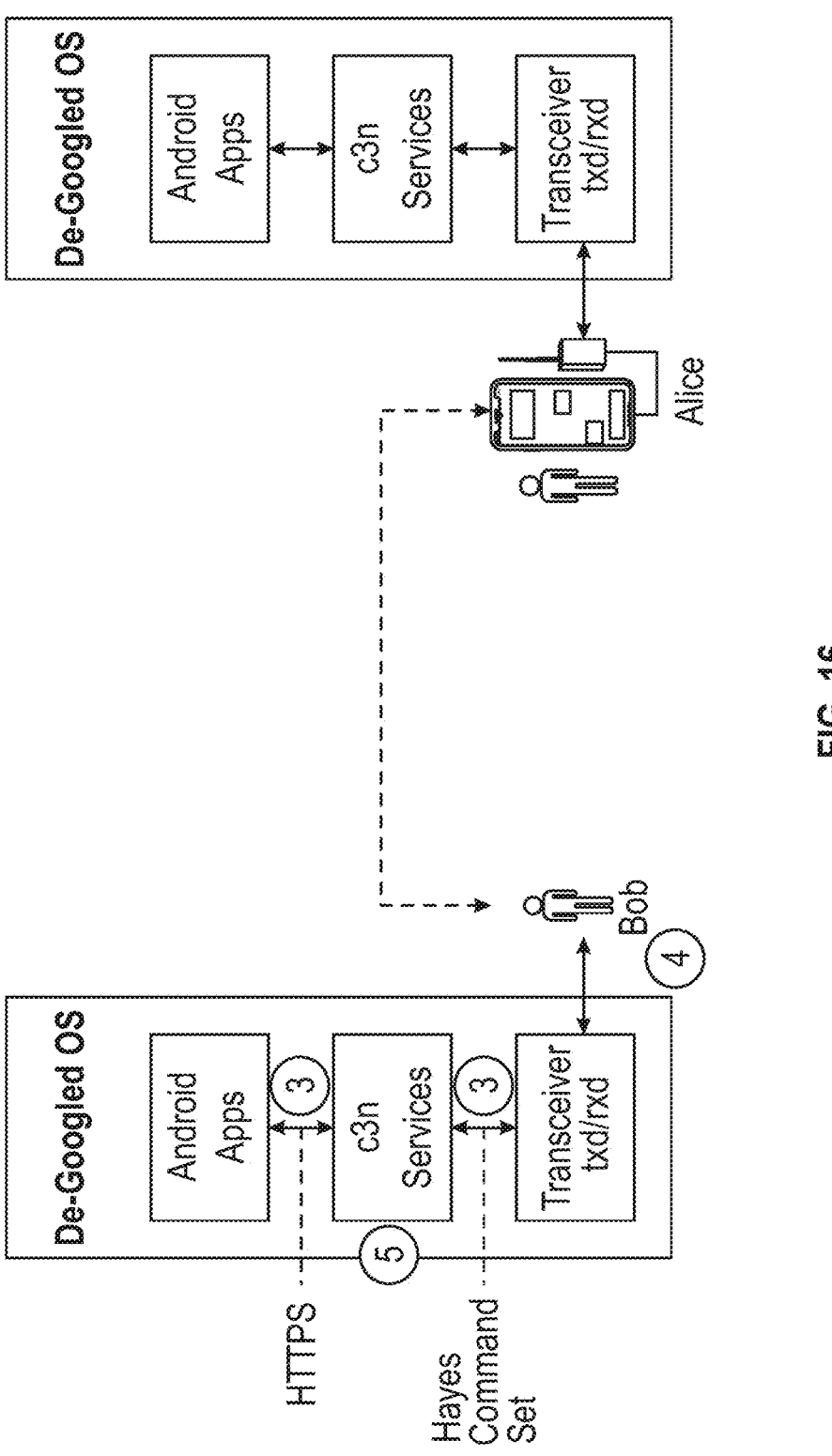
FIG. 16 depicts a network stack for C3N wireless communications, according to at least one embodiment of the present disclosure.

FIG. 16 depicts a network stack for C3N wireless communications.

In at least one embodiment of the present disclosure, the diagram below illustrates the architecture, command and data flow (3) between the components in the C3N users' smart phone that enables users to communicate with other C3N users using the C3N wireless network.

A novel aspect of the present disclosure includes the way in which the software in the cell phone is configured, leveraging C3N container-based services, to bridge not only networks, but also Android apps to the wireless network.

Note that any C3N node that is equipped with a C3N transceiver (4), its associated firmware and C3N services that understand how to send (txd) and receive (rxd) messages (5) can join in C3N wireless communication.

C3N Wireless Chat App

Figure 17:
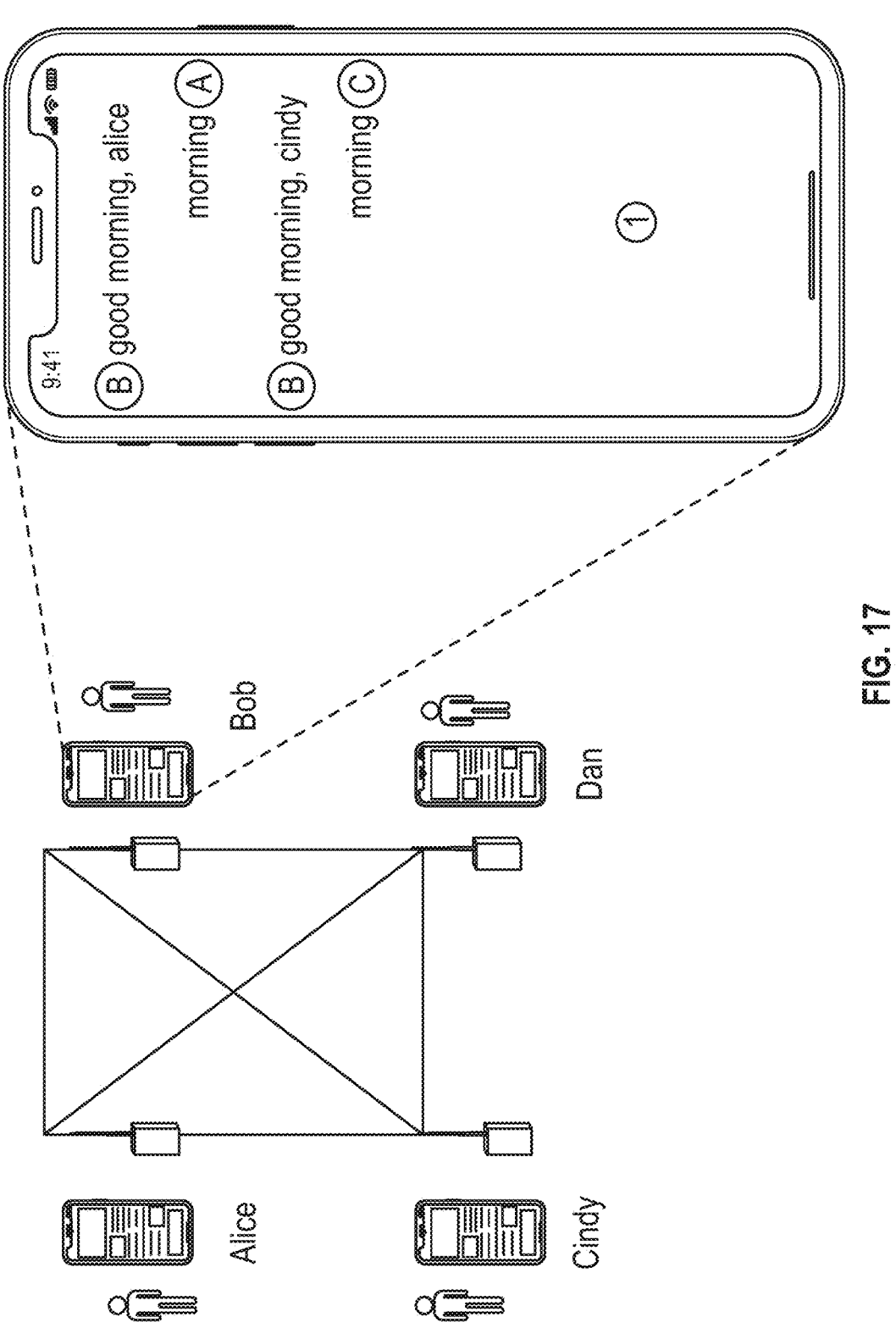
FIG. 17 depicts a C3N wireless chat app that uses the C3N wireless network to connect users, according to at least one embodiment of the present disclosure.

FIG. 17 depicts a C3N wireless chat app that uses the C3N wireless network to connect users.

As an example, consider the following C3N Wireless Chat app that uses the architecture described above to enable C3N users to chat with each other over the C3N wireless network.

In the example above, when four C3N users move within range of their wireless transceivers and they open the C3N wireless capable chat app on their smart phones, the C3N nodes begin communicating and soon create a fully meshed network.

Before attempting completely wireless communication, each person, alice, bob, cindy and dan, must authenticate to the C3N authentication service. The local c3n auth service will stores a 7 day ticket that it receives from the C3N auth service and securely stores it on the cell phone.

Figure 18:
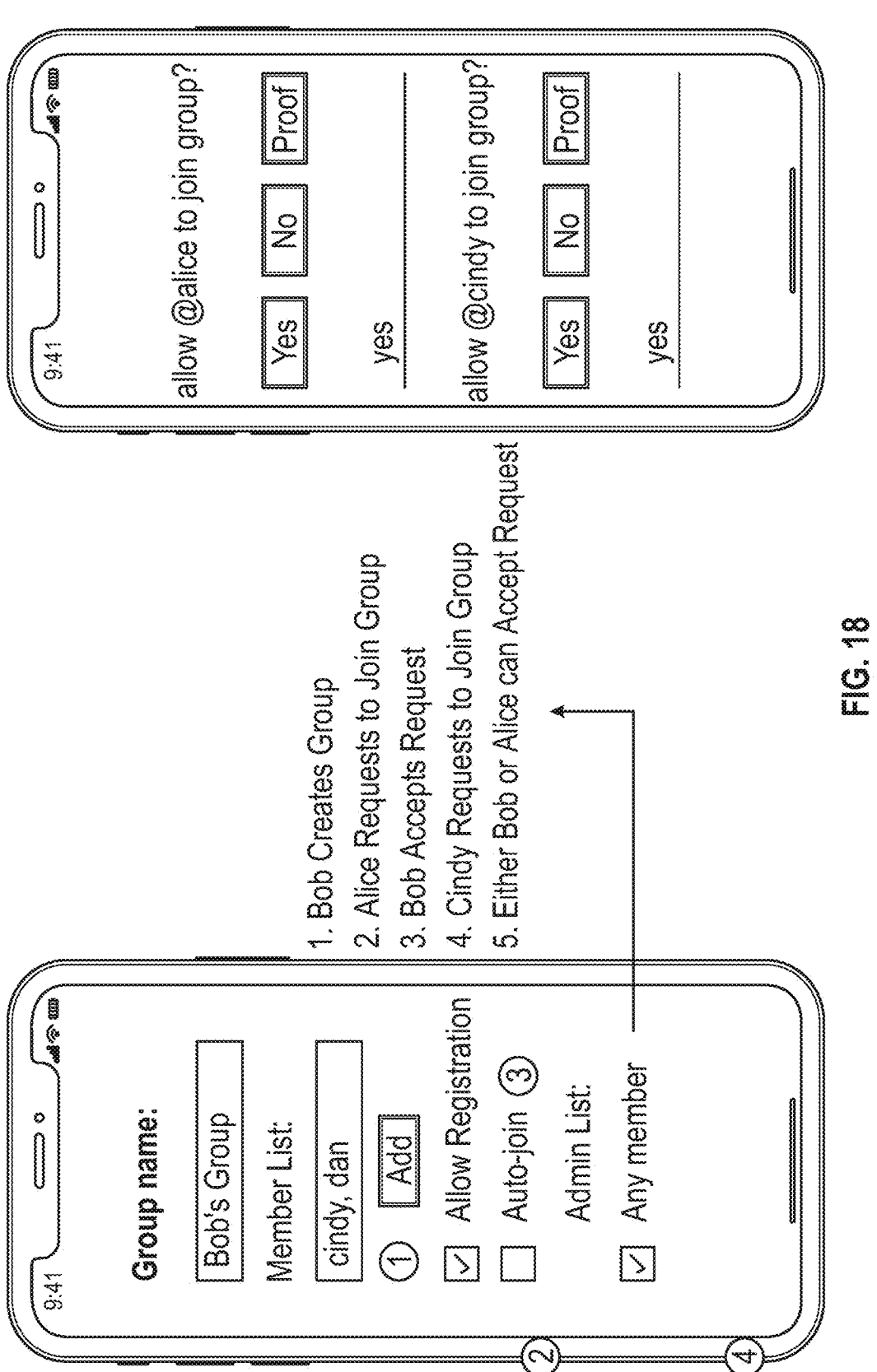
FIG. 18 depicts a graphical interface in which a C3N user is able to create a chat group in the C3N wireless chat app, according to at least one embodiment of the present disclosure.

FIG. 18 depicts a graphical interface in which a C3N user is able to create a chat group in the C3N wireless chat app.

Bob opens up the C3N wireless chat app and creates a chat group that he names, "Bob's Group".

Bob added Cindy and Dan by clicking the <Add> button. (1) Cindy and Dan allowed their accounts to be searchable by other C3N members in their network of friends.

Since the Allow Registration checkbox is checked (2), Alice is allowed to request to join Bob's Group. If Auto-join (3) were clicked, then any C3N member within range, that is configured to auto-join networks, would automatically appear in the C3N chat app as members when they are in range.

Since the Any member checkbox is checked (4), any C3N member that has joined the group will receive the "allow @alice to join group?" question and be able to allow Alice into the group.

FIG. 19 depicts establishing a connection with a C3N network to facilitate wireless group chat capabilities.

Alice moves within range of Bob's location and joins the network as depicted in FIG. 19 at (5).

Figure 20:
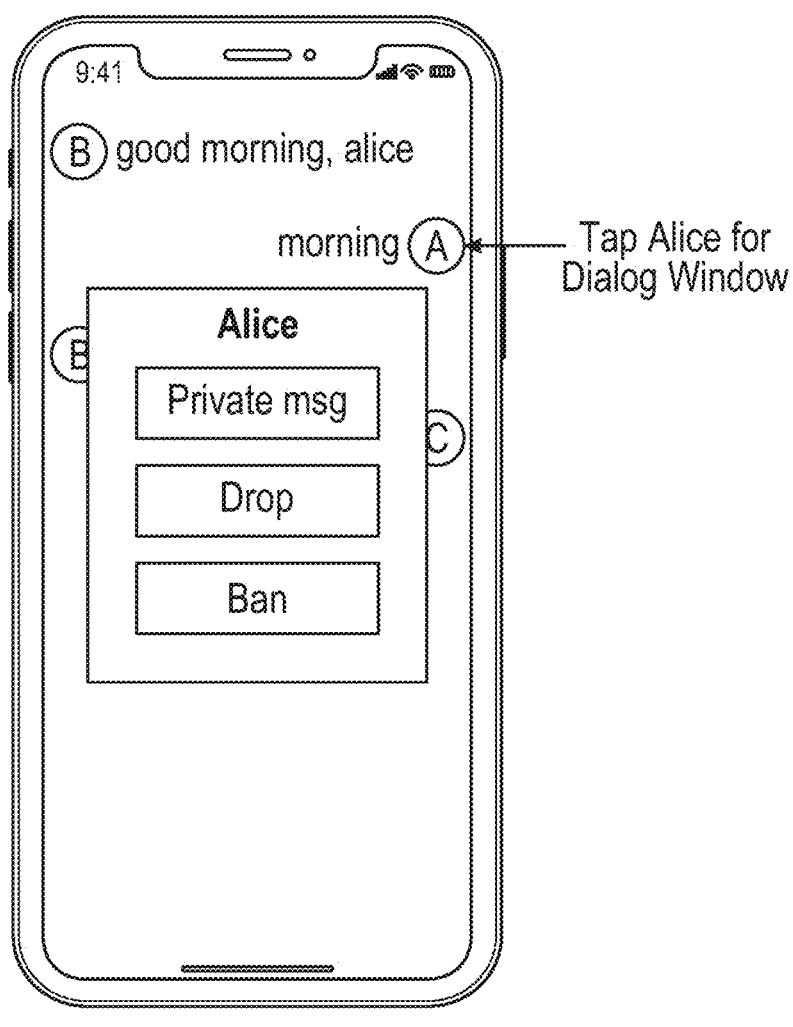
FIG. 20 depicts admin management capabilities in a C3N wireless chat app, according to at least one embodiment of the present disclosure.

FIG. 20 depicts admin management capabilities in a C3N wireless chat app.

Bob, as an admin can tap another user's icon, e.g., the circled "A", for Alice to cause a dialog appear with the options of sending her a private message, dropping her from the group or banning her, which drops her and prevents her from requesting to join the group again. In version 1, if Bob accidentally bans a user, e.g., Alice, he must recreate the group to allow her back into the group.

Non-admin users will only get the option to private message other users

Requesting Proof

Figure 21:
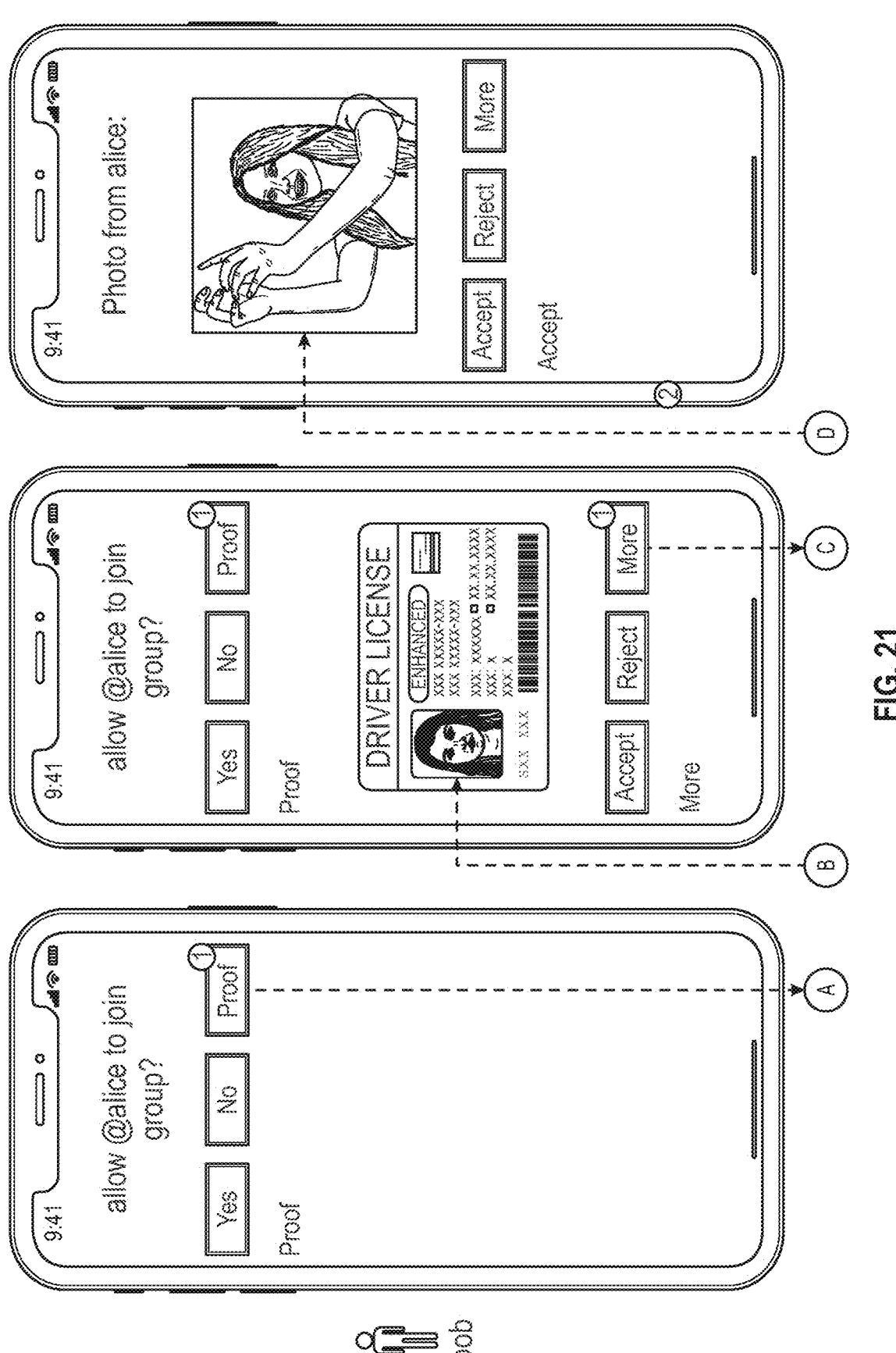
FIG. 21 depicts a request to verify identity prior to granting access to a C3N wireless chat group, according to at least one embodiment of the present disclosure.
Figure 21:
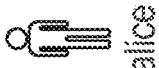

FIG. 21 depicts a request to verify identity prior to granting access to a C3N wireless chat group. As seen in FIG. 21, Bob can requests Alice to provide proof (1) of who she is before allowing (2) her to join the group.

Models of Mobile C3N Wireless Transceivers

Figure 22:
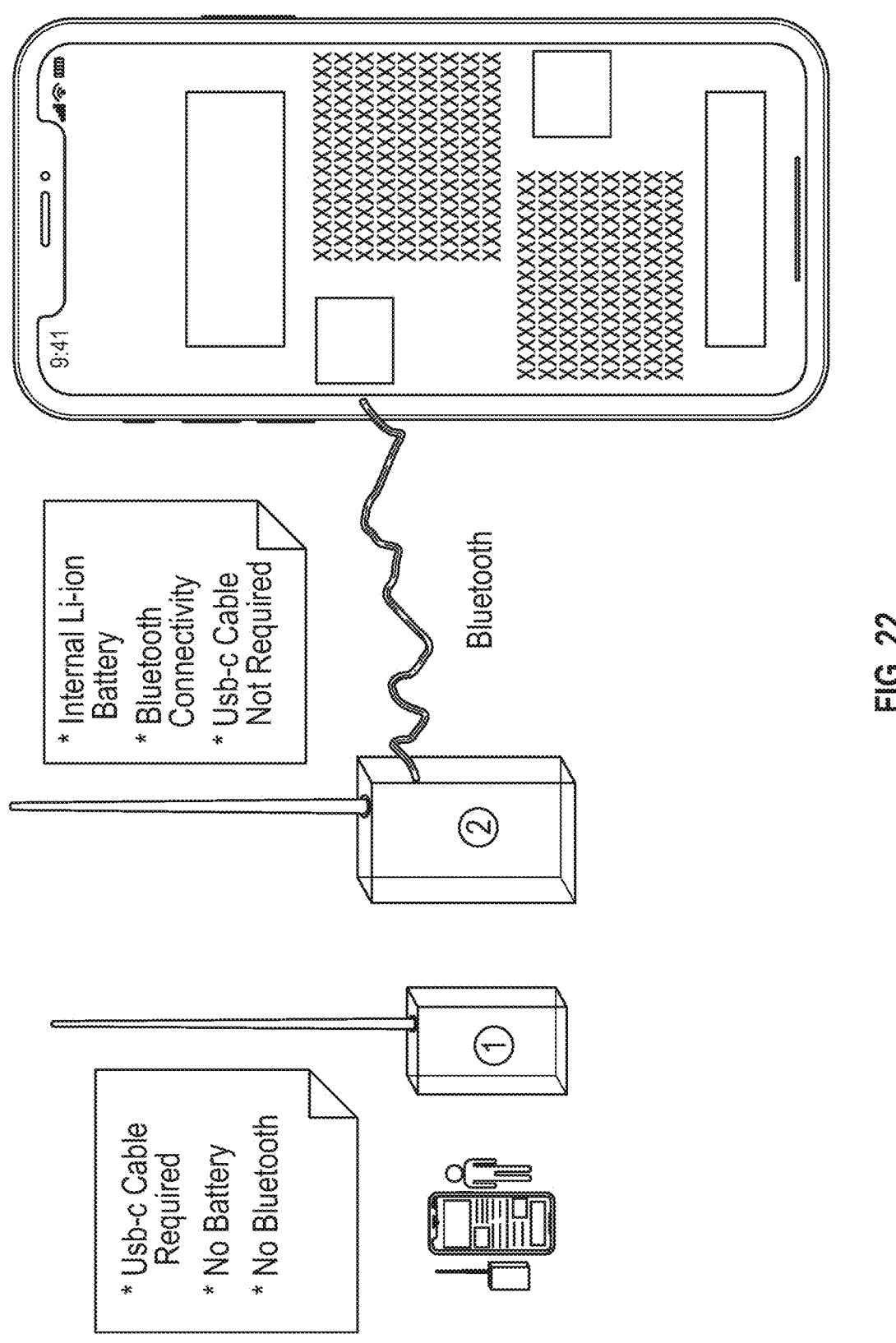
FIG. 22 depicts C3N wired and wireless transceiver models, according to at least one embodiment of the present disclosure.

FIG. 22 depicts C3N wired and wireless transceiver models.

In at least one embodiment of the present disclosure, C3N transceivers can come in two forms. (1) A smaller USB-C male-to-male cable connected form or (2) a Bluetooth Low Energy (BLE) form. The version supporting wireless BLE connectivity between the C3N transceiver and the mobile phone is slightly larger because it requires additional components and an internal battery. The USB-C only version provides both power and connectivity between the phone and C3N transceiver via the USB-C cable.

In at least one embodiment of the present disclosure, the cell phone must be a De-Googled Android phone with the C3N Services, and should have a C3N wireless app, e.g., C3N Chat App, installed.

C3N Identity Blockchain and User Registration

Figure 23:
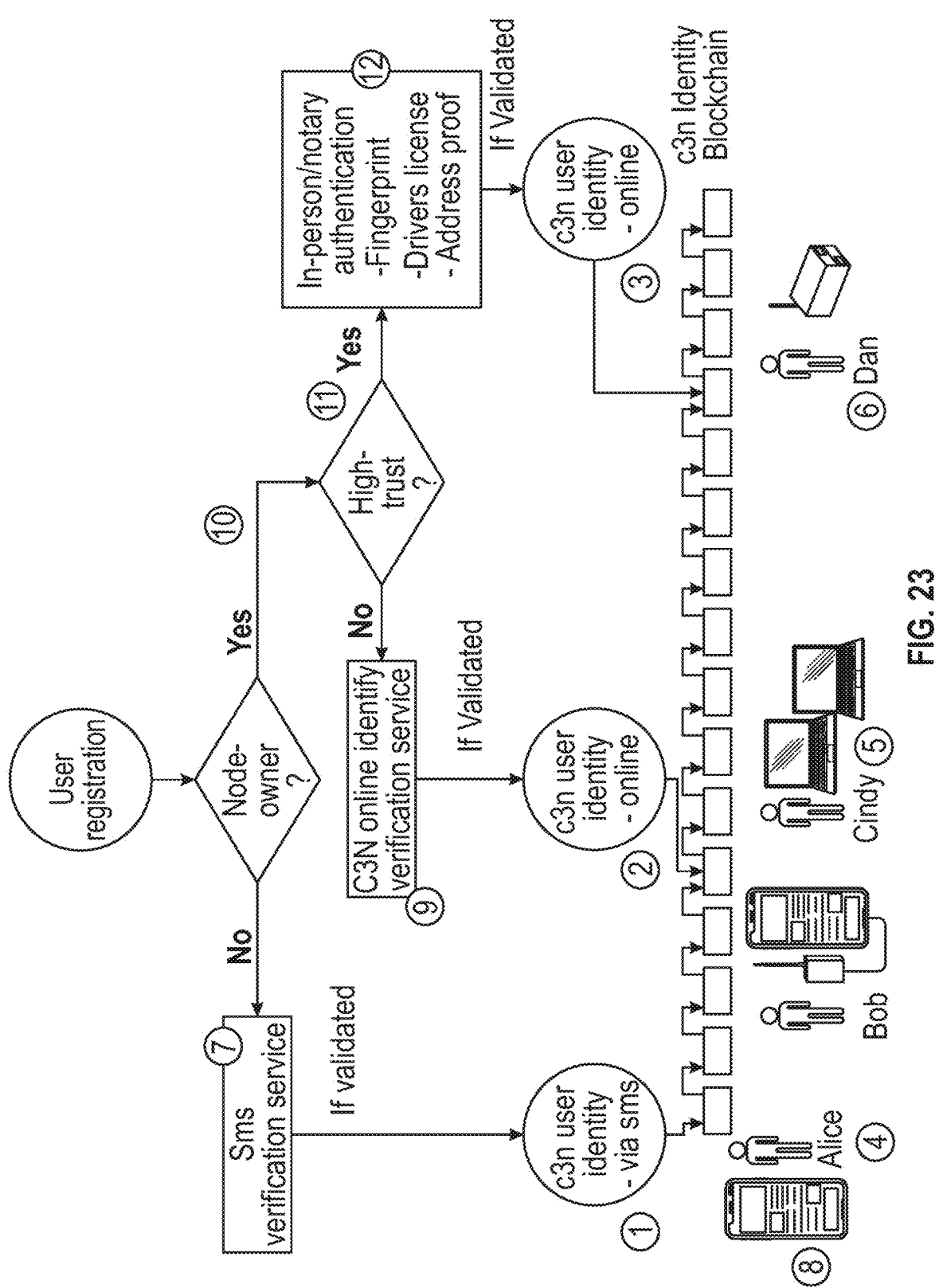
FIG. 23 depicts a flowchart for C3N identity blockchain and user registration, according to at least one embodiment of the present disclosure.

FIG. 23 depicts a flowchart for C3N identity blockchain and user registration. In at least one embodiment of the present disclosure, systems and methods for user registration for a multi paradigm deployment scenario to cloud/centralized, on-premises and distributed grid environments are described herein.

In at least one embodiment of the present disclosure, C3N user registration services allows for elevated security measures depending on the role and trust level required. Users that operate only as consumers can opt to use SMS for their multi-factor authentication (MFA) mechanism. Producers, i.e., "node-owners", i.e., users that contribute compute resources to the C3N ecosystem must opt to elevate their authentication mechanisms.

The diagram above depicts the C3N user registration process. According to at least one embodiment. C3N users are verified by three means: (1) via SMS, (2) via online identify verification and (3) in-person, where the new C3N user presents identify verification documents and gets finger printed, witnessed and acknowledges by a notary.

Above, Alice and Bob (4) are consumers. Alice uses the C3N social media app and Bob uses the C3N wireless chat app. Consumers can opt to use the C3N SMS Verification Service for user authentication. (The via SMS identity verification process is not different than existing SMS verification services.) When Alice provides her cell phone number to the C3N SMS Verification Service (7), she'll get a text with a 6 digit code and will be prompted to enter that 6 digit code in the C3N SMS Verification Service "SMS Code" input field. (8)

Cindy is a producer. (5) Since Cindy only configured her nodes as "desktop", i.e., "On Premises" deployment and does not provide services for other C3N users, she can use the C3N Online Identity Verification Service (9) to establish her identity. (a) All users must use MFA to authenticate to the C3N ecosystem. Any user can increase their security. They can decrease their security as long as its compliant with C3N user authentication security standards (a-m). Users that are only ever consumers can opt to use SMS for their second factor of authentication for authenticating to the C3N social media or C3N wireless chat app. (b) In at least one embodiment of the present disclosure, all users must register a password during the registration process and use their password during authentication as their first form of authentication. (c) 20 character minimum if at least three of the four available character types: lowercase letters, uppercase letters, numbers, and symbols are used. (d) 40 character minimum if using only the English alphabet. (e) 128 character maximum length. (f) Maximum password age: 180 days. (g) Passwords may not be reused. (h) Plus, new passwords must be least two characters different than any previous password. (i) Since most C3N users will use other public internet apps and services, the use of a password manager is recommended. (k) When the C3N Password Manager becomes available, it will be recommended as it will be tested to work with C3N applications and will integrate with the user's hardware security key and ensure that even if the user's master password, for the user's password manager, is compromised, the rest of the user's passwords will remain secure. C3N will send e-mail notifications prior to password expiry to remind C3N users when it's time to change their passwords. All node-owners (10), including Cindy, must use a hardware security key as their second form of authentication. (1) Node-owners that process high value transactions (11) will be required to perform in-person, notary approved C3N user registration (12) that may include finger printing, physical presentation of the prospective node-owner's state issued drivers license or military ID with photo and proof of residency. (m) Note: The process described above is incomplete. For the rest of the logic, see the User Registration Process subsection under the C3N Email section, later in this document.

C3N Identity Blockchain

Figure 24:
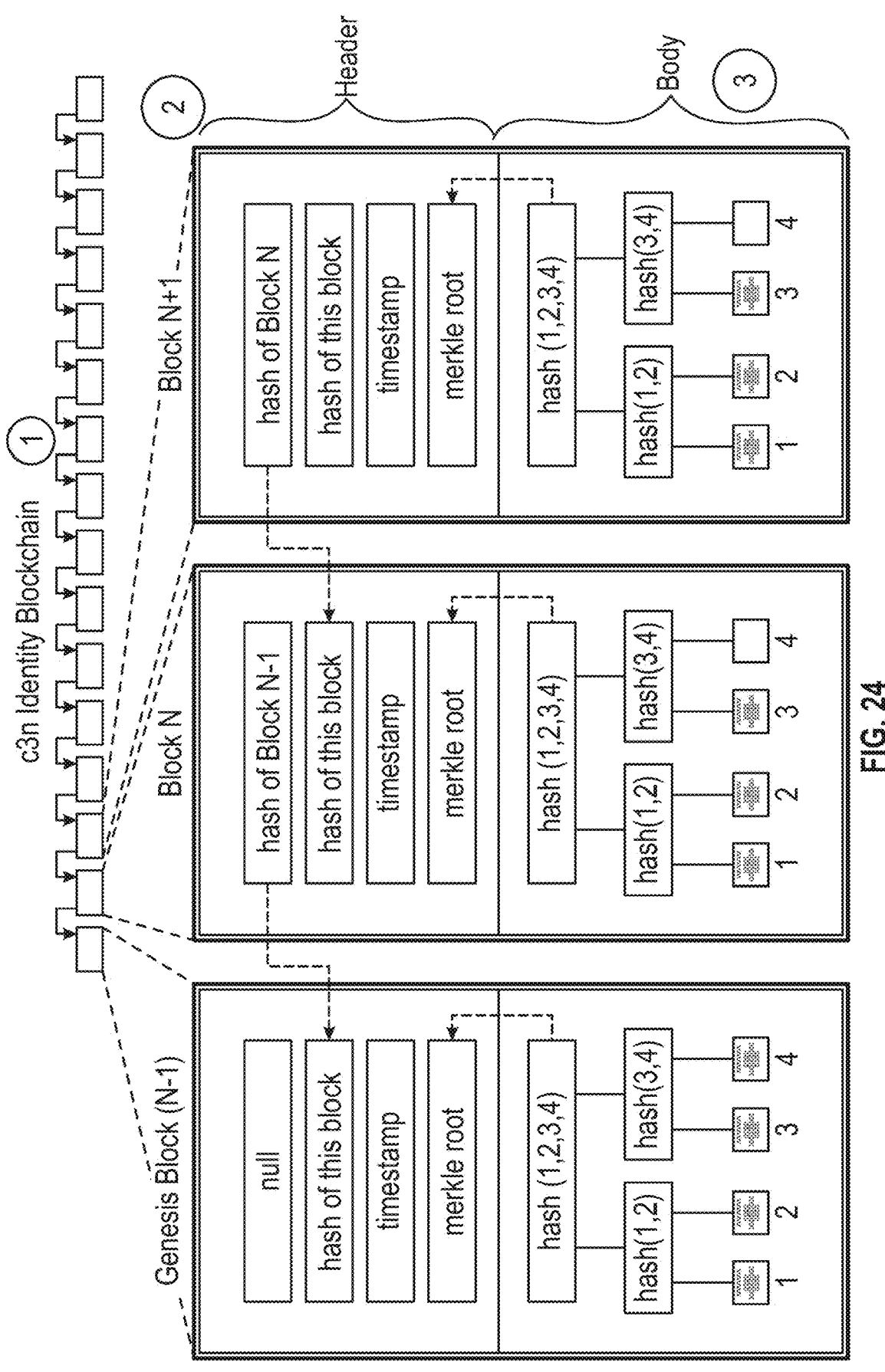
FIG. 24 depicts the contents of various blocks in a C3N identity blockchain, according to at least one embodiment of the present disclosure.

FIG. 24 depicts the contents of various blocks in a C3N identity blockchain. In at least one embodiment of the present disclosure, C3N user identity data is stored on the C3N Identity Blockchain. (1) It is necessary to store identity data on a blockchain in order to support the C3N distributed grid deployment model. This distributed data storage and retrieval method also work for the desktop and cloud deployment models.

In at least one embodiment of the present disclosure, depicted below are the first three blocks of the C3N Identity Blockchain. Each full block contains a HEADER and a BODY.

In at least one embodiment of the present disclosure, The HEADER (2) consists of four fields: 1) the hash of the previous block (that serves to link the blocks together into a blockchain), 2) the hash of the entire contents of the current block 3) the timestamp 4) the Merkle Root (that makes the identity data tamper-proof and validates the integrity of data.)

In at least one embodiment of the present disclosure, The BODY (3) consists of the identity data. (The nodes used to calculate the Merkle Tree below show how the value is computed, but those intermediate hash values are not stored in the block.)

In at least one embodiment of the present disclosure, the C3N Identity Blockchain is formed by "blocks" connected via hash pointers where each block consists of identity data, e.g., name, date of birth, address, etc., and associated images, e.g., drivers license, social security card, etc., that have been validated and approved by a majority of the C3N Identity Storage Service nodes.

FIG. 25 depicts examples of credential data and associated images found in the BODY of a block.

In at least one embodiment of the present disclosure, the data from the certificates and identification cards are stored in searchable text fields.

In at least one embodiment of the present disclosure, as mentioned above in (12) in-person/notary identification, biometric data may be collected and stored in the C3N Identification Blockchain. One major difference between the C3N solution and others is that the biometric data is encrypted using a private key of the C3N user, which means that any access of the user's biometric data requires access to the C3N user's hardware security key. Hence, anytime biometric data is accessed, the C3N user must be present and will be made aware of said access.

Fingerprint Verification Example

Figure 26:
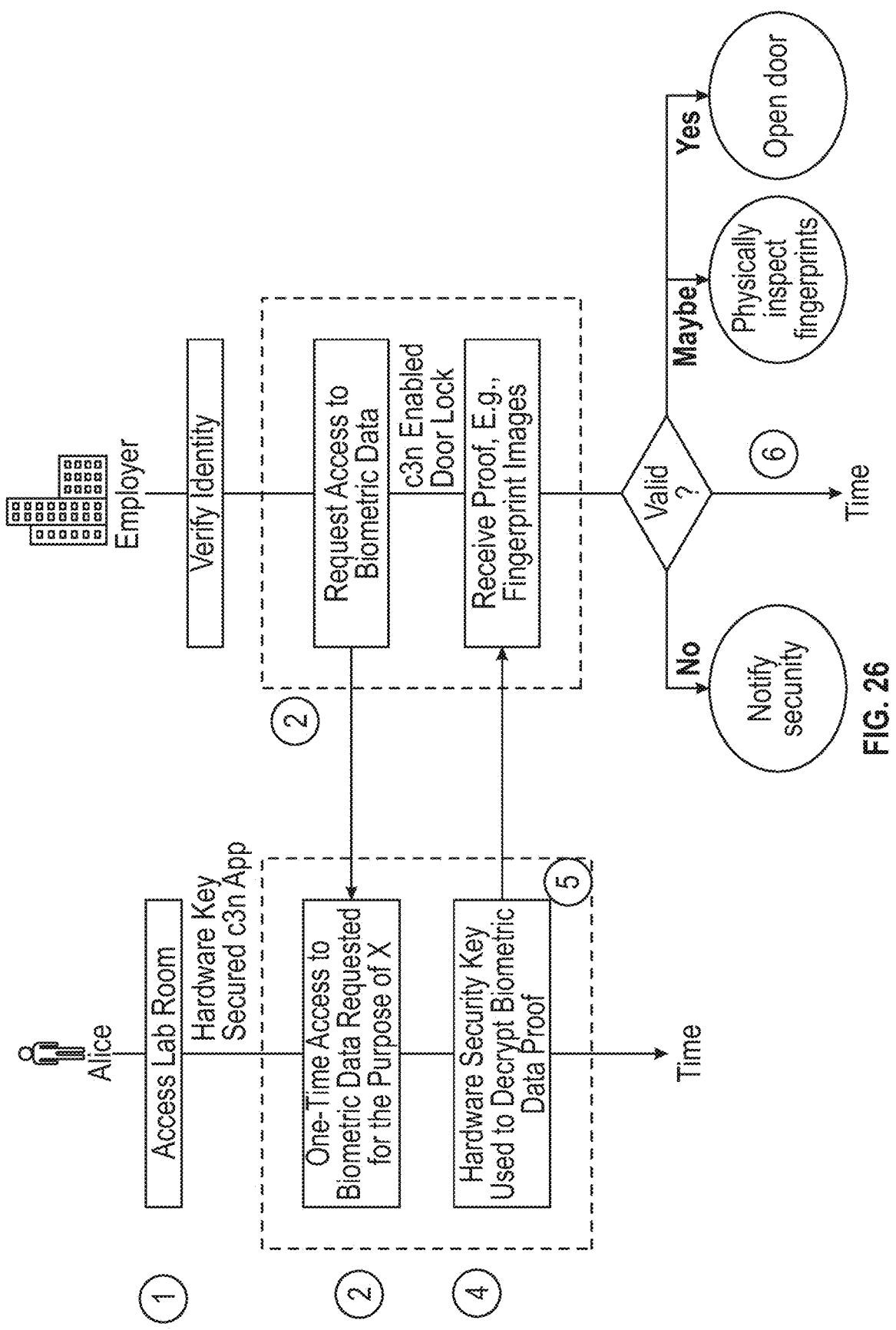
FIG. 26 depicts an example interaction between a credential verifier and a credential holder, according to at least one embodiment of the present disclosure.

FIG. 26 depicts an example interaction between a credential verifier and a credential holder. In at least one embodiment of the present disclosure, FIG. 26, is an example of the interaction between a verifier (Employer) and holder (Alice) of credentials.

Note that in the above example, Alice wishes to enter the lab room (1) at the Employer's facilities. Instead of putting her hands on a physical finger reader, which would increase the risk of the spread of viral infections and force Alice to provide her actual finger prints to the finger reader device, Alice moves her phone within 4 centimeters of the Employer's biometric verification device and allows the biometric verifier device to communicate via Near Field Communication (NFC) to request finger print verification. (2).

Since Alice had pre-enrolled in the Employer's biometric verification data collection process, the Employer will have a copy of Alice's fingerprint stored in its database.

Alice's hardware key secured C3N app will notify her (3) that the biometric verification device is requesting proof of her fingerprints. When Alice presses the button on her hardware security key (4), the C3N app on her smart phone will send her fingerprint image(s) to the C3N enabled door lock. (5) if it's a match, then the door lock can be configured to automatically unlock. If the match is within a range of error, then the Employer can opt to physically inspect Alice's actual finger prints and compare them to what they have on file (6) and optionally also request Alice to provide her C3N fingerprint "proof", i.e., the finger print image(s) that failed to match the Employer's copy and allow a human guard to make the final authentication determination.

College Diploma Example

Figure 27:
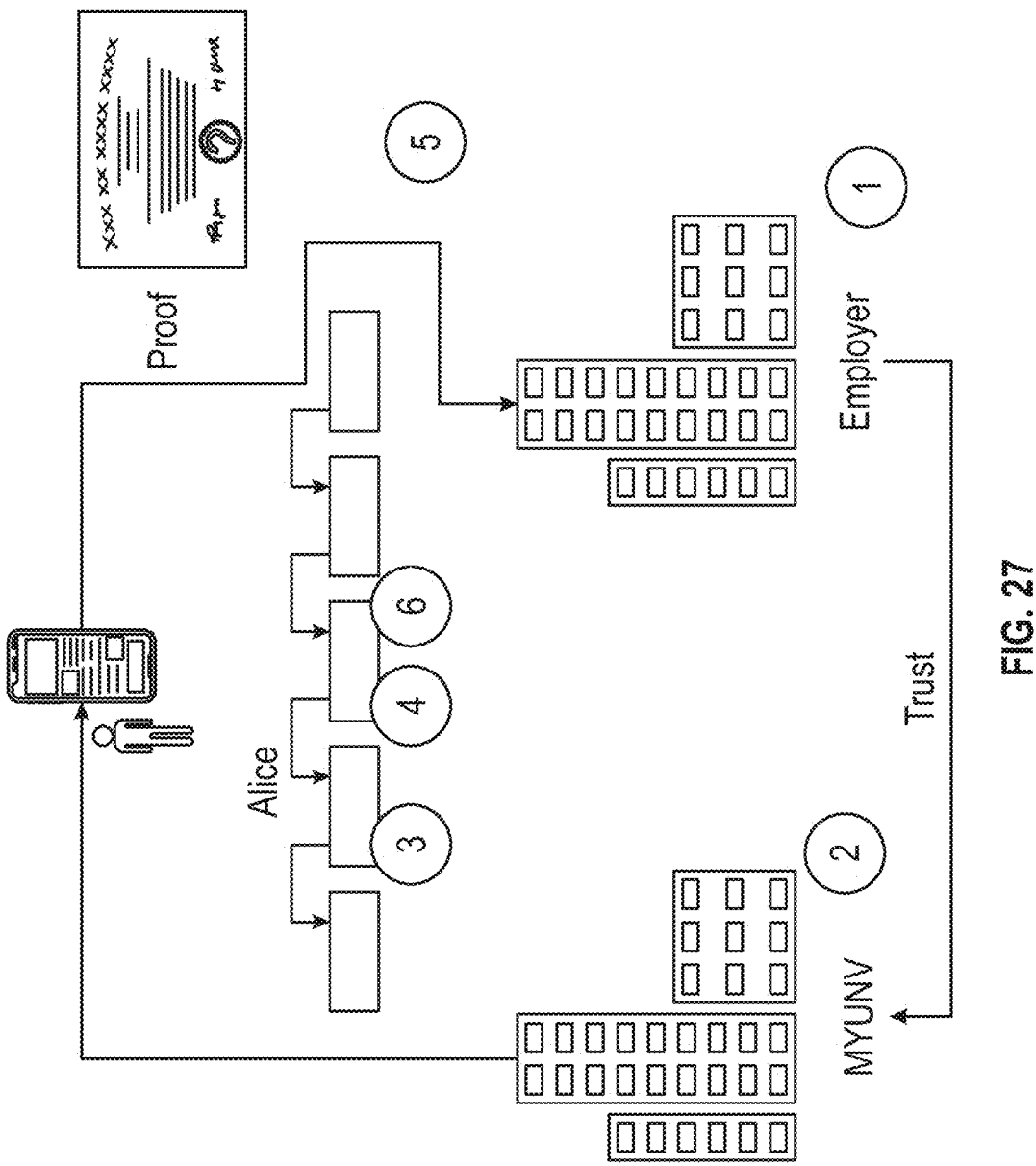
FIG. 27 depicts a three-party example in which a credential holder, credential verifier, and trusted third party interact with each other to verify credentials, according to at least one embodiment of the present disclosure.

FIG. 27 depicts a three-party example in which a credential holder, credential verifier, and trusted third party interact with each other to verify credentials. In this example, the Employer (1) trusts the school, MYUNV. (2) Upon graduation the holder (alice (3)) receives credentials (diploma) from MYUNV and uses C3N to store her college graduation credentials in the C3N Identity Blockchain. (4)

Upon request, Alice can present proof (5) of her graduation to her prospective Employer using the C3N Identity Management App (6).

Figure 28:
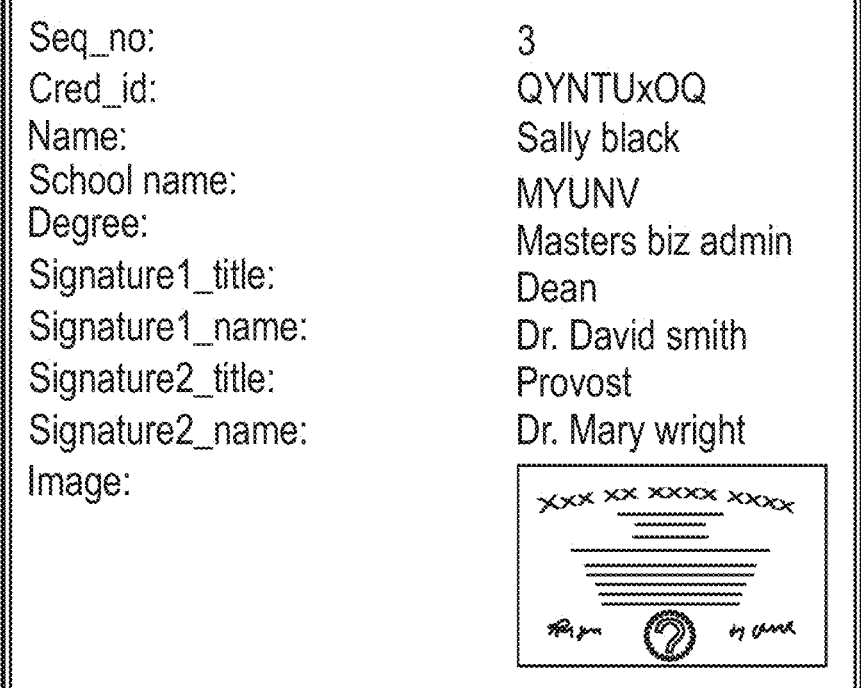
FIG. 28 depicts an example of a credential that is signed by a trusted third-party, according to at least one embodiment of the present disclosure.

FIG. 28 depicts an example of a credential that is signed by a trusted third-party.

C3N Identity Storage Service

Figure 29:
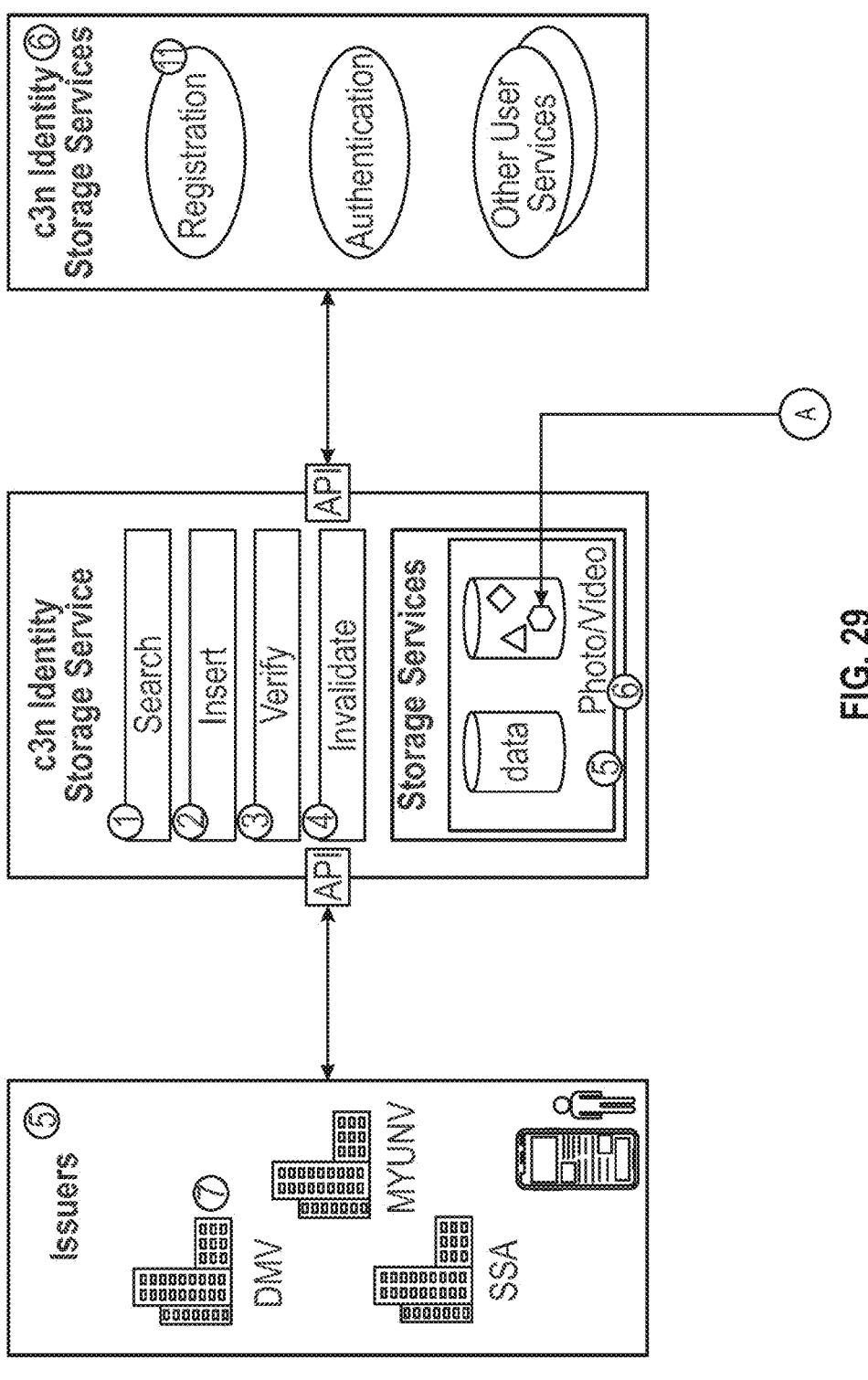
FIG. 29 depicts various aspects of a C3N identity storage service, according to at least one embodiment of the present disclosure.
Figure 29:
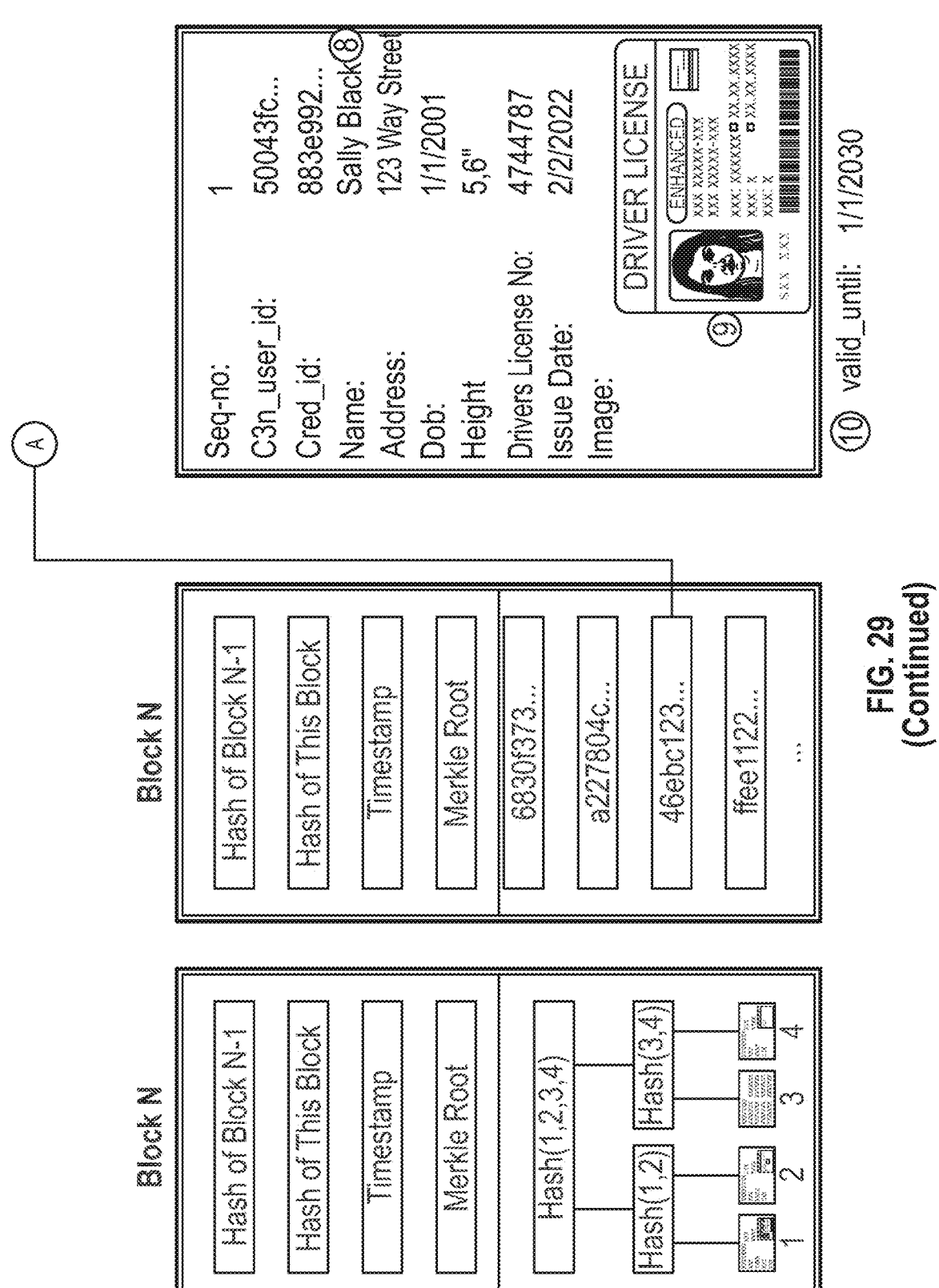

FIG. 29 depicts various aspects of a C3N identity storage service.

C3N Identity Storage Service nodes are comprised (1) search, (2) insert, (3) verify and (4) invalidate functionality. Both issuers (5) and C3N User Services (6) will have API access to this functionality.

When an issuer, e.g., the Department of Motor Vehicles (DMV) (7) issues a drivers license, textual/searchable data fields (8) will be extracted and inserted into the metadata database. The associated image of the user's drivers license (9) will stored in the object store. Images can later be used as "proof" that the C3N user can display from the C3N identity app running on their smart phone in order to verify a claim, e.g., to verify citizenship when applying for a job.

Each issuer will have their own semi-private blockchain that is only accessible to the issuer and C3N nodes with a C3N Identity Service reputation badge. After the entry's hash is computed, the valid_until field (10) will be populated. At anytime, C3N users with appropriate access can invalidate the credential by setting the valid_until to now.

C3N User Registration

Figure 30:
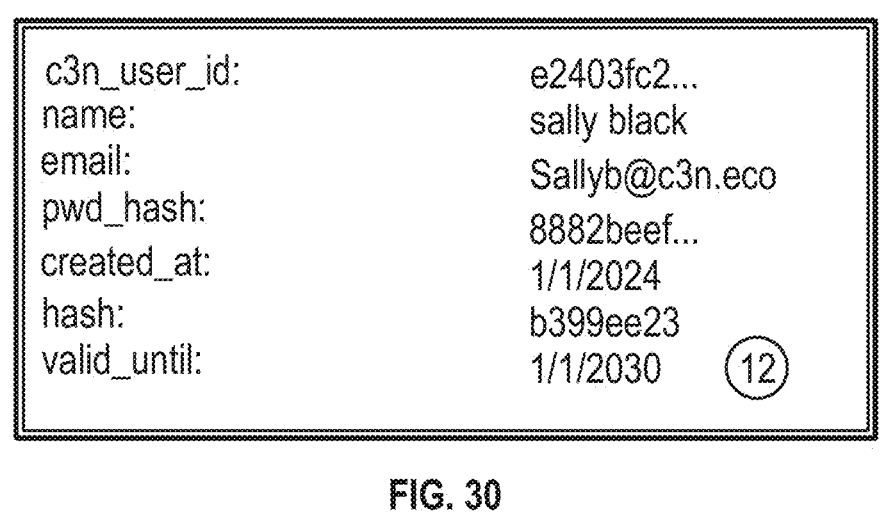

FIG. 30 depicts C3N user registration. C3N user registration (11) will call the insert API to insert the user registration data into the semi-private C3N user blockchain. Only node-owners that possess the highly trusted authentication service reputation badge can access this C3N user blockchain. The data stored using storage services in the key value database will be the data collected during user registration (name, email, etc.)

After the entry's hash is computed, the valid_until field (12) will be populated. At anytime, C3N users with appropriate access, i.e. nodes with the highly trusted authentication service reputation badge and that entry's C3N user can invalidate the credential by setting the valid_until to now.

Using this blockchain system to manage credentials provides the following benefits:

1) Tamper—Proof-If any data is changed, blockchain technology provides evidence. The hash in each entry will verify that no data in any particular entry has been changed and the merkle_root values in each block can verify that no data in any block has been changed.

2) Decentralization-Giving the control over the data to the distributed C3N eliminates the risk inherent in centralization of data. C3N is distributed, secure and unstoppable.

3) Limited Transparency-Identity blockchains are semi-private, providing transparency, but only to those with appropriate access and/or reputation badge.

Only C3N users with hardware security devices have their own cryptographic key pairs and can be a credential issuer in the C3N. Though C3N social media only-users that can use C3N user registration services to issue user registration credentials on their behalf.

Other uses of the C3N Identity Blockchain include, but are not limited to, using it to business licenses, travel (visa/passport) and health credentials.

C3N Web Browser

In at least one embodiment of the present disclosure, systems and methods for secure and private web browsing are described herein.

Figure 31:
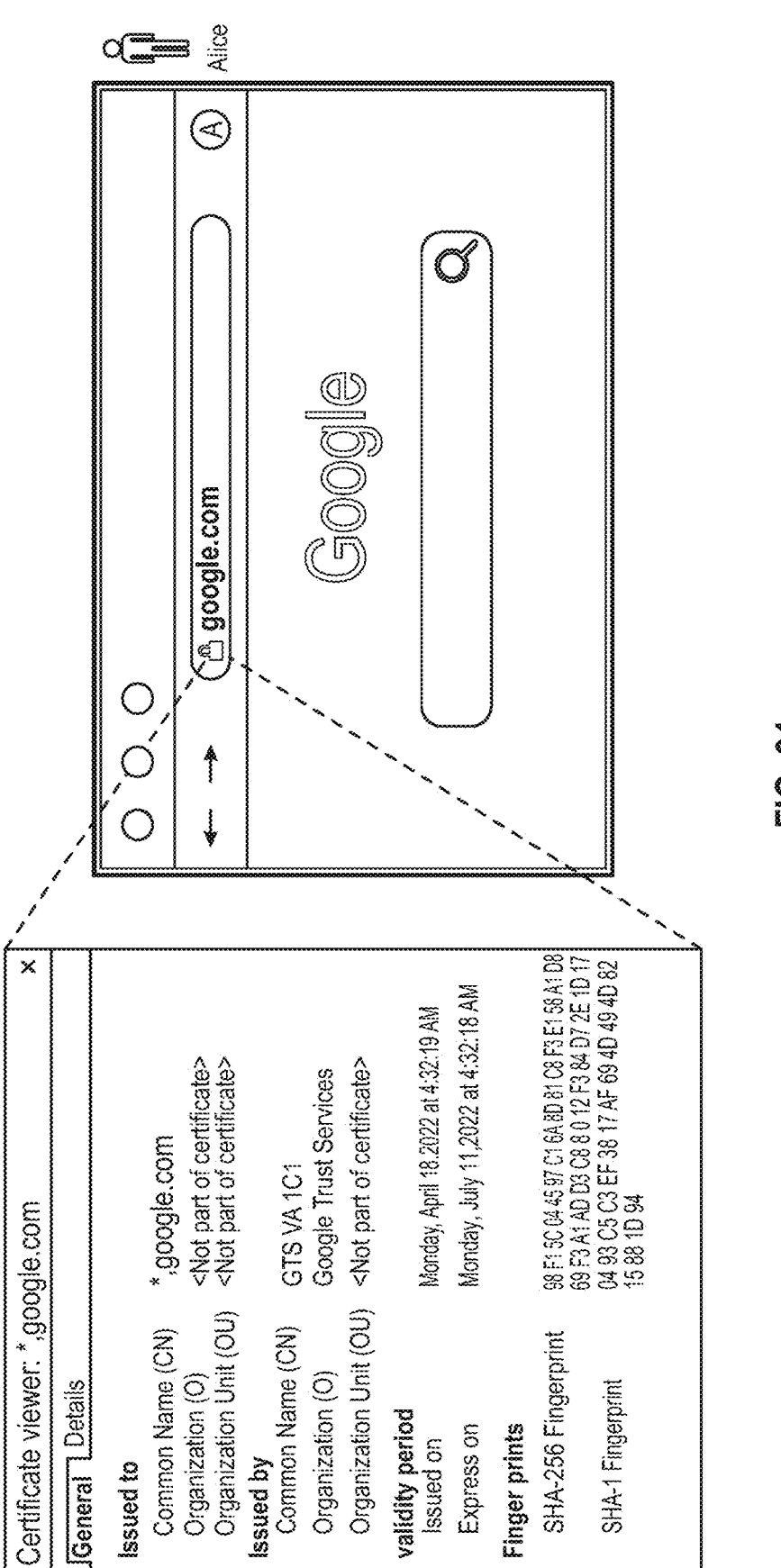
FIG. 31 depicts a C3N web browser visiting a HTTPS site, according to at least one embodiment of the present disclosure.
Figure 32:
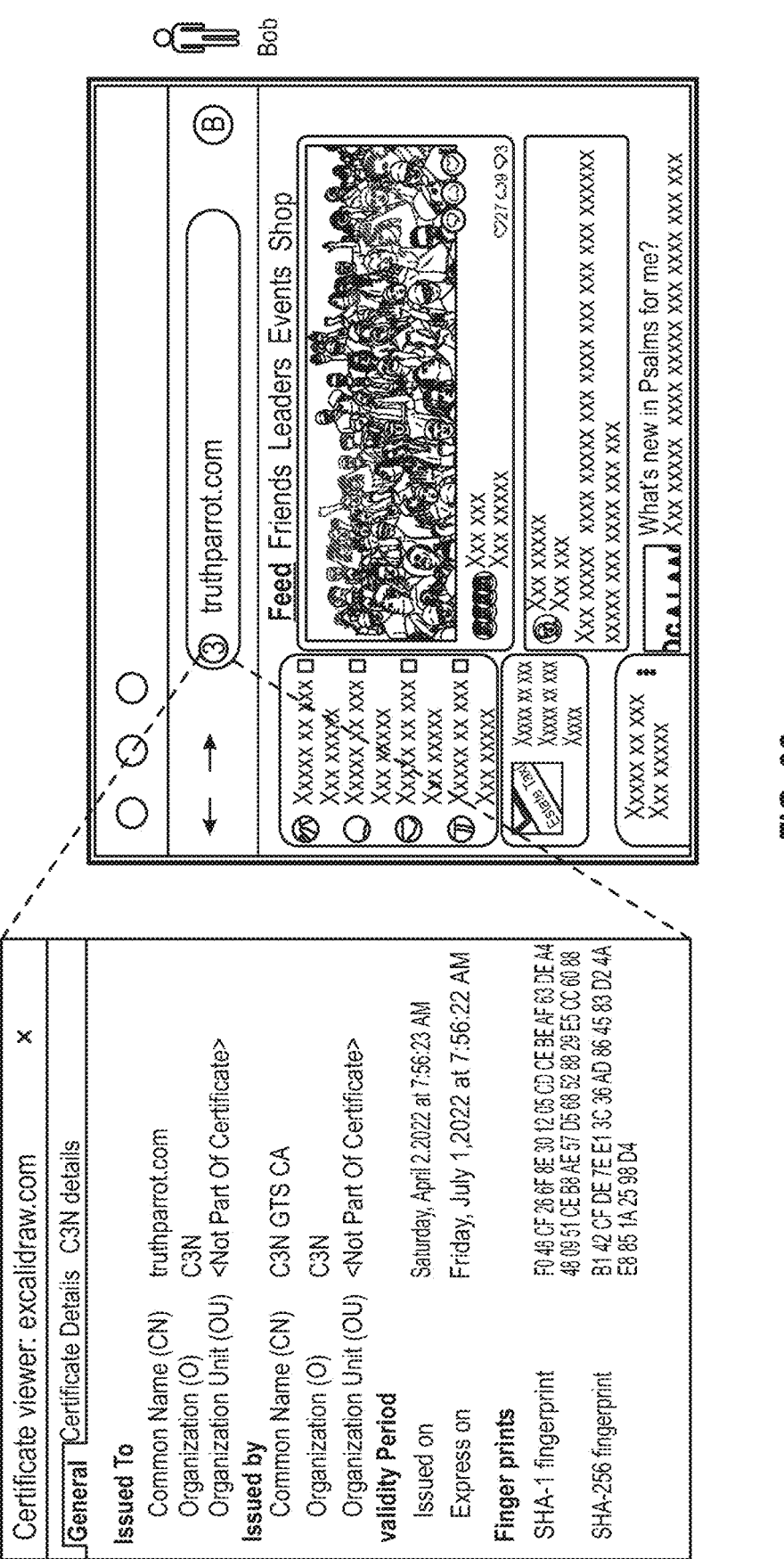
FIG. 32 depicts a C3N web browser when visiting a C3N site, according to at least one embodiment of the present disclosure.

FIG. 31 depicts a C3N web browser visiting a HTTPS site. In at least one embodiment of the present disclosure, the C3N web browser will display a lock icon in the left of the address bar to indicate whether the site the user is visiting is using HTTPS. The user can change their alias by tapping on the user icon to the right of the address bar. The user's "Alice" alias has been selected below:

FIG. 32 depicts a C3N web browser when visiting a C3N site. In at least one embodiment of the present disclosure, the C3N web browser will display a red C3N "3" icon to indicate if the site is a C3N site.

In at least one embodiment of the present disclosure, the C3N Details tab will display C3N rating information similar to what's discussed in the C3N Product and Services Ratings sub-section in the C3N Scoring System section.

Web Browser Proxy

In at least one embodiment of the present disclosure, all traffic will be redirected to a proxy server, a C3N service running on the user's device.

In at least one embodiment of the present disclosure, the proxy server can be configured by the user to perform to:

Seamlessly connect to C3N VPN servers, making it appear to the sites that the user visits that their geographic location is different than what it actually is, i.e., it will cloak the user's IP address. This could permit the user to bypass geo-fencing restrictions or to access otherwise blocked websites.

Speed up web browsing by utilizing data cached in C3N CDN nodes.

Improve security by anonymously performing DNS lookups using secure C3N DNS services.

Block blacklisted web sites.

Figure 33:
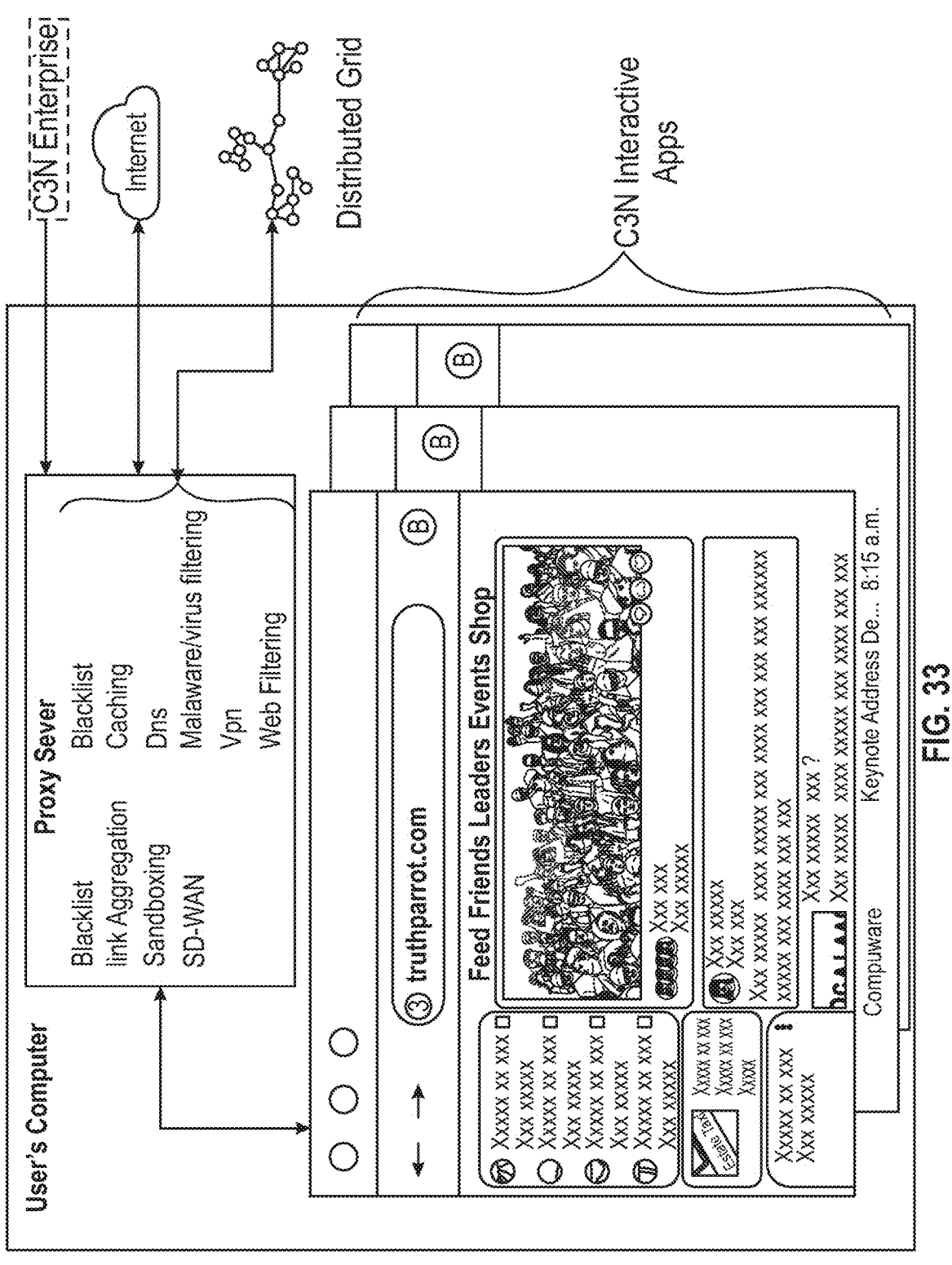
FIG. 33 depicts a C3N enterprise architecture, according to at least one embodiment of the present disclosure.

FIG. 33 depicts a C3N enterprise architecture.

In at least one embodiment of the present disclosure, these features can be configured under the C3N Proxy section in the user's web browser's Security and Privacy Settings preference window. The C3N Proxy settings allow other browser settings to be active, but will override any conflicting settings.

In at least one embodiment of the present disclosure, C3N proxy runs as a container in a separate process from the web browser on the same device as the user's web browser. It performs many of the same services, e.g., malware/virus filtering, web filtering and sandboxing that are frequently performed by cloud services, but in the spirit of "give the user control over their own device" those functions are controlled by the user on the users' device, except in the case of a workstation that is managed by a C3N Enterprise customer. The user has the power to shut off access to nefarious sites and services, not the other way around, except in the case of a workstation that is managed by a C3N Enterprise customer.

Blacklisting, Link aggregation, sandboxing and SD-WAN features do not require interaction with other C3N services running in the C3N distributed grid overlay network.

Other features, e.g., C3N blacklisting, malware/virus filtering and web filtering need to periodically interact with C3N grid provider services to keep up-to-date. Note: Node-owners in the C3N network can run C3N blacklisting, malware/virus filtering and web filtering services to keep track of the latest attacks and immediately update the C3N ecosystem in order to keep every C3N node protected, quickly and will earn Digital assets (e.g., in the form of control of a digital fungible token) rewards for their service. In this case, C3N users running the C3N web browsers are consumers of those services.

The C3N Proxy Service works not only for standard web browsing, but also for other interactive C3N apps, e.g., the C3N email app. Since all the C3N apps provide their user interface via a web browser, they all an benefit from the C3N Proxy Service.

Web Browser Proxy Benefits

Web Filtering

In at least one embodiment of the present disclosure, C3N proxy acts like a web filter firewall, performing content filtering. It oversees the data packets that the user's computer sends and receives. In doing this, it filters any compromising content that has been forbidden or flagged by C3N web filtering provider services. These rules can be set to stop access to any potentially threatening, unsecure sites. It can also be used to prevent employees from accessing certain sites that may reduce productivity (like social networking websites). Note that the corporate environment is one use case where the end user is not in complete control. In the case of C3N Enterprise desktop deployments, the enterprise C3N security staff can configure employee workstations to only be able to browse approved web sites and can force that features like virus/malware scanning be always on.

In at least one embodiment of the present disclosure, C3N user will be able to block access to websites. This can be done on a case-by-case basis, or the user's firewall can include a subscription that helps the user choose categories the use doesn't want people to have access to. Things the user may want to stop employees or guests being able to do on the work network could be: illegal activities, downloading illegal content, gambling, and many more.

The C3N community can continuously update the list of blacklisted sites for the user, as these types of websites will always be updating their IP addresses and domain names.

Internet Aggregation and SD WAN

Link aggregation and SD-WAN (Software-defined Wide Area Network) are great features for those who need multiple links to the internet. They're also useful where the user are using multiple links and would like to connect to other sites, such as branch offices or cloud services.

A link integration interface is defined as a group of physical interfaces in which the user can set to work together as one logical interface. It's used by businesses to increase the joint data throughput so that the user can extend the capacity beyond that of a single physical interface. It's also used to provide redundancy is there's a physical link failure.

SD-WAN is a virtual WAN architecture whose purpose is to let enterprises use any combination of transport services to safely connect applications and users. This includes MPLS, LTE, and broadband internet services.

The ability to use multiple links allows the user to have redundancy. It also lets the user use multiple cheap links with different providers to meet the user's bandwidth requirements.

Sandboxing

Sandboxing takes a file or executable as it's getting downloaded it and opens it in a completely isolated and separate "test" environment.

This replicates the end-user environment without putting users at risk. A sandbox then opens the file, runs it, scans it, and looks for malware or activity that is suspicious.

If the files or URL looks safe, it will pass it onto the end-user. If the file or URL displays malicious behavior, then a new threat has been flagged and can be shared back to the C3N ecosystem. Sandboxing is particularly effective at defending against zero-day threats (haven't been seen before and don't match known malware signatures). It falls into the advanced threat protection category that goes beyond what traditional inbound email filter scanners can offer.

Sandboxing is an added layer of protection so that, if an email contains unknown URL links, files types, or suspicious senders but still makes it through the email filter, tests will be conducted prior to it reaching the network or mail server.

Virtual Private Networks

Virtual private networks (VPNs) are networks that are built using public wires (usually the internet) to connect remote users or regional offices to a company's private, internal network. For the C3N Enterprise, VPNs are great for users connecting back to a site or the office. They can also be used to connect two sites together.

With a VPN, the user can allow users to access applications and data securely from remote locations. Best of all, the user isn't opening up public facing ports or applications. A VPN ensures privacy and security through an encrypted tunnel that transmits the data between the remote user and company network.

VPNs also serve to cloak the IP address of its users. If the user is behind the Great Chinese Firewall, the C3N VPN could serve to allow the C3N user to tunnel through that firewall and access the internet as though they were physically located in another country. VPNs are also prevent internet service providers from tracking the user's online activities.

Malware and Virus Filtering

Next generation firewalls are always filtering for malware, new and old, and are the user's perimeter defense mechanisms. This includes scanning for viruses, compromised websites, files containing viruses, bot nets trying to hack the user, man-in-the-middle attacks, etc.

C3N security services communicate with all C3N node endpoints, quickly flagging any compromised systems through active monitoring. Instantly, the proxy will block or limit network access to these devices until the issue is rectified. C3N Enterprise can enforce that this feature is always active, whereas individual C3N users can opt-out of this feature.

C3N Email

In at least one embodiment of the present disclosure, systems and methods for secure and private user email management are described herein.

In at least one embodiment of the present disclosure, C3N users must configure their email account to work with their hardware security keys.

Hardware Security Keys

Figure 34:
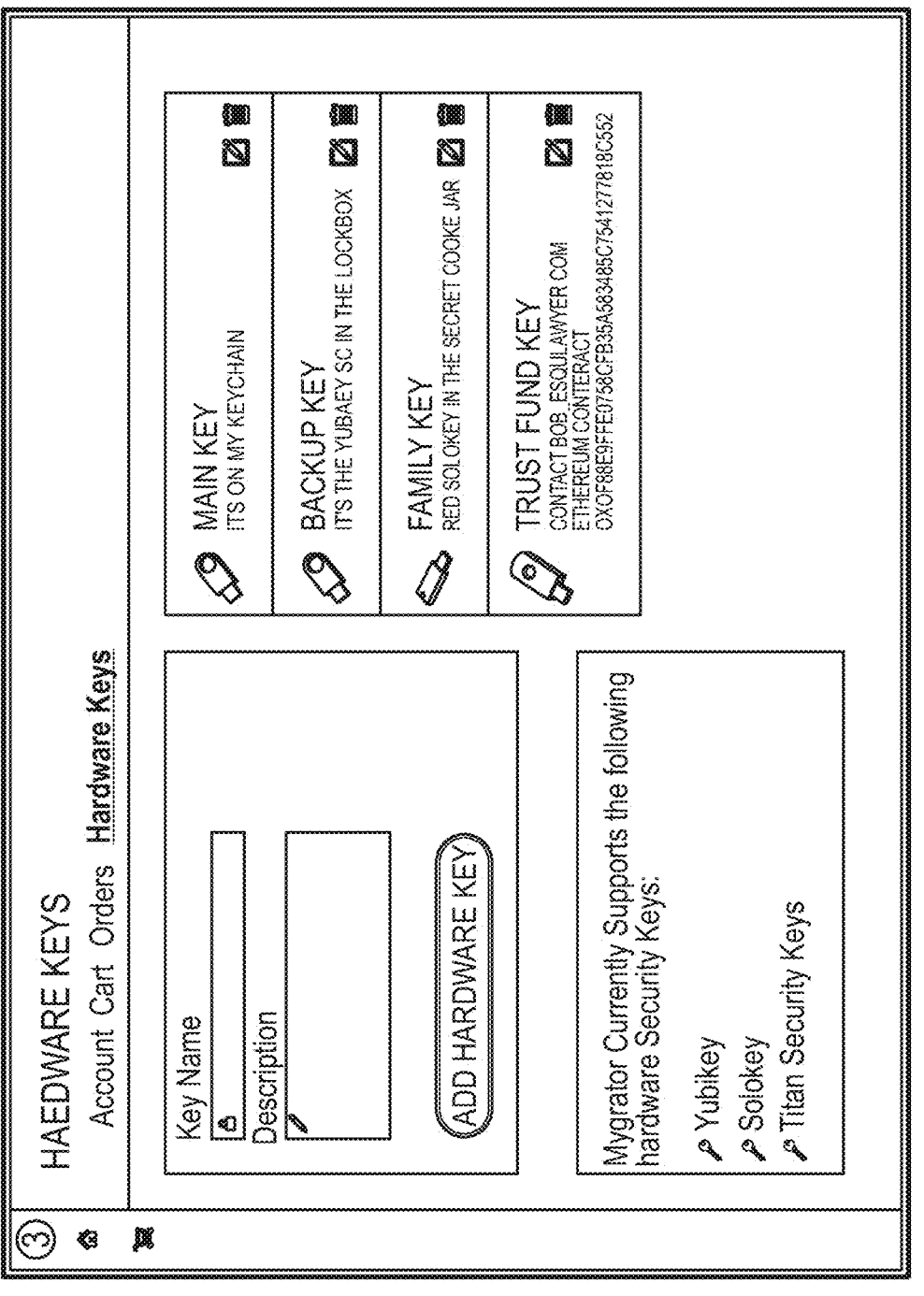
FIG. 34 depicts hardware security keys that can be utilized by C3N users, according to at least one embodiment of the present disclosure.

FIG. 34 depicts hardware security keys that can be utilized by C3N users. In at least one embodiment of the present disclosure, C3N users must register at least two hardware security keys. In the example above, the C3N user has configured four hardware security keys. The MAIN KEY is kept on the user's key chain. The BACKUP KEY is kept in the safe in the office, the FAMILY KEY is kept in a safety deposit box at the bank and the last key that is kept in trust and managed by a C3N smart contract.

C3N Email App

Figure 35:
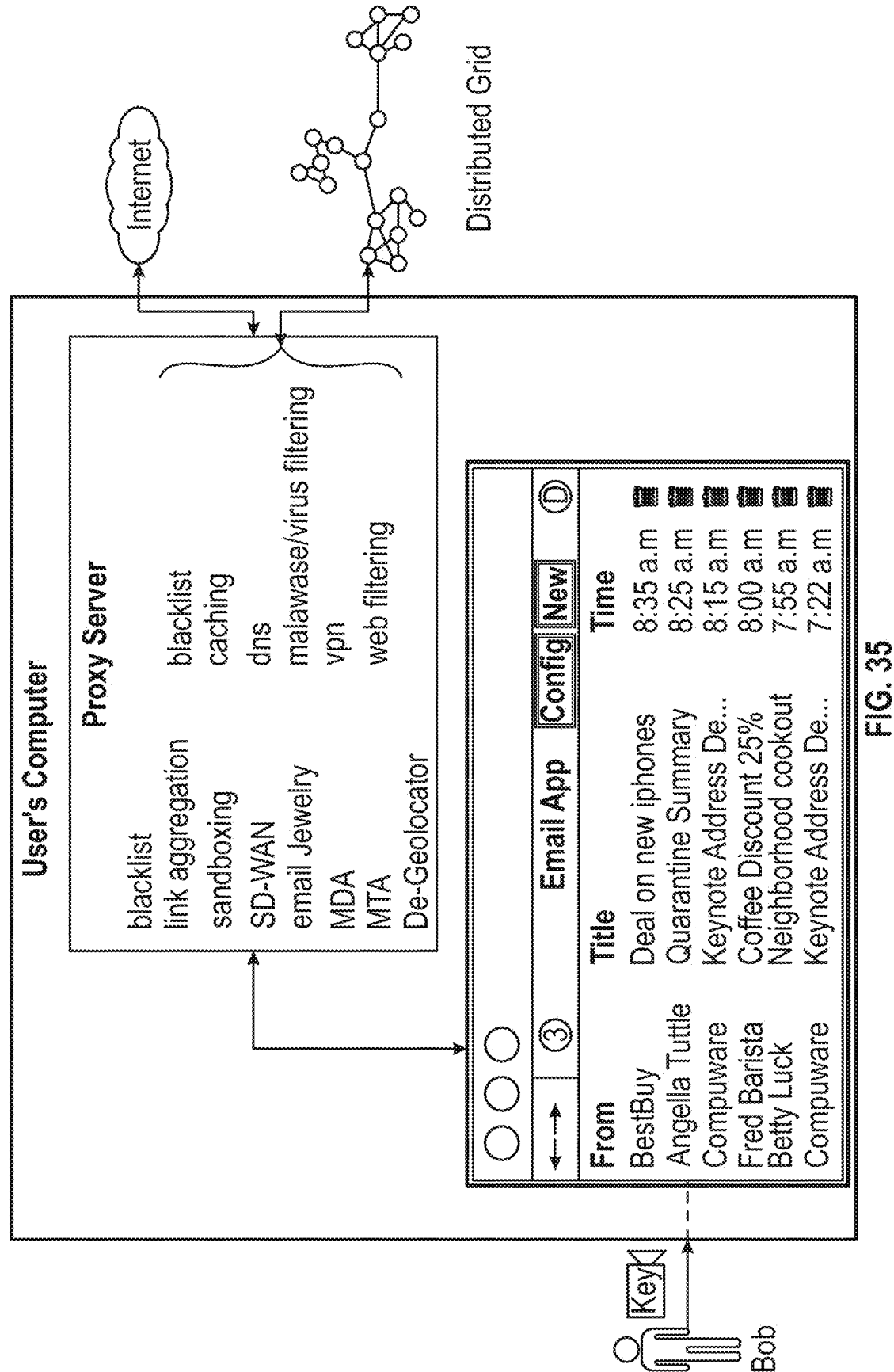
FIG. 35 depicts a C3N email app, according to at least one embodiment of the present disclosure.

FIG. 35 depicts a C3N email app. In at least one embodiment of the present disclosure, C3N email app is an HTTP based interactive app that interacts with the C3N proxy server via the C3N web browser that hosts the Email App.

In at least one embodiment of the present disclosure, C3N's email solution includes both an email client (MUA) and an e-mail server components (MTA, MDA). The Email App is the Message User Agent (MUA) and the proxy handles both the Message Transfer Agent (MTA) and Message Delivery Agent (MDA) functionalities. C3N users can send SMTP via its MTA capability, accept messages via SMTP via its MX capability and store messages. C3N email implements additional protocols that keep the user's email reasonably secure, including: DANE, DKIM, DMARC, MTA-STS and SPF within the running C3N container.

In at least one embodiment of the present disclosure, emails are stripped of potentially dangerous elements and attachments are processed by virus detection logic.

In at least one embodiment of the present disclosure, email app (MDA and MTA) logic is written in Go and have no known exploits. Communication into and out of the email container is locked down and attachments are only available after they've been scanned for viruses.

In at least one embodiment of the present disclosure, emails sent from one C3N user to another C3N user is encrypted end-to-end.

In at least one embodiment of the present disclosure, email communication sent to or received from any non C3N user is considered non-private, per C3N standards.

Non-Private Yet Secure

Figure 36:
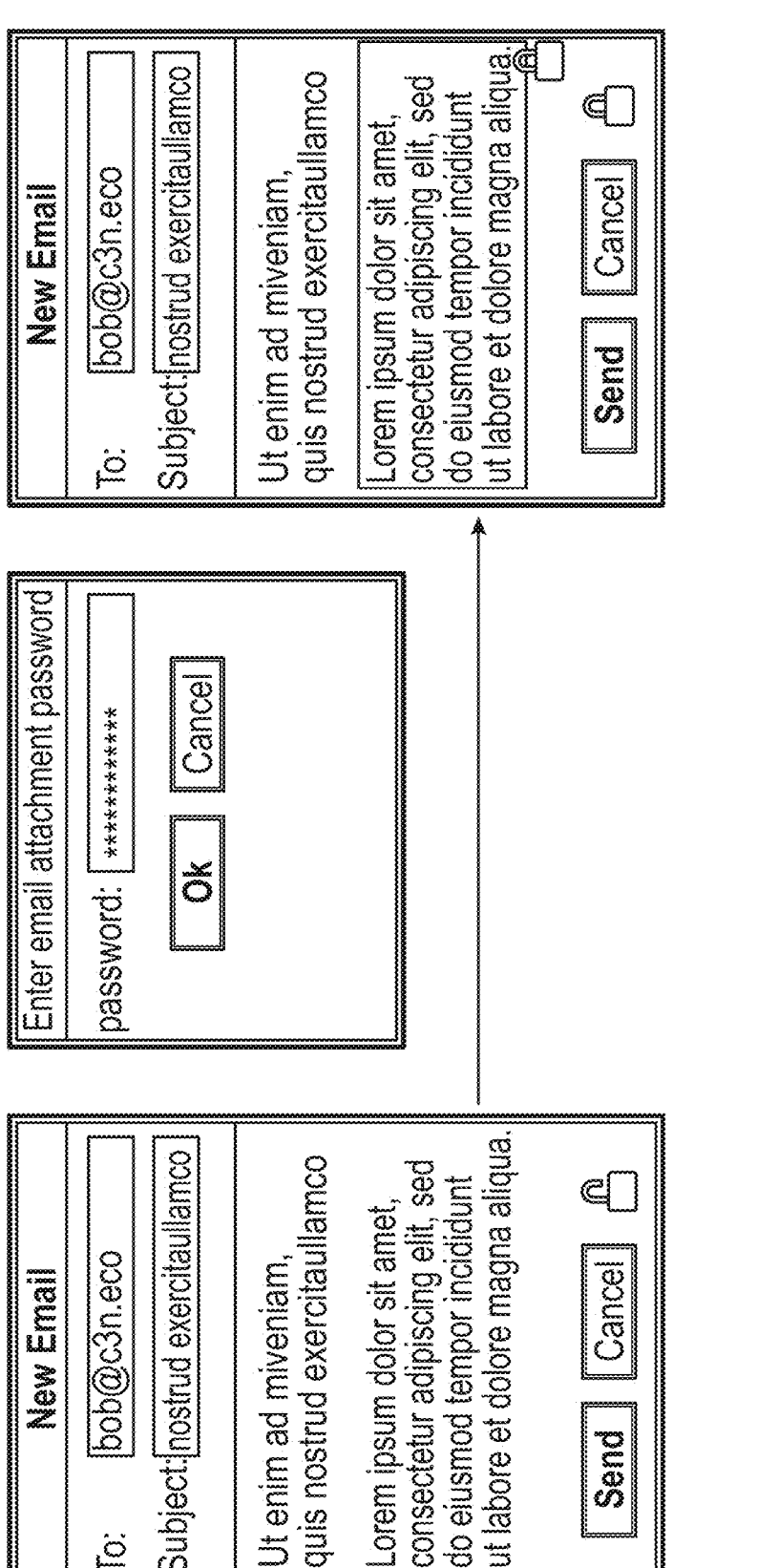
FIG. 36 depicts encrypted C3N email, according to at least one embodiment of the present disclosure.

FIG. 36 depicts encrypted C3N email. In at least one embodiment of the present disclosure, when a C3N user sends an email to a non-C3N email account using the C3N email app, the C3N user, "Alice" in the following example can select text and click the unlocked icon. That action will cause the unlocked icon to appear locked and will indicate that the selected text has been encrypted, with an overlay color and smaller lock icon.

When Alice clicks the <Send> button, the C3N email app will send the email through the C3N proxy server app which will encrypt the email with the password that Alice entered.

In at least one embodiment of the present disclosure, when Bob receives the email from Alice, the text that Alice encrypted will arrive as a password encrypted attachment.

FIG. 37 depicts an encrypted attachment in C3N email. In at least one embodiment of the present disclosure, Bob will need to double-click the attachment or save the file then double-click on it (or select unarchive in the file's context menu). Bob's system will then prompt him for the password.

In at least one embodiment of the present disclosure, Alice will be encouraged to share the password for her encrypted text (attachment.zip) file by another means besides email, e.g. by SMS or a phone call.

Email Jewels

FIG. 38 depicts a graphical interface for configuring email jewels. Email jewels are those email accounts that should be guarded like crown jewels. An example would be the email account that the user users to setup their bank accounts. If anyone were to compromise a user's bank account and request a password reset, that email would go to their "crown jewel" email account, i.e., the email account they used to setup their online bank account.

While some email services, e.g., Gmail, offer MFA via hardware security keys, that is arguably "not enough security". What if the user's crown jewel email account is compromised? All the hacker would need to do is request a password reset, wait for the email from their bank and enter the code from that email to reset the user's bank account. In order to thwart attacks such as that, the C3N user can configure which emails they consider to be their crown jewels.

In at least one embodiment of the present disclosure, any email configured as a Jewel Email will require the user to authenticate each email communication with a hardware security key. The key must be inserted and the user must press its button to signify that they are aware of and approve the email receipt and/or email delivery before the email is allowed to enter the user's email box or email outbox, respectively.

De-Geolocator

In at least one embodiment of the present disclosure, De-Geolocator functionality of the proxy server will automatically strip images of any GEOlocation data before allowing the MTA to transfer the image as an attachment in outbound emails. This is helpful for C3N users that wish for their location to remain anonymous.

Email Registration Process

Figure 39:
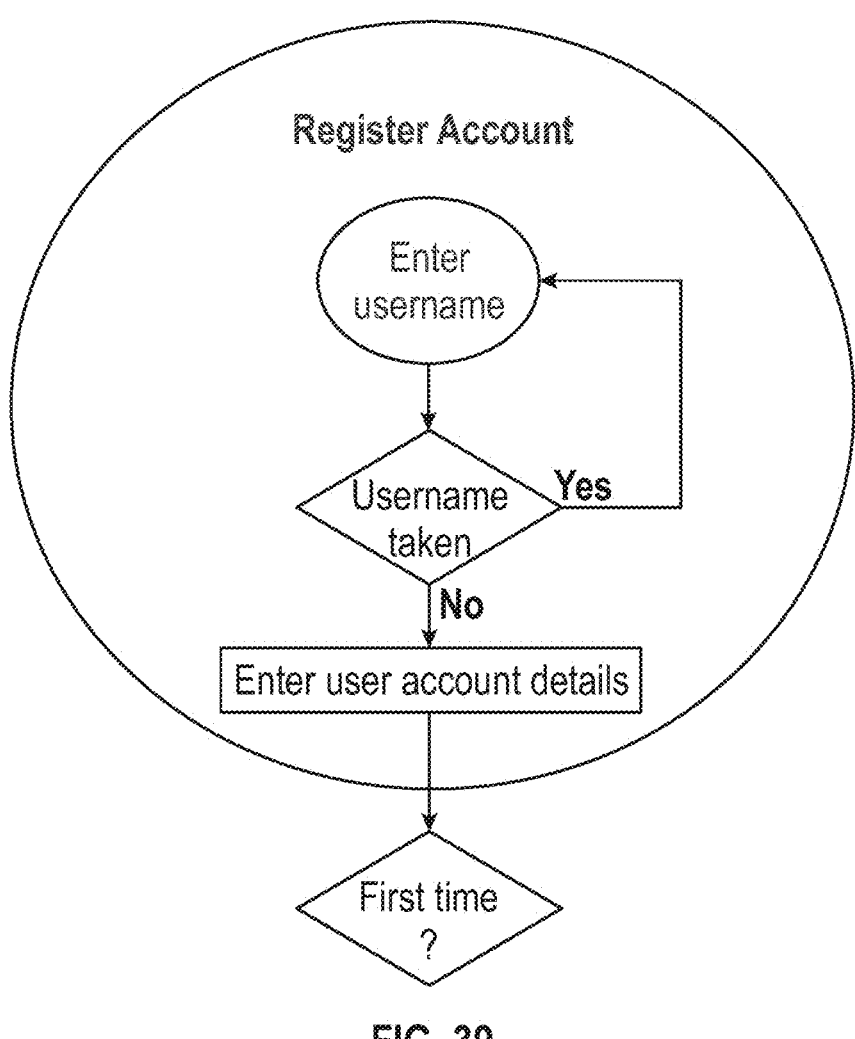
FIG. 39 depicts an email registration process, according to at least one embodiment of the present disclosure.

FIG. 39 depicts an email registration process. In at least one embodiment of the present disclosure, diagrams below depict the email registration process.

First, the user selects a username for their "real" account. The user will be notified if their username has already been taken; The user can enter desired usernames until a currently untaken one is selected.

Even after the user has selected a new username, that still does not mean it's theirs. After the registration process is complete, they'll need to wait for the next block in the C3N identity blockchain to be processed before being notified if their username selection was successful.

The C3N proxy server will query C3N identity service apps to determine if the requested username has been taken.

As the proxy server queries usernames, it can store retrieved names in its cache for quicker subsequent lookups.

Unstoppable Grid

The logic used by the C3N proxy to perform queries is controlled by C3N. In the beginning nearly every query will be directed to the C3N enterprise cloud infrastructure. As more and more C3N nodes are added to the C3N distributed grid, the option to query the C3N grid, in part or in whole, will become possible. Once C3N has "enough" nodes deployed in its grid, the C3N ecosystem can be fully distributed and virtually unstoppable.

User Registration Process

Figure 40:
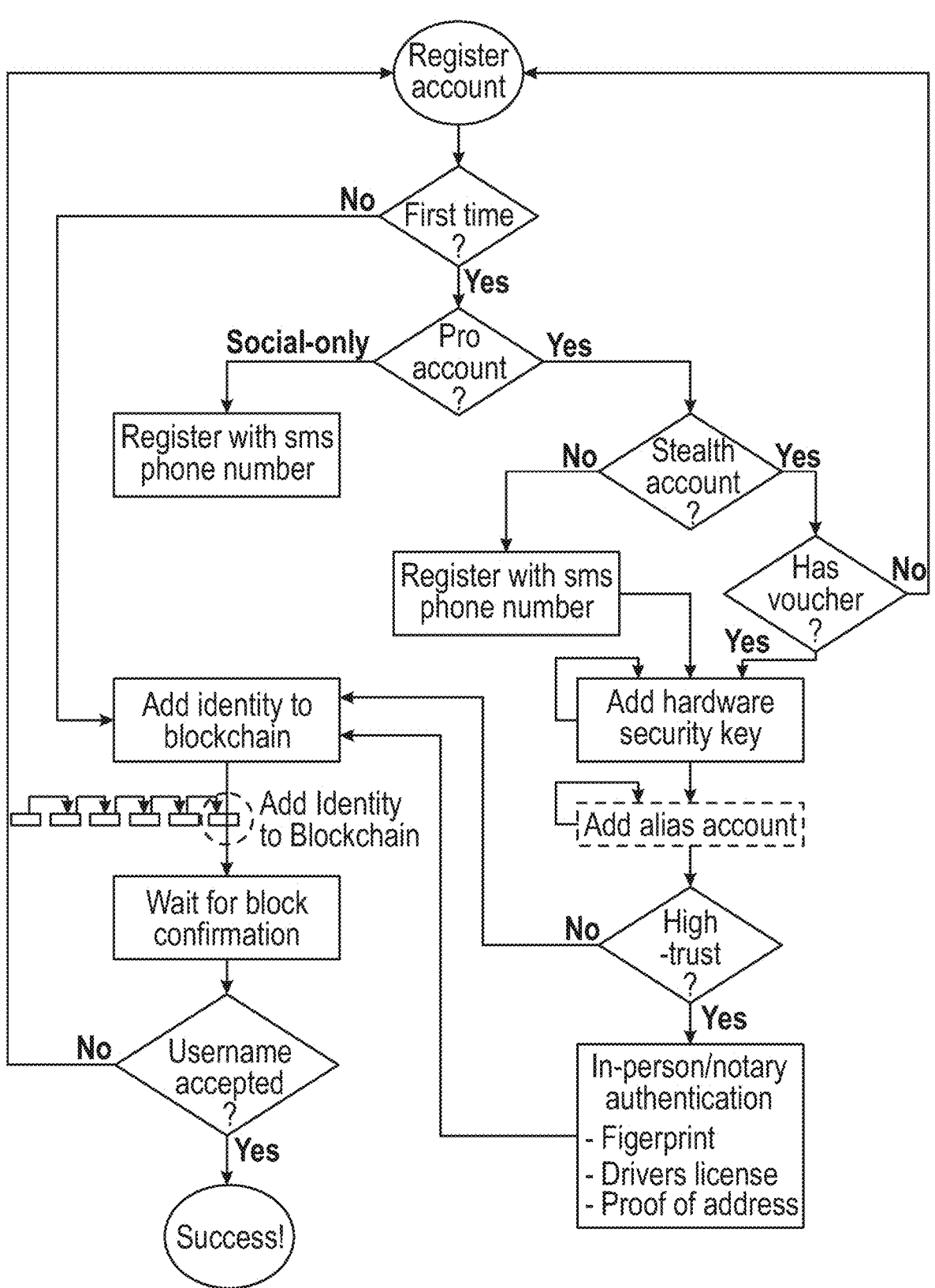
FIG. 40 depicts a user identity registration process, according to at least one embodiment of the present disclosure.

FIG. 40 depicts a user identity registration process. In at least one embodiment of the present disclosure, below, is the user identity registration process. It prioritizes high-trust accounts and takes C3N vouchers and C3N scores into account when accepting duplicated usernames and stores the user registration data to the C3N Identity Blockchain.

Add Identity to Blockchain

Figure 41:
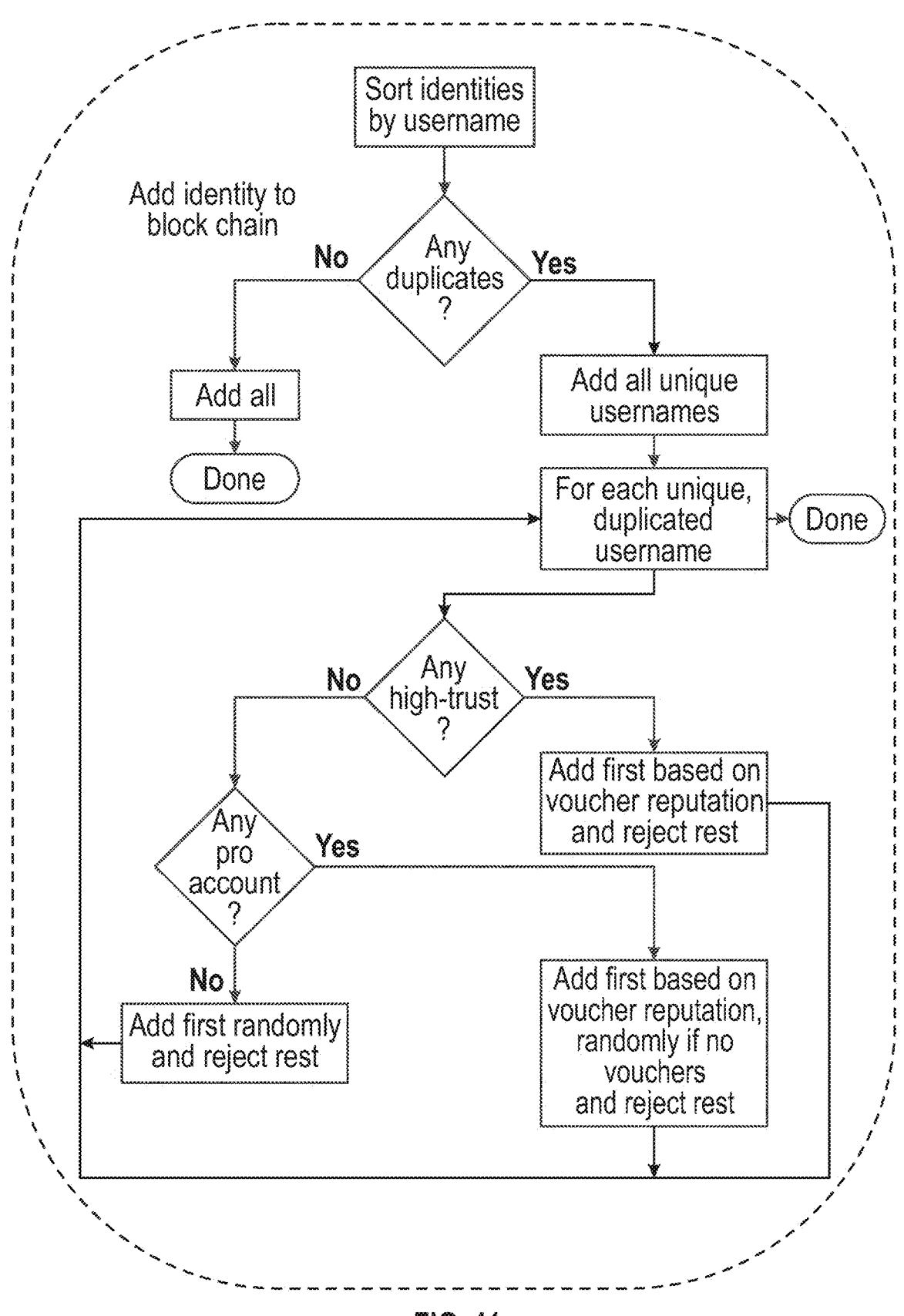
FIG. 41 depicts logic used by the C3N identity services worker when adding user identities to the C3N Identity Blockchain, according to at least one embodiment of the present disclosure.

In at least one embodiment of the present disclosure, FIG. 41 depicts logic used by the C3N identity services worker when adding user identities to the C3N Identity Blockchain.

C3N Desktop and C3N Service/Device Market

In at least one embodiment of the present disclosure, systems and methods for connecting consumers and providers of C3N services are described herein.

In at least one embodiment of the present disclosure, C3N desktop user can have any number of devices running the C3N operating system.

On his devices (1), the C3N node-owner can have many services (2) (running as Containerized environments).

Limitations on the number of services the node-owner can run on their node device will be based on the computing device's resources (3): RAM, CPU cores, Disk storage and network bandwidth. The C3N system will auto detect and not allow the node-owner to over provision their devices and C3N will also provide visual resource utilization graphs (3) to display how utilized the devices are.

As a provider of compute resources, the C3N node-owner will be incentivized for participating the C3N ecosystem as a resource provide with Truth Tokens (4).

Similar to C3N's social media "business" (LinkedIn-like) app has a Job Market (5)—to match Job Seekers with employers—There will be a C3N Service Market for node-owners to find services to run, thereby matching services with their devices.

Figure 42:
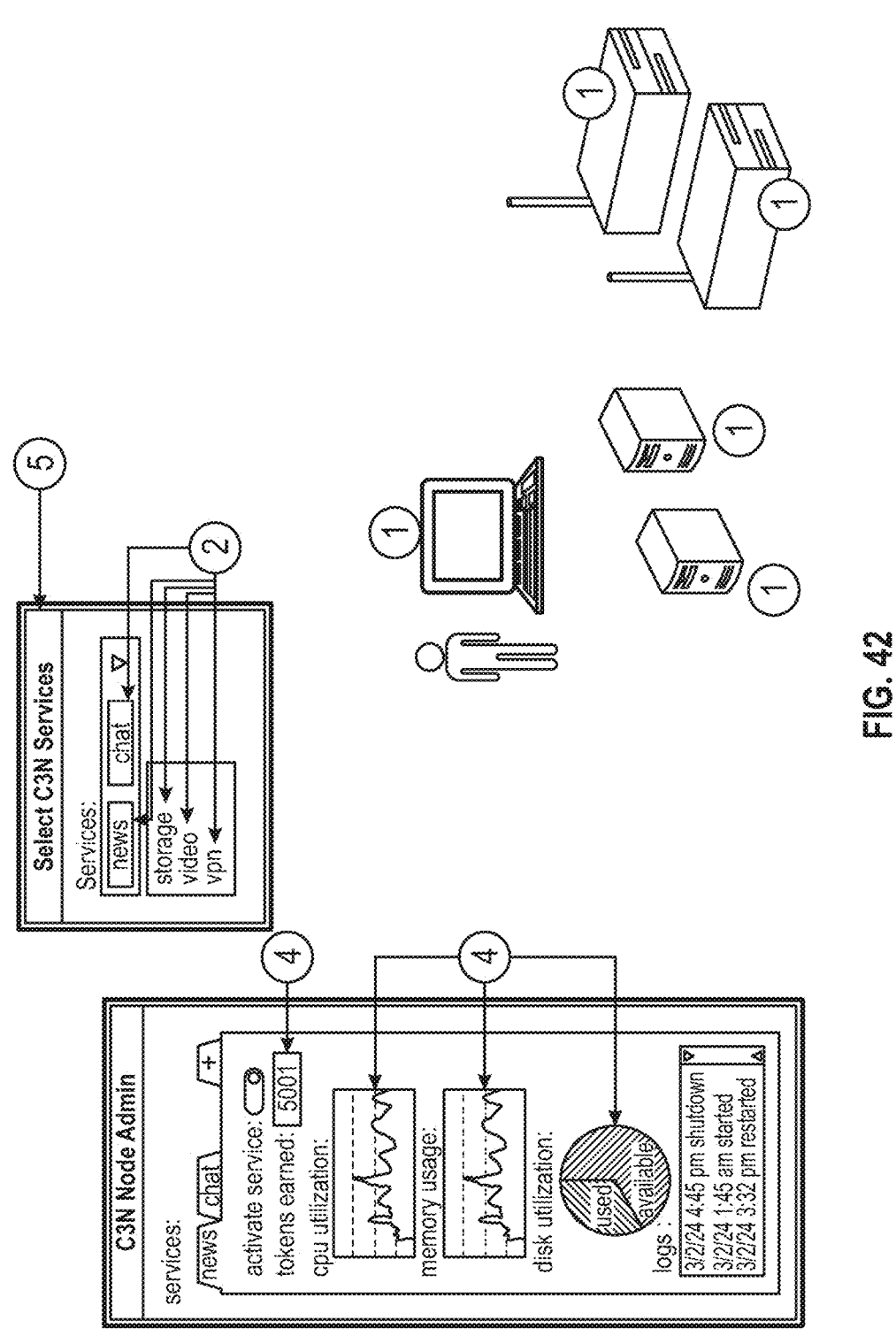
FIG. 42 depicts C3N node administration, according to at least one embodiment of the present disclosure.

FIG. 42 depicts C3N node administration. The C3N system could also be configured to allow the system to auto-select services, based on current supply and demand conditions in the C3N ecosystem In at least one embodiment of the present disclosure, in the C3N Service Market, the node-owners act as the sellers (or providers of C3N services). The specifications of the node-owner's devices will be made available to prospective consumers.

The C3N score and hence "reputation" of the node-owner and their devices will be sortable and filterable by the C3N consumers that are looking to consume said services.

C3N Node Groups

In at least one embodiment of the present disclosure, systems and methods for organizing compute resources in a distributed environment to accomplish a particular goal or goals are described herein.

Figure 43:
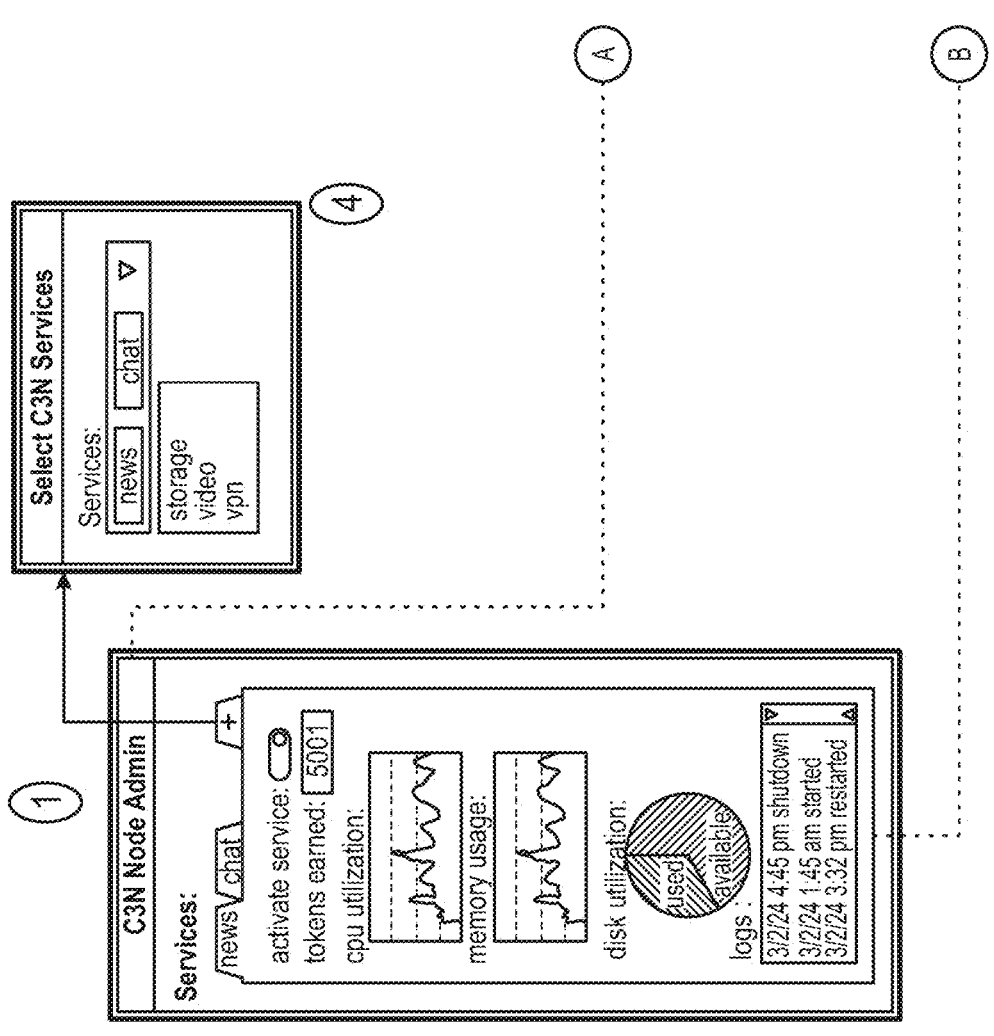
FIG. 43 depicts C3N node groups, according to at least one embodiment of the present disclosure.
Figure 43:
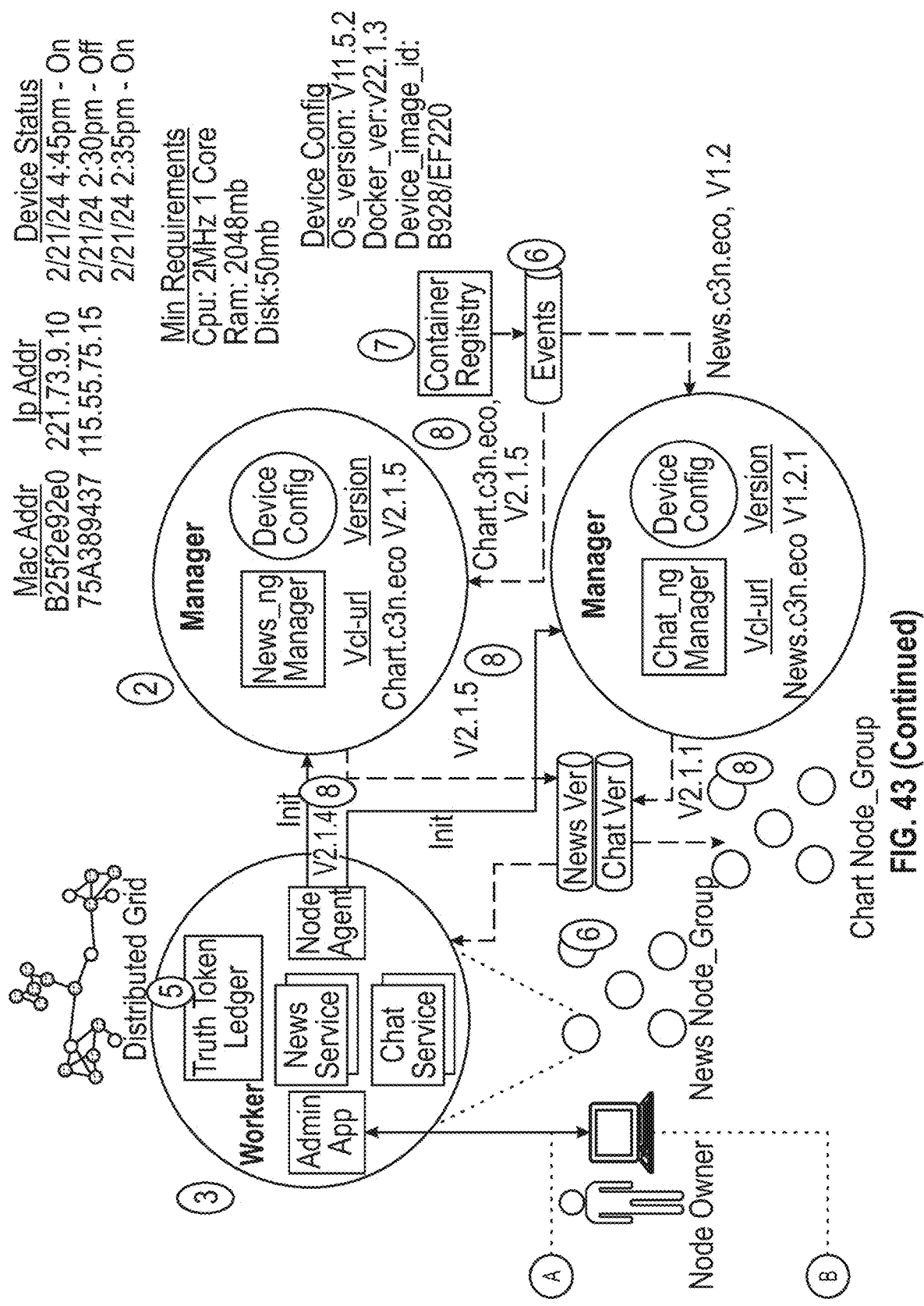

FIG. 43 depicts C3N node groups.

In at least one embodiment of the present disclosure, C3N nodes will be grouped and managed automatically by the C3N system. Node-owners select which service(s) to run on their devices (1) (or allows C3N to auto-select those services). As mentioned in the C3N Node-Leader Election section, node groups are clusters of a service that provide backup and redundancy for said service. The leader/manager (2) keeps track of the nodes in their node group.

In at least one embodiment of the present disclosure, the node group runs continuously, for the duration of the contract (see Data Services Market section for details). Worker nodes (3) work and manager nodes (2) monitor and collect performance statistics.

In at least one embodiment of the present disclosure, a C3N node must have a C3N admin app (4), a Truth Token ledger service (5) and a C3N node agent and zero or more C3N services, e.g., News Service and Chat Service. Nodes earn Digital assets (e.g., in the form of control of a digital fungible token) s by providing the compute resources necessary to run the C3N services that have been configured to run on the node.

In at least one embodiment of the present disclosure, there will be a number of workers for each service running in the distributed C3N grid. The C3N Node-Leader Election section describes how the leader/manager is selected and how they provide reliability as a cluster.

In at least one embodiment of the present disclosure, C3N infrastructure will provide the messaging components required to run the event driven C3N apps, e.g. message queues (6) and C3N container registry (7).

In at least one embodiment of the present disclosure, C3N container version management system will ensure the nodes are running current software components that have been updated with the latest security patches (8). (No user or devops intervention required; It's automatic.)

C3N Smart Contracts

In at least one embodiment of the present disclosure, systems and methods for storing and executing smart contracts on the C3N blockchain are described herein.

Introduction: A smart contract is a computer program or a transaction protocol which is intended to automatically execute, control or document legally relevant events and actions according to the terms of a contract or an agreement. The objectives of smart contracts are the reduction of need in trusted intermediators, arbitrations and enforcement costs, fraud losses, as well as the reduction of malicious and accidental exceptions.

C3N Smart Contracts

The Digital assets (e.g., in the form of control of a digital fungible token) blockchain interoperates with C3N smart contracts to enable execution of transfer of value agreements with the following properties:

Run automatically when specified conditions are met.

Results of transactions stored on Digital assets (e.g., in the form of control of a digital fungible token) blockchain All parties can be notified of outcome without the use of intermediaries.

Can automate work flows and trigger the next action

Candy Bar Vending Machine Example

Figure 44:
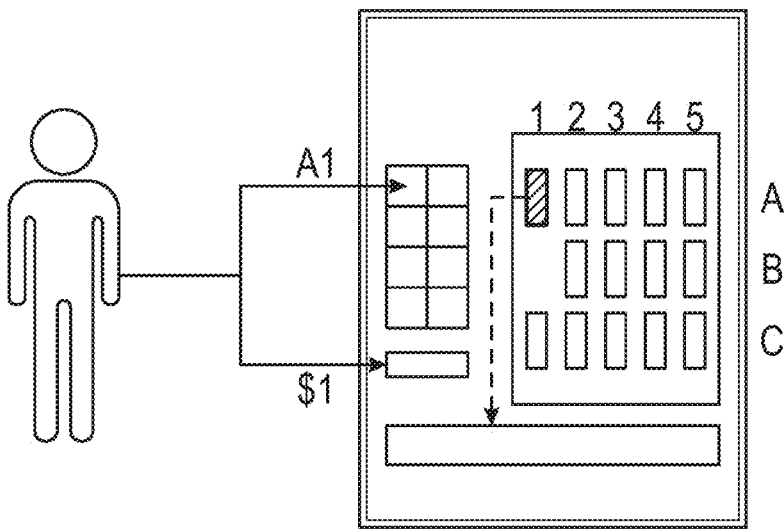
FIG. 44 depicts a hypothetical abstraction of a smart contract, according to at least one embodiment of the present disclosure.

FIG. 44 depicts a hypothetical abstraction of a smart contract. A smart contract is like the vending machine, waiting for input that it will require before it can execute a transfer of value. Example: input $1 and select A1 then the vending machine will return a candy bar.

Figure 45:
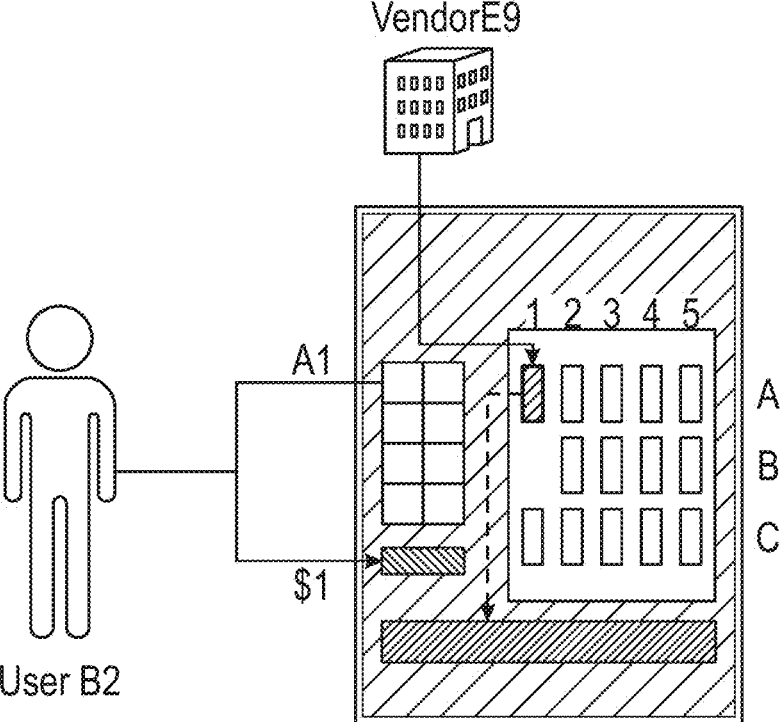
FIG. 45 depicts a hypothetical abstraction of a smart contract, according to at least one embodiment of the present disclosure.

FIG. 45 depicts a hypothetical abstraction of a smart contract.

FIG. 46 depicts parties, assets, and rules in connection with a hypothetical C3N smart contract, in relation to the vending machine example discussed below.

C3N smart contracts manage the data, i.e., the Parties, Assets and Rules involved in a smart contract, as well as the logic: The Precondition and Rules. For example:

PRECONDITION: Supplier loads candy bar at A1

RULES (name of rule: vending-logic-99): If user selects A1 and enters $1, then vending-machine releases the candy bar for the user.

Car Sale and Title Transfer Example

FIG. 47 depicts parties, assets, and rules in connection with a hypothetical C3N smart contract, in relation to the car sale and title transfer example discussed below.

Described herein is an example of a C3N smart contract that facilitates the sale of an automobile.

PRECONDITION: UserD3 has clear title to car

RULES (car-sale-B7): If userD3 transfers $2500 to userE9 Then user D3 will transfer title, keys and car to userE9 And userA6 will verify the transaction.

This is the data that the C3N smart contract must track for this smart contract, as depicted in FIG. 47.

D3 is the car seller, E9 is the car buyer, A6 is the smart contract

One way this transaction can occur is: D3 meets E9. D3 brings the car, title and keys and E9 brings the money. After D3 hands the car keys to E9, E9 clicks the <transfer> button in the Distributed App (dApp) that instructs the C3N smart contract to transfer $2,500 from D3's account to E9. A6 will be notified when the $2,500 is successfully received in D3's account and A6 execute the <verify> logic that will cause the dApp to display a completed timestamp, indicating to D3 to sign the title over to E9.

Figure 48:
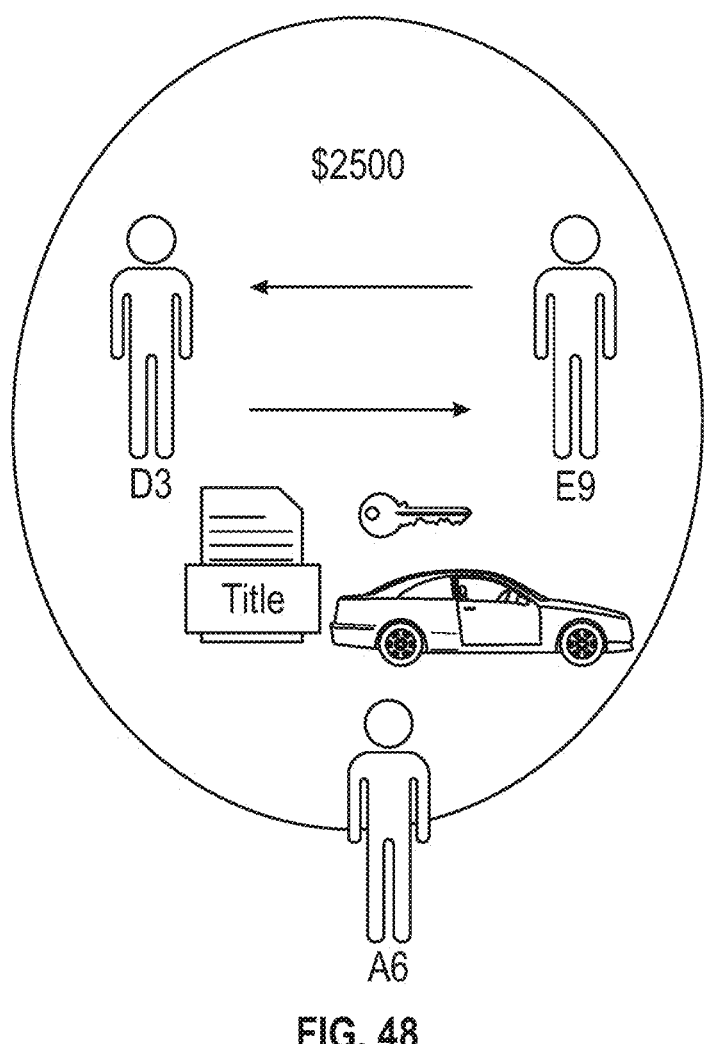
FIG. 48 depicts a transfer of assets, in connection with a C3N smart contract, according to at least one embodiment of the present disclosure.

FIG. 48 depicts a transfer of assets, in connection with a C3N smart contract.

Car Sale and Title Transfer Example

Figure 49:
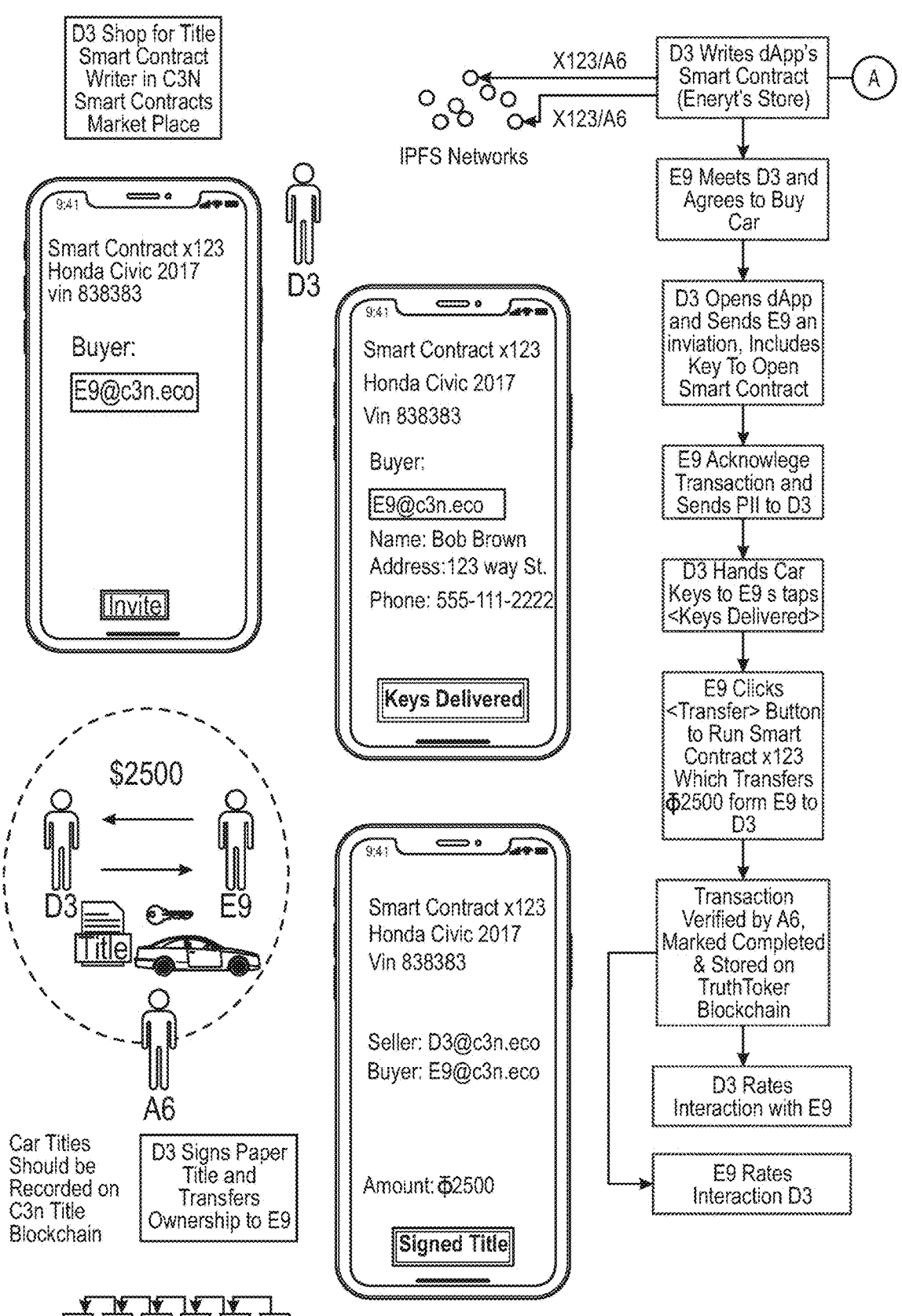
FIG. 49 depicts a car sales and title transfer example using C3N blockchain, according to at least one embodiment of the present disclosure.
Figure 49:
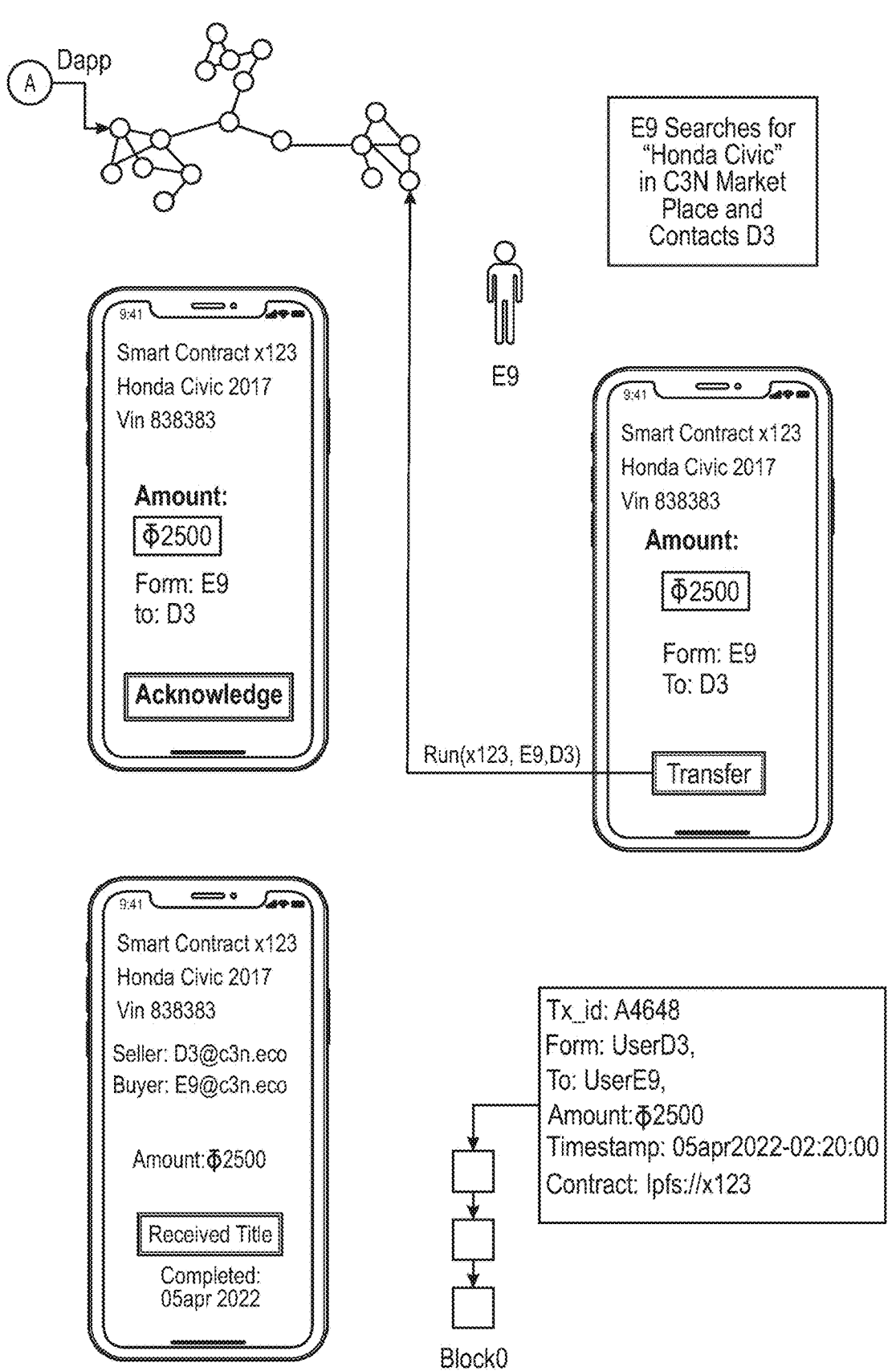

FIG. 49 depicts a car sales and title transfer example using C3N blockchain.

D3 can write the C3N smart contract or shop for a smart contract writer in the C3N Smart Contract Market Place. This can open up a whole new market for C3N Smart Contract lawyers or specialists that know how to write smart contracts for various industries (car sales in this example).

The C3N smart contract will be encrypted and stored in a distributed file system. Initially, it will be IPFS. (C3N may offer a distributed file system solution in the near future.) D3 and the C3N Smart Contract lawyers or specialists that wrote it will need to provide their public key. Either party can decrypt the smart contract, using Shamirs Secret Key Sharing Algorithm.

Follow the flow to D3's last dApp window. When D3 clicks <signed title> and E9 clicks <received title>, the completed timestamp will appear under the <signed title> and <received title> buttons indicating that the transaction has been successfully completed. D3 and E9 will then see a "Rate your transaction" window where they can rate each other's behavior, which adds more data to both of their C3N reputation/score records.

C3N Smart Contract Worker Nodes

Figure 50:
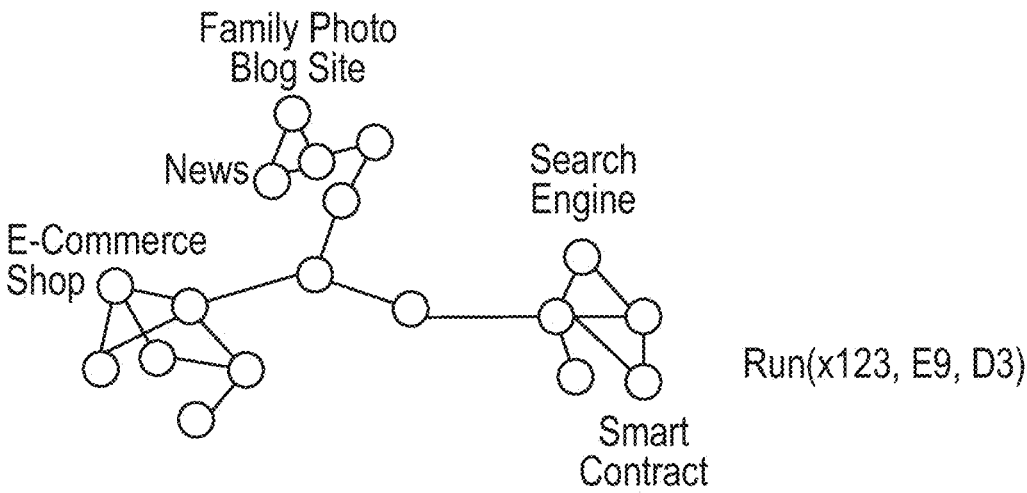
FIG. 50 depicts a distributed grid and C3N smart contract worker nodes, according to at least one embodiment of the present disclosure.

FIG. 50 depicts a distributed grid and C3N smart contract worker nodes. The section above discusses where and how the smart contract is stored and retrieved as well as where the dApp is stored and executed, but what's missing is where and how the smart contract is executed. That's what we'll discuss in this section.

The C3N ecosystem is comprised of producers and consumers. Examples of producers are node-owners that provide compute resources for apps such as an e-commerce shop, the C3N search engine or even a family photo blog site (that could be easily created using C3N's Mygrator app from content pulled from the C3N user's old Facebook account). Smart contracts run on C3N Smart Contract worker-nodes.

A C3N consumer, E9, that owns the contract executes a C3N smart contract run command, passing its identity token, which the smart contract node verifies, and uses the smart contract id, "x123", to find, decrypt, decompress and execute: run (x123, E9, D3)

Data encryption provides security and privacy is attained since the logic of the transaction is encrypted in the x123 contract and viewable only by parties involved, E9 and D3. If E9 and D3 are anonymous, C3N alias user accounts and assuming C3N does its job to "tumble" this transaction with enough other various C3N transactions, it will be nearly impossible for an observer, e.g., the internet service provider, to determine who was involved in the transaction. Note that the transaction can be executed on the C3N distributed grid, in the C3N enterprise cloud or on a C3N desktop.

Figure 51:
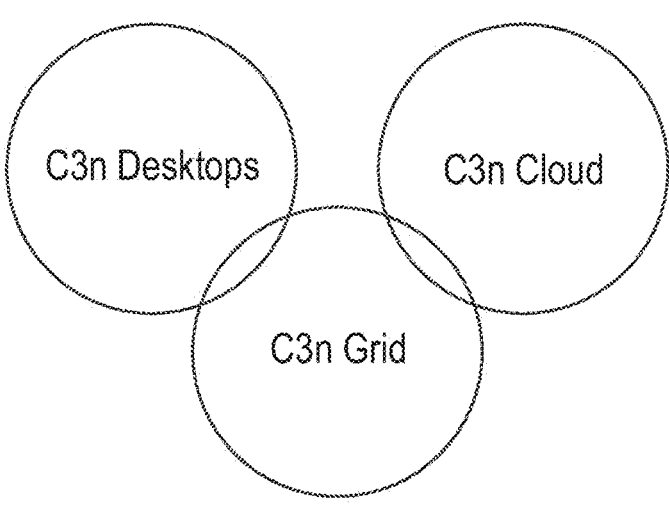
FIG. 51 depicts a Venn Diagram of the relationship between C3N deployment options, according to at least one embodiment of the present disclosure.

FIG. 51 depicts a Venn Diagram of the relationship between C3N deployment options. C3N desktops are separate and distinct from the C3N enterprise cloud. However, the C3N distributed grid can encompass C3N desktop nodes and/or C3N enterprise cloud nodes or run completely separate from either environment.

The C3N smart contract worker node not only extracts, decrypts, compiles and executes the smart contract code, but it also monitors the transfer of funds. Only after the funds are successfully transferred from E9's account to D3's account will the smart contract, the non-interactive A6 account, execute the verified logic, which finally stores the financial transaction on the Digital assets (e.g., in the form of control of a digital fungible token) blockchain.

A Closer Look at C3N Contract

Figure 52:
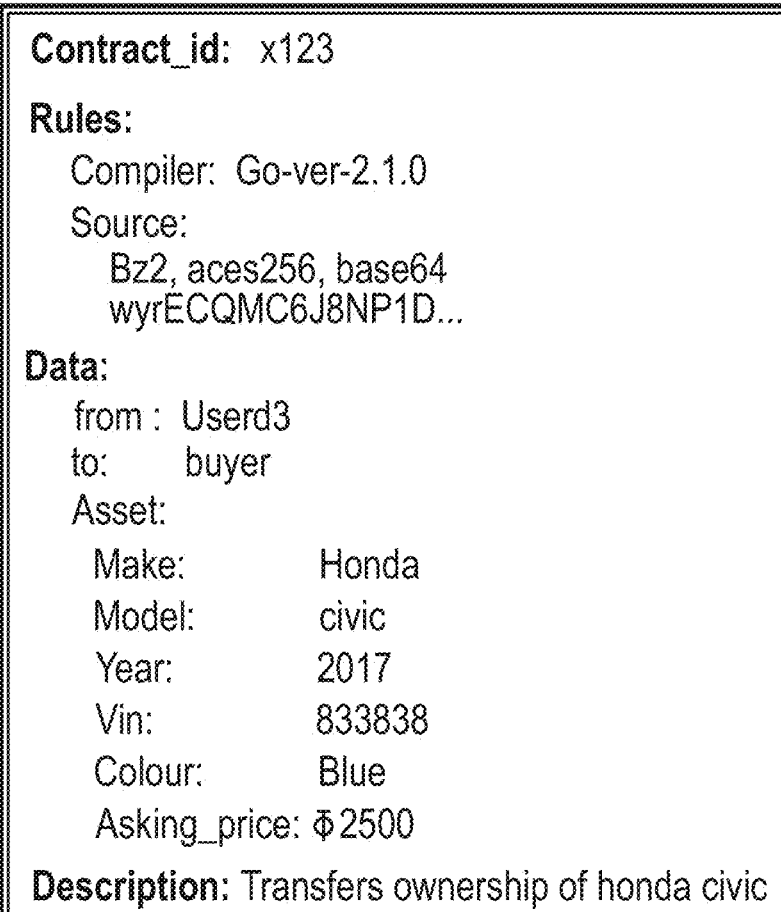
FIG. 52 depicts an example data structure for a C3N smart contract, according to at least one embodiment of the present disclosure.

FIG. 52 depicts an example data structure for a C3N smart contract. The contract_id, x123, is actually the hash of the contents. In contrast to typical www resources that are identified by the host where the contents can be found, e.g., https://hostname.com/mycontract.html, the smart contract is located by a hash of it's contents and can thereby be stored on multiple distributed nodes.

This is the same method by which IPFS works. C3N will use IPFS to store it's smart contracts, but might implement a similar distributed storage infrastructure if IPFS becomes too slow or has any other issue that is not up to C3N standards.

A C3N smart contract is comprised of three items:

1) contract_id, discussed above 2) code aka "rules", which indicates the computer language compiler used to interpret, compile and execute the source code. The source attribute indicates the compression and encryption algorithms used as well as which encoding is used.

3) The "data" item is a set of key value pairs that the smart contract is expecting. The values can be plugged into variables in the C3N smart contract.

Figure 53:
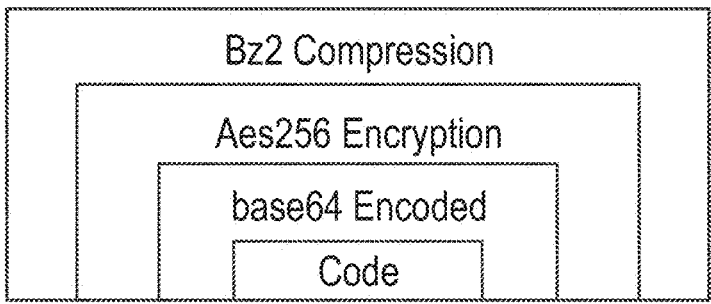
FIG. 53 depicts various transformations on smart contract code, including encoding, encryption, and compression, according to at least one embodiment of the present disclosure.

FIG. 53 depicts various transformations on smart contract code, including encoding, encryption, and compression.

Figure 54:
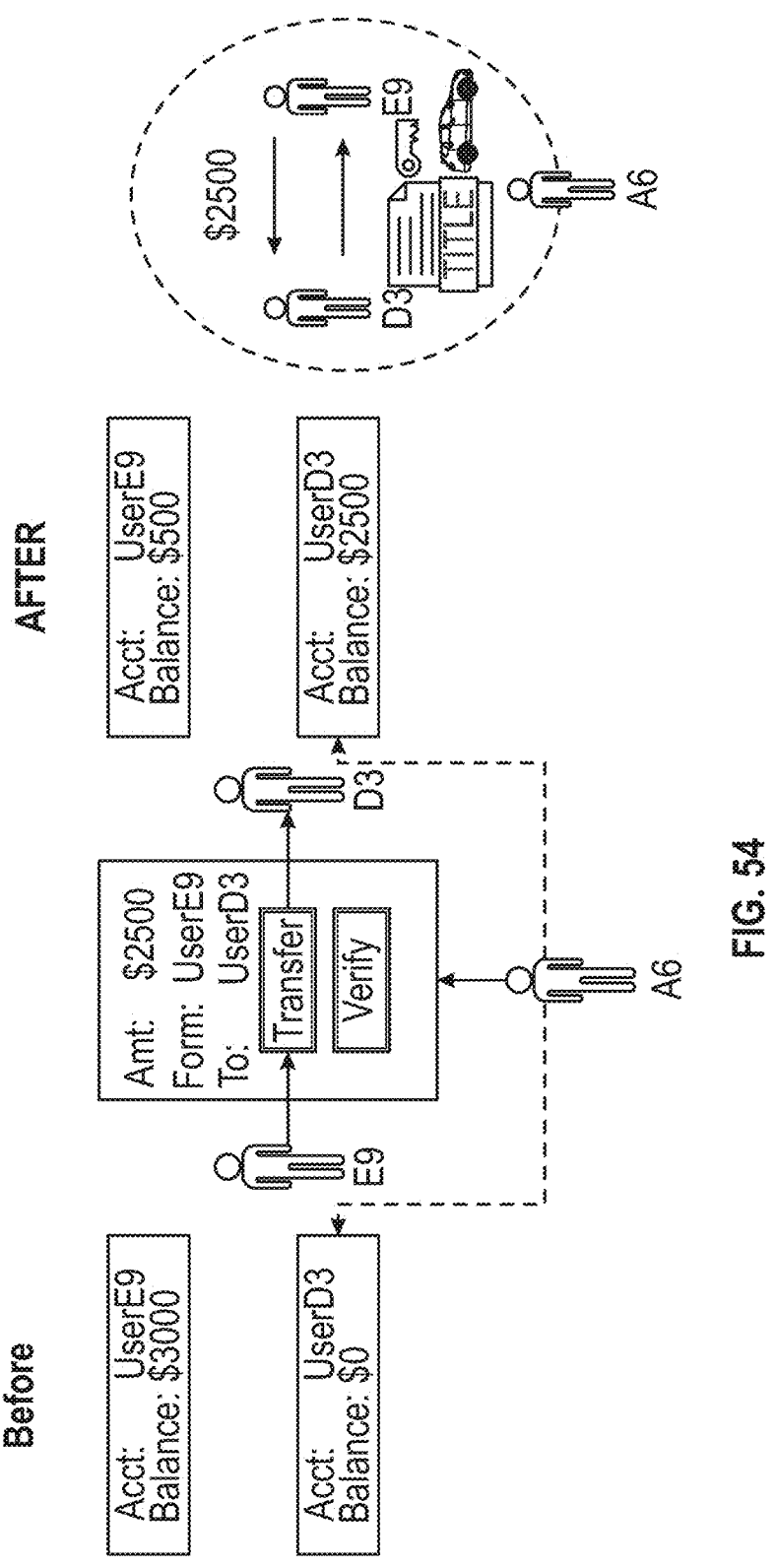
FIG. 54 depicts the execution of a C3N smart contract, according to at least one embodiment of the present disclosure.

FIG. 54 depicts the execution of a C3N smart contract.

C3N and Web 3.0

Figure 55:
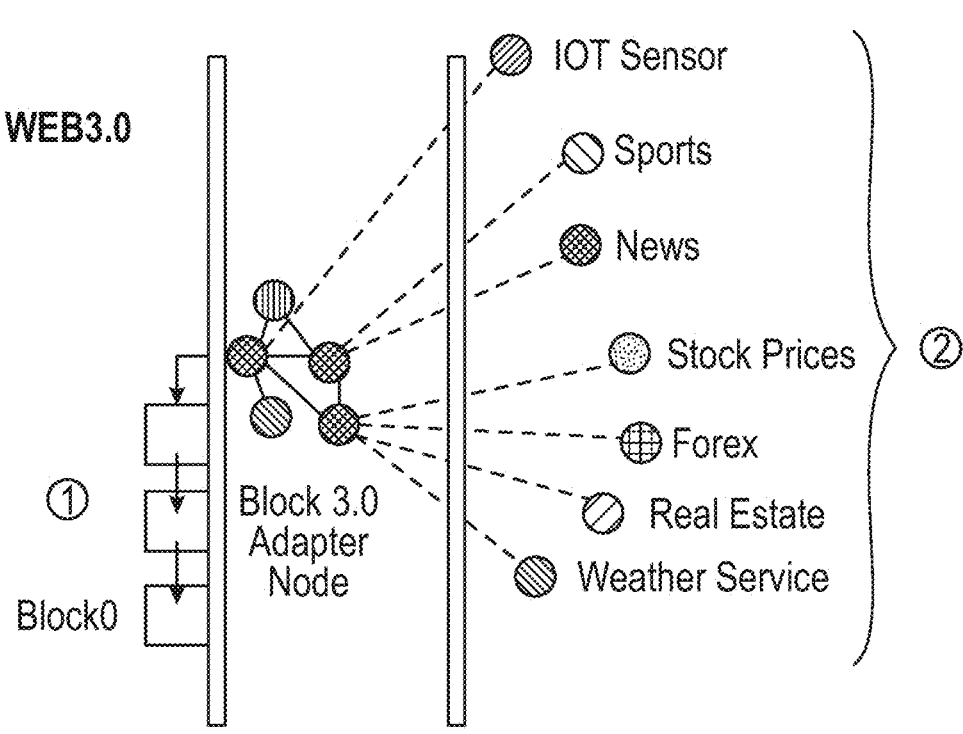
FIG. 55 depicts how a web 3.0 adapter node interfaces between web2.0 and web 3.0 applications, according to at least one embodiment of the present disclosure.

FIG. 55 depicts how a web 3.0 adapter node interfaces between web2.0 and web 3.0 applications. This is yet another area where C3N will create an entirely new market place for buyers (1) (web3.0 smart contracts) and sellers (2) (web2.0 services that provide "what happened" data).

Following this page, the smart contract shopper will find the service level agreement with terms and conditions and the ability to purchase insurance.

C3N Data Service Market

Figure 56:
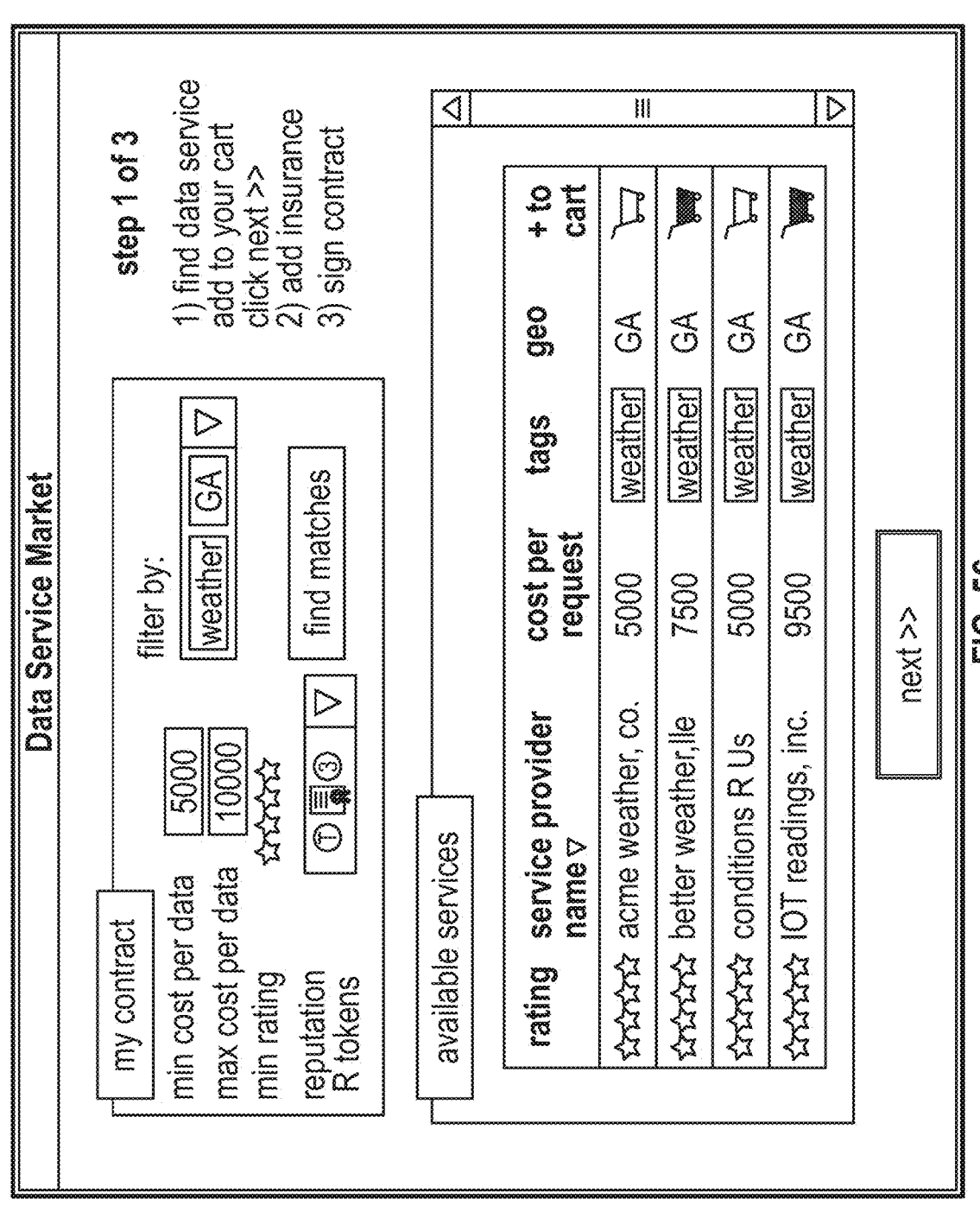
FIG. 56 depicts various aspects of a C3N data service market, according to at least one embodiment of the present disclosure.

FIG. 56 depicts various aspects of a C3N data service market. This is yet another area where C3N will create an entirely new market place for buyers (web3.0 smart contracts) and sellers (web2.0 services that provide "what happened" data).

Following this page, the smart contract shopper will find the service level agreement with terms and conditions and the ability to purchase insurance.

C3N Scoring System

Figure 57:
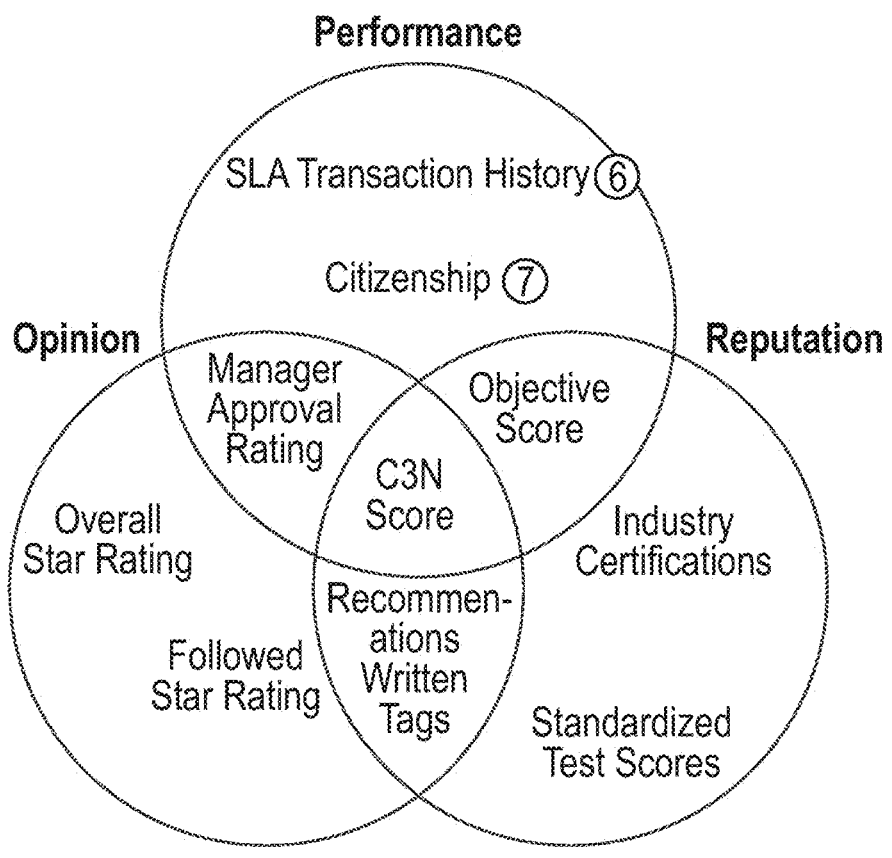
FIG. 57 depicts a Venn Diagram of C3N scoring, according to at least one embodiment of the present disclosure.

FIG. 57 depicts a Venn Diagram of C3N scoring. In at least one embodiment of the present disclosure, systems and methods for rating the behavior of all consumers and producers in the C3N ecosystem are described herein.

In at least one embodiment of the present disclosure, C3N Scoring system provides incentives for excellence in performance, improves the security of transactions, helps to grow the C3N ecosystem and improves C3N users' experiences using the social media app.

In at least one embodiment of the present disclosure, if a user opts to have ads in their daily feed of posts, there is a mechanism for the user to allow or disallow ads based on ad-creator's C3N Score. It will no longer be a centralized system of control that determines what fills one's feed, but rather the user that specifies what they want to see. Users can specify whether they want to allow the C3N system to learn what they like to provide targeted ads. The default is to not profile users. This is an inversion of control. The user in control of the system, not the other way around. The C3N score is used through out the C3N ecosystem to ensure that the most trusted entities handle the highest value transactions and processes, to rank and sort posts, to determine compensation and infrastructure algorithms, like determining leader election in a cluster of C3N nodes.

Differences between the C3N Scoring System and others:

The formula that determines the score will be made known to C3N users.

Worker nodes with a proven track record of excellent service level agreement (SLA) contract performance will be rewarded with a higher C3N score. The higher a node's C3N score, the more likely it is that they'll be selected as the manager of the cluster and will receive Digital assets (e.g., in the form of control of a digital fungible token) compensation for their results.

The following is sample code that may be used to generate C3N scores:

```
package main
type Performance struct {
    slaTxHistory [ ]int
}
type Opinion struct {
    mgrApprovalRating [ ]int
    overallStarRating [ ]int
    followedStarRating [ ]int
}
type Reputation struct {
    vouchedForPoints [ ]int
    industryCerts [ ]int
    testScores [ ]int
}
func avgScore(intAry [ ]int, weight int) (result int) {
    if len(intAry) == 0 {
        return 0
    }
    sum := 0; dontCount := 0; hasOneOrMore := false
    for _, num := range intAry {
        if num == 0 {
            dontCount += 1
        } else {
            sum += num
            hasOneOrMore = true
        }
    }
    if !hasOneOrMore {
        return 0
    }
    return sum * weight / (len(intAry) – dontCount)
}
func main( ) {
    performance : = Performance{
        slaTxHistory: [ ]int{3, 3, 3},
        citizenship: [ ]int{3},
    }
    opinion := Opinion{
        mgrApprovalRating: [ ]int{3, 3, 3},
        overallStarRating: [ ]int{5, 5, 5, 5, 5, 5, 5, 5, 5, 5, 5, 5, 5, 5, 5, 5, 5, 5, 5, 5,
5, 5, 5,5, 5, 5, 5},
        followedStarRating: [ ]int{1, 1, 1},
    }
    reputation := Reputation{
        vouchedForPoints: [ ]int{3},
        industryCerts:   [ ]int{0},
        testScores:    [ ]int{3, 3, 3},
    }
    avgSlaHistory := weightedAverage(performance.slaTxHistory, 100)
    avgCitizenship := weightedAverage(performance.citizenship, 100)
    avgMgrApprovalRating := weightedAverage(opinion.mgrApprovalRating, 100)
```

-continued

```
avgOverallStarRating := weightedAverage(opinion.overallStarRating, 100)
avgFollowedStarRating := weightedAverage(opinion.followedStarRating, 100)
avgVouchedForPoints := weightedAverage(reputation.vouchedForPoints, 100)
avgIndustryCerts := weightedAverage(reputation.industryCerts, 100)
avgTestScores := weightedAverage(reputation.testScores, 100)
c3nScore := weightedAverage([ ]int{avgSlaHistory, avgCitizenship,
avgMgrApprovalRating, avgOverallStarRating, avgFollowedStarRating,
avgVouchedForPoints, avgIndustryCerts, avgTestScores}, 1)
    println("avgSlaHistory ", avgSlaHistory)
    println("avgCitizenship ", avgCitizenship)
    println("avgMgrApprovalRating", avgMgrApprovalRating)
    println("avgOverallStarRating", avgOverallStarRating)
    println("avgFollowedStarRating", avgFollowedStarRating)
    println("avgMgrApprovalRating", avgVouchedForPoints)
    println("avgIndustryCerts", avgIndustryCerts)
    println("avgTestScores", avgTestScores)
    println("c3nScore", c3nScore)
}
```

The above source code may be compiled and executed to generate the following output:

```
avgSlaHistory 300
avgCitizenship 300
avgMgrApprovalRating 300
avgOverallStarRating 300
avgFollowedStarRating 300
avgMgrApprovalRating 300
avgIndustryCerts 0
avgTestScores 300
c3nScore 300
```

Equally Weighted Example

Figure 58:
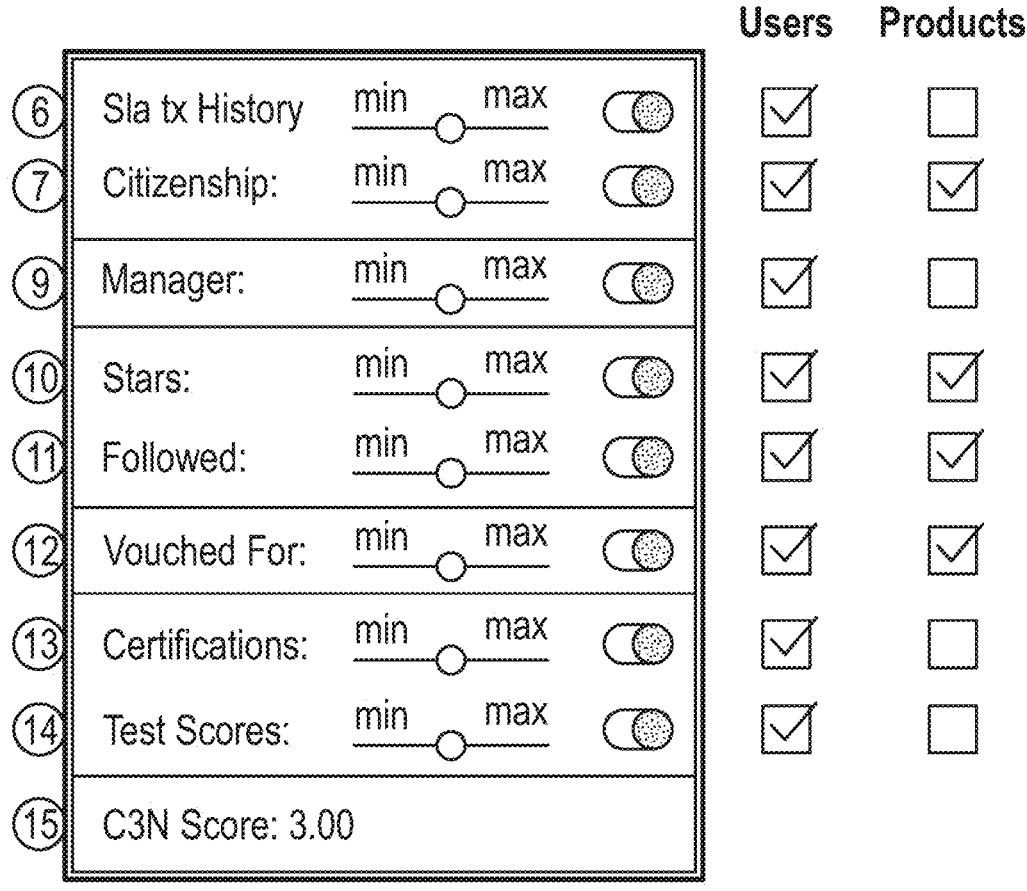
FIG. 58 depicts an example weighting scale for determining a C3N score, according to at least one embodiment of the present disclosure.

FIG. 58 depicts an example weighting scale for determining a C3N score.

The user interface (UI) that would correspond to the equally weighted (1) data, in the code example above, would look like the following (excluding the users and products columns (2)).

All the slider values begin in the middle of the scale. In source code that middle value represents 100 (8). The minimum value is 1 and the maximum value is 199 (17). Later, we'll see how moving the slider impacts the overall C3N score.

All scores are applicable to a user. Hence, all the check marks under user (3) are checked. Some user accounts are non-interactive (4), e.g. the user identity of a C3N app that provides a service, e.g. VPN, storage, media transformation, email confirmation, custom logic, etc. would be considered non-interactive.

Figure 59:
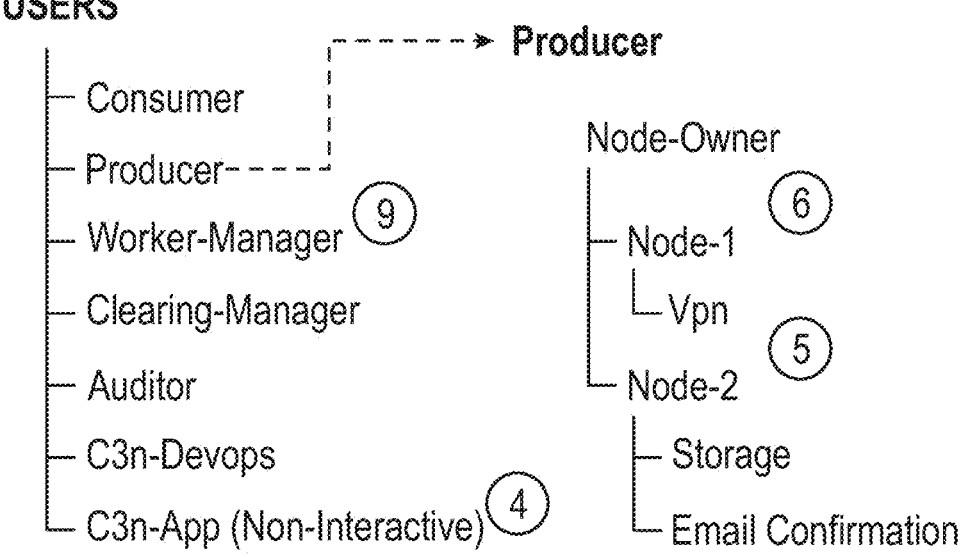
FIG. 59 depicts users and producer in a C3N environment, according to at least one embodiment of the present disclosure.

FIG. 59 depicts users and producer in a C3N environment.

Sla Tx History

A node-owner is a type of interactive user that can own a number of nodes. Nodes (5) are compute resources, e.g., computers, that can run C3N apps. The node-owner agrees to Service Level Agreements (SLA), e.g., promising that they'll keep their nodes running 99.99% of the time for six months. C3N keeps track of node up-time and other performance metrics is able to rate the node performance based on the SLA contract. Those records are objective, based on log file records and are rolled up under the node-owner. Hence, the node-owner can increase their rating by owning and running nodes that perform well and are thereby incentivized to be a well-run producer in the C3N ecosystem. NODE-1 and NODE-2 both have a C3N score, based completely on the SLA Transaction History "sla tx history" records (6). The node-owner inherits their nodes' scores and also receives a score from their manager node. The manager node score will provide remedy for a node-owner that encountered environmental threats, e.g., DDOS attacks, but was able to explain to their worker manager what happened; In that case, the nodes would retain their history of possibly poor performance, but the worker-manager's rating could offset the otherwise poor overall rating. (See more in the Compensation Pyramid section.)

Citizenship

Both interactive and non-interactive users can be assigned a citizenship score (7). This is used as a means of policing the C3N ecosystem. For example, if the C3N system becomes aware that DDOS attacks have been launched from, or that a NODE is the source of any type of attack on the ecosystem, those attacks will be recorded and the NODE will be scored accordingly. If the node-owner has a number of NODES that have a low citizenship score, that user might be banned from C3N for bad behavior, pending confirmation from their manager node.

C3N consumer users do not need to own any NODES. If any C3N user commits offenses against the system, etc. launching DOS attacks, hacking C3N NODES or attacking other C3N users, their actions will be recorded and if confirmed, their citizenship score will be reduced and can be banned from C3N.

Manager

Manager nodes (9) are trusted nodes. They closely monitor worker nodes' performance and might need to confirm exception reports from their workers. Initially, there might be human interaction required to confirm worker exception reports. The goal is to automate as much of the managerial processes as possible.

Stars

Figures 60, 61:
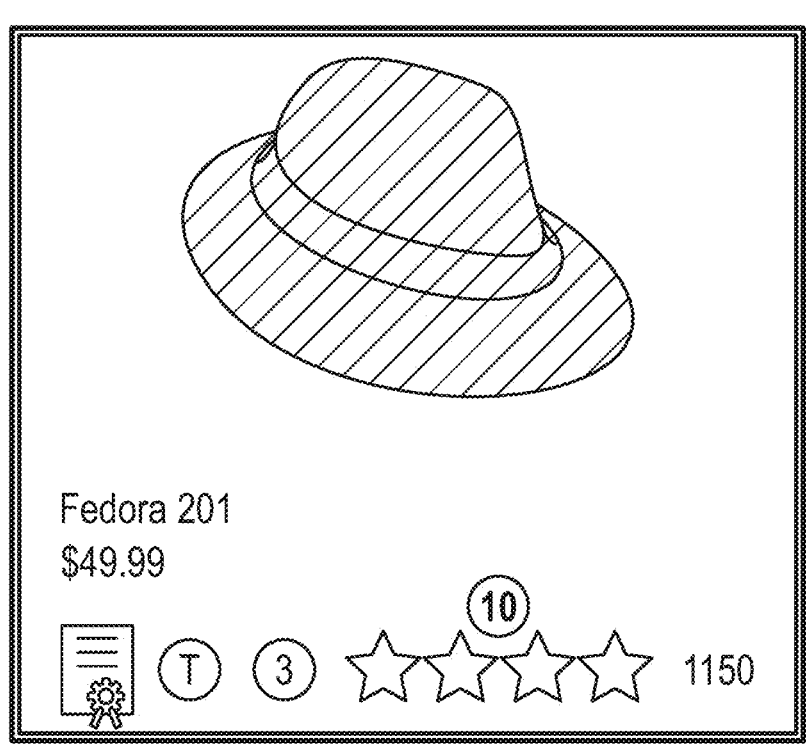
FIG. 60 depicts an example product with a C3N rating, according to at least one embodiment of the present disclosure.
FIG. 61 depicts an example showing how a user can use a combination of on/off toggles and sliders to impact the C3N score, according to at least one embodiment of the present disclosure.

Products receive a 1 to 5 star rating. FIG. 60 depicts an example product with a C3N rating.

Followed

This novel feature allows the C3N users to specify how much impact the ratings submitted by other C3N users that they follow (11) will have upon the C3N overall score for a product.

Followed impact and the Slider/Locking Mechanisms

FIG. 61 depicts an example showing how a user can use a combination of on/off toggles and sliders to impact the C3N score.

In order to increase the impact of one scoring category over others, the user simply needs to move the blue dot of the slider to the right (16). In the example above, the user decreased the impact of the stars rating and increased the impact of the followed rating.

The same code as shown previously can be used with the following changes that represent what happens when the user decreases the value of the stars to its min value and increases the followed to its max value:

FIG. 62 depicts code changes may be implemented that can be implemented to change how ratings are determined.

FIG. 63 depicts the results of code change to change ratings.

Changes the sliders changes the weighting that is applied to the stars and followed ratings. Since the stars ratings are all 5's and the followed ratings are all 1's, we see that overall C3N score changes from 3.00 to 2.43 (18).

FIG. 64 depicts an example showing how a user can use a combination of on/off toggles and sliders to impact the C3N score.

If any scores are encountered with the value of 0, that score is skipped and assumed not available when calculating the C3N score. (18) The user can force a value of 0 by disabling the rating. (19)

In the UI depicted in FIG. 64, the user has disabled all the ratings except for stars and followed. Note that the slider knobs for the disabled sliders change from blue to gray and the C3N score changes from 2.43 to 1.02 (20).

Recommendations

Interactive users can provide recommendations for other interactive users. Hence, a user can enter the C3N ecosystem with a reasonable C3N score and roles, given the points earned from the recommendations and the reputation of the user(s) that recommended them.

Each written recommendation is worth 10 points, which are split into two 5 point ratings for the purpose of the C3N rating system. (12) Users can also increase their C3N score with skill tags. Each skill tag is worth 1 point, but they are accumulated in groups of 5 for the purpose of the C3N rating system. A user won't see their C3N score increase with 1, 2, 3 or 4 tags, but once they get the 5th tag, all 5 will count.

Figure 65:
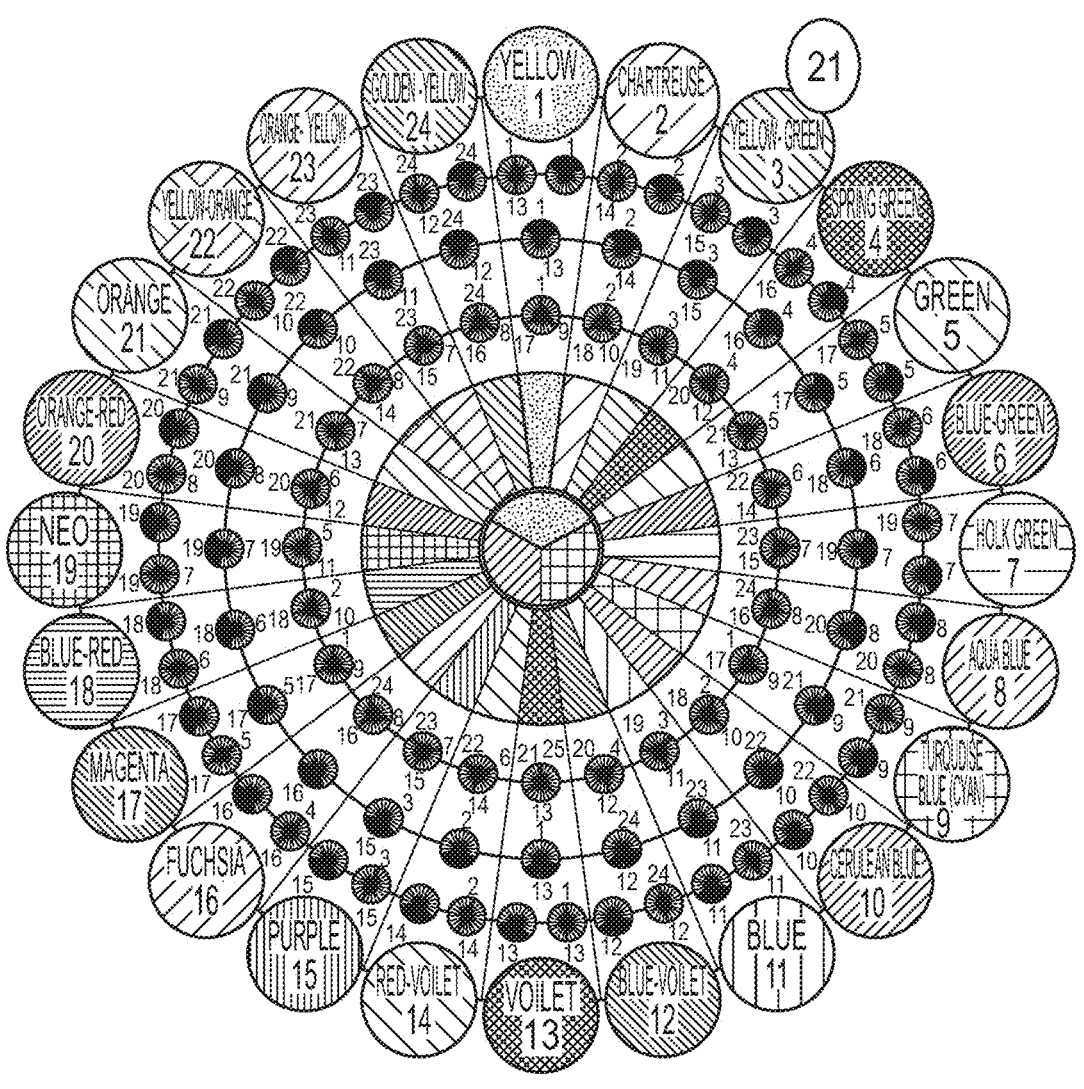
FIG. 65 depicts a greyscale version of a color wheel representative of different C3N scores, according to at least one embodiment of the present disclosure.

If the user that receives a written recommendation operates at or above an average C3N score of 4.5, then the voucher, i.e., the person that provided their written recommendation, will receive voucher_success digital tokens as a reward and they will receive a voucher badge. The color of the voucher badge will increase as the number of NODES owned by node-owner users that they vouched for increases. FIG. 65 depicts a greyscale version of a color wheel representative of different C3N scores.

Example: Alice vouches for Bob, by providing a written recommendation for Bob. A year later, Bob's three NODES operated at or above 4.5, according to their sla tx history. Alice would receive 3 voucher_success digital tokens. Assuming voucher_success is set to 100 tokens then Alice would receive 300 tokens and her voucher badge would initially be YELLOW GREEN (21).

This system of incentives rewards users that bring other users into the C3N ecosystem with cryptocurrency as well as with colored incentive voucher badges.

Certifications

Regular users as well as node-owners, that wish to sell their services in the Device Market, can achieve a reputation rating by providing proof of industry certifications (13).

A Certification Verification Service, found in the C3N Data Service Market, can verify industry certifications. (See more details about this in the Web2.0 services for Web3.0 section.)

A user will receive a single 5 certification rating, i.e., 5 stars, for each verified industry certification. The C3N user will also receive Digital assets (e.g., in the form of control of a digital fungible token) s for achieving for each verified industry certification; they are improving the C3N ecosystem and should be rewarded.

Let's take a regular user that happens to be a Nurse as an example. That person may want to get their Nursing credentials verified. Currently, the list of Nursing credentials include:

HighestDegree Earned: Educational degrees include associate degrees (AD, ADN), bachelor's degrees (BS, BSN, BA), master's degrees (MSN, MS, MA) and doctoral degrees (PhD, DrPH, DNS, EdD, DNP).

Licensure: Licensure credentials include registered nurse (RN) and licensed practical nurse (LPN).

State Designations or Requirements: State designations or requirements signify the nurse practices at a more advanced level in the state. Examples of these credentials include APRN (advanced practice registered nurse), NP (nurse practitioner) and CNS (clinical nurse specialist).

National Certifications: National certifications are awarded through accredited certifying bodies such as the ANCC, including the RN-BC (Registered Nurse-Board Certified) and FNP-BC (Family Nurse Practitioner-Board Certified).

Awards and Honors: Awards and honors recognize outstanding achievements in nursing, such as FAAN (Fellow of the American Academy of Nursing) and FCCM (Fellow of Critical Care Medicine).

Other Recognitions: Other certifications include non-nursing certifications that recognize skills, such as EMT-Basic/EMT (awarded by the National Registry of Emergency Medical Technicians) and BELS (Board-Certified Editor for the Life Sciences).

There are specialties, too. For example, you get MSN-CNL (clinical nurse leader), MSN-FNP (family nurse practitioner), MSN-CRNA (anesthesia), etc.

A nurse that has their MSN-CNL certification verified will have their badge appear in their user profile of their C3N social media apps.

Test Scores

C3N will make available industry-specific testing services (14). For example, if the user is a Python programmer, the user can take the standardized test and make the user's test score available for recruiters on the user's C3N business social media app.

C3N Product and Services Ratings

FIG. 66 depicts C3N products and services ratings. Another place ratings will come into play is where C3N products and services are offered. Customers provide star ratings and the C3N node-owner earn C3N ratings. Buyers will be able to view sellers' C3N score and overall customer star ratings and see more details:

C3N Product and Services Marketplace

Figure 67:
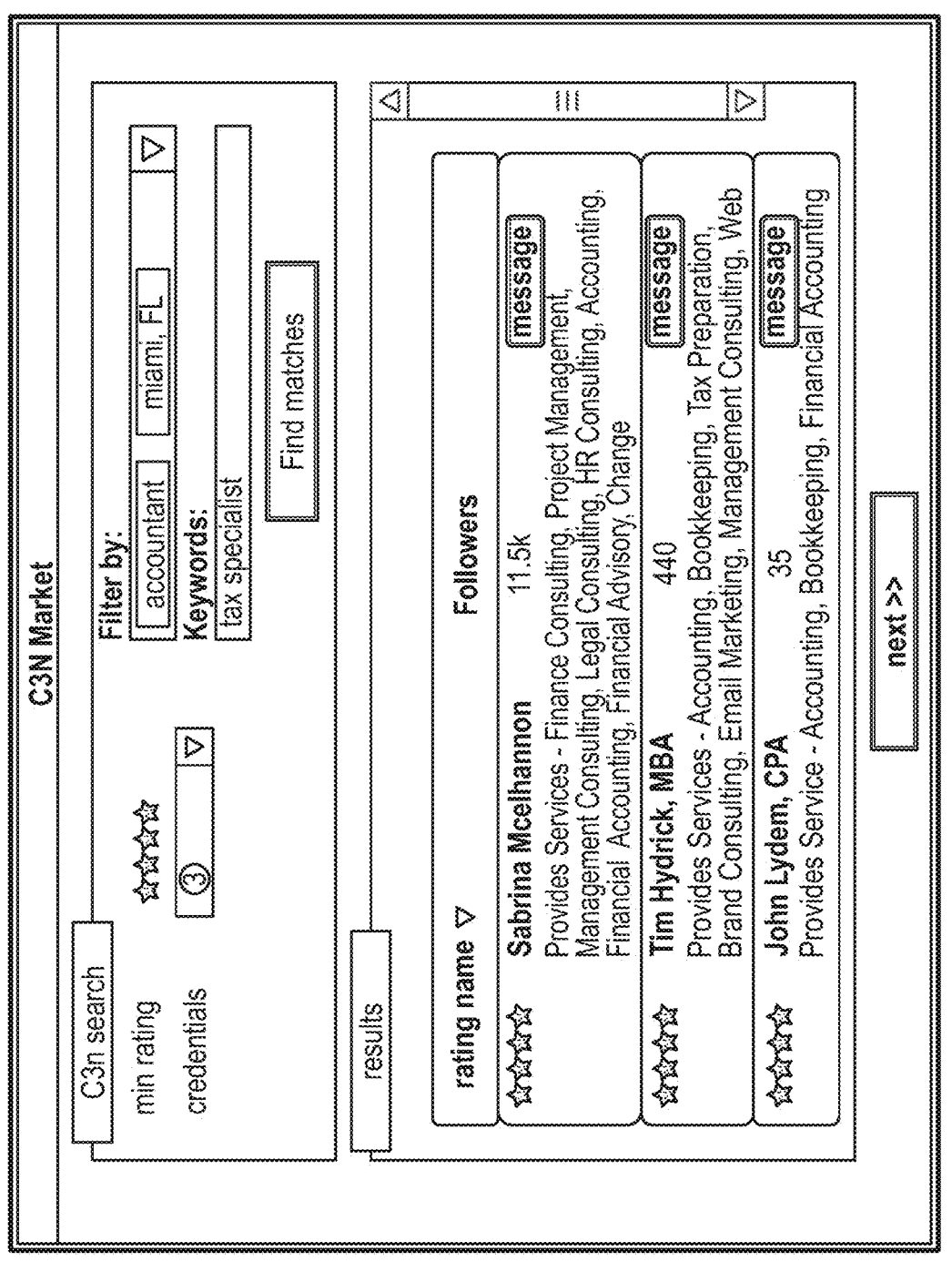
FIG. 67 depicts a C3N market utilizing C3N scores, according to at least one embodiment of the present disclosure.

FIG. 67 depicts a C3N market utilizing C3N scores. The C3N Market is the go to place to find any product or service. In the example below, the user is looking for an accountant in the Miami, FL area with a 4.0 rating or better that is also a C3N member.

The "followers" numbers come from C3N's social media data. The <Message> button will open a chat window in the C3N (business) social media app.

If the user filtered by [dating] and [Miami, FL], other filters might include [athletic], [Christian] and keywords might include things like "ironman" or "fishing". The <Message> button will open a chat window in the C3N (personal) social media app.

C3N Personal Accounts

FIG. 68 depicts stealth configurations for C3N personal accounts. C3N personal accounts come with an email (1) and calendar (2) apps.

Having a secure email client and email server is key to one's privacy.

Stealth communications (3) can be configured to hide the user's location (4), to not log any email, calendaring or communication activity. (5) The user can also have their communications TOR'd (6), see C3N Stealth Messaging for details.

C3N Email

Since the C3N user can operate not only within the C3N ecosystem, but also with the public internet and since most internet-based applications and services require an email for registration purposes, C3N offers a secure email solution.

See C3N Email, subsection C3N Email App for details.

C3N Calendar

The C3N calendar app (4) also runs in its own container and integrates with C3N email. The frontend leverages proven c-dav, fullcalendar and ical.js libraries and is mostly plain javascript like the other C3N apps. The backend runs Go and uses the C3N object storage database.

C3N Email and Calendar Novelty

Figure 69:
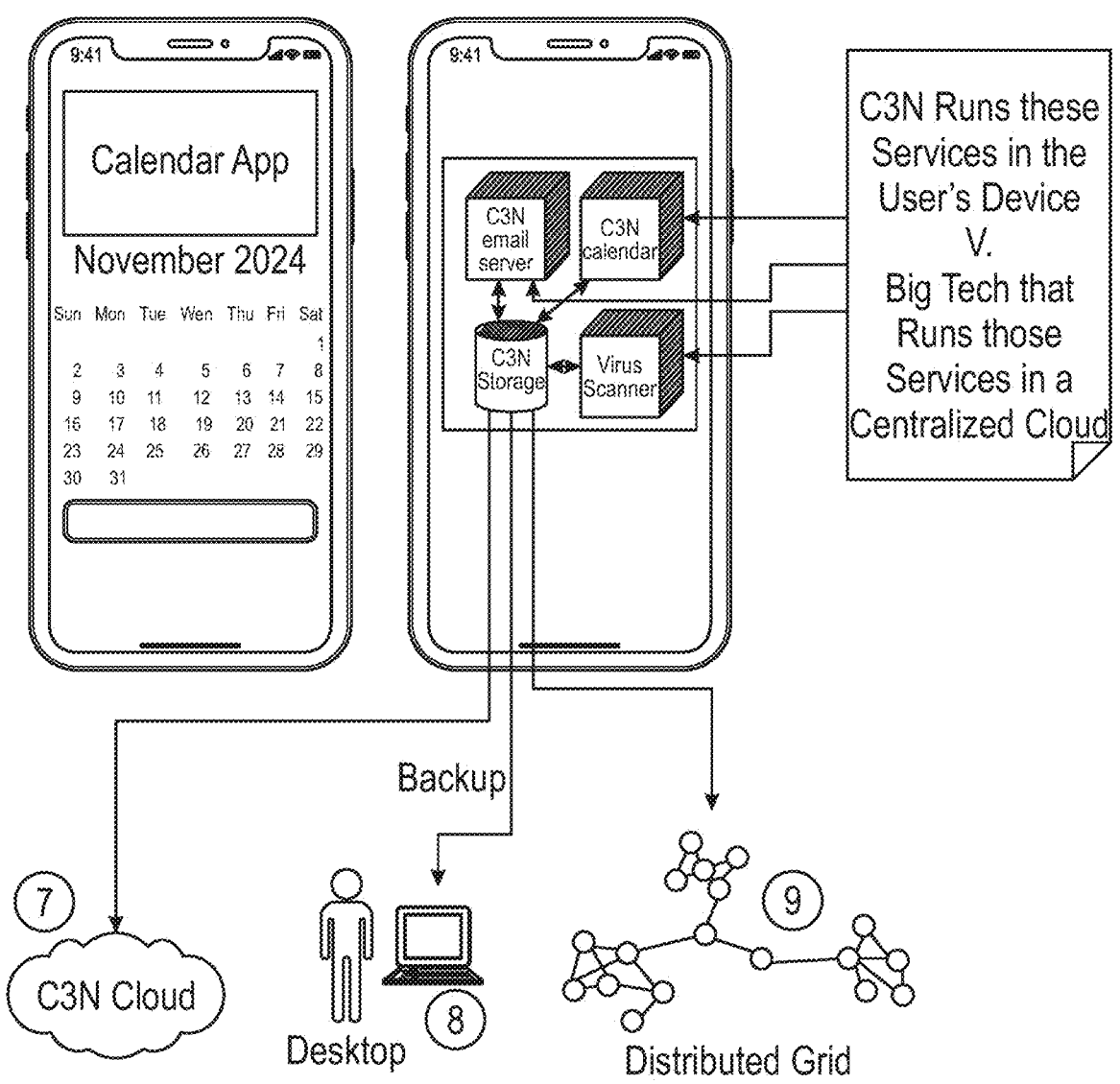
FIG. 69 depicts C3N applications running in a containerized environment, according to at least one embodiment of the present disclosure.

FIG. 69 depicts C3N applications running in a containerized environment. What makes the C3N email, calendar and virus scanning apps unique are not their features, but where and how they run.

The user controls where and when backups occur. Backups can be stored in the C3N cloud (7), on the user's desktop (8) (or an external USB drive connected to their workstation) as well and to the C3N grid. (9)

The C3N model represents an inversion of control away from the creeping centralization of Social media and social networking. With C3N, the user is in control. The users' private email and calendar data reside on their devices, not in the cloud infrastructure of one of a handful of gigantic Social media and social networking corporations that parse every email and calendar entry in order to exploit user's behavioral data and otherwise private conversations.

The C3N ecosystem offers a comprehensive solution that will replace the current Big Tech monopolies with a better, digital free market system comprised of social media apps and an infrastructure that enables privacy-first, secure communication and commerce that will make America great again.

Trend Reader

Figure 70:
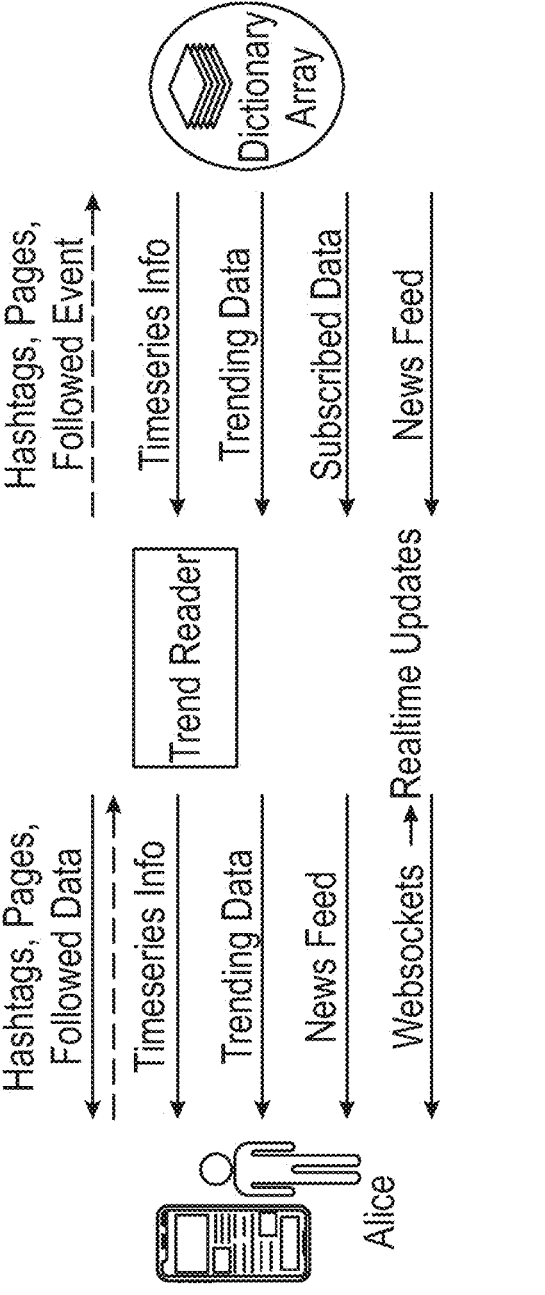
FIG. 70 depicts a trend reader of the C3N social media platform that may be utilized by users to share posts, receive others' posts, and allow users to respond, according to at least one embodiment of the present disclosure.

FIG. 70 depicts a trend reader of the C3N social media platform that may be utilized by users to share posts, receive others' posts, and allow users to respond. User interactions can lead to organized events.

Trend reader service may be constantly displaying trending data and posts from friends/people/news feeds they follow. User interactions generate events (dashed yellow line). As a result, C3N keeps users feeds updated with the latest posts and trends.

Figure 71:
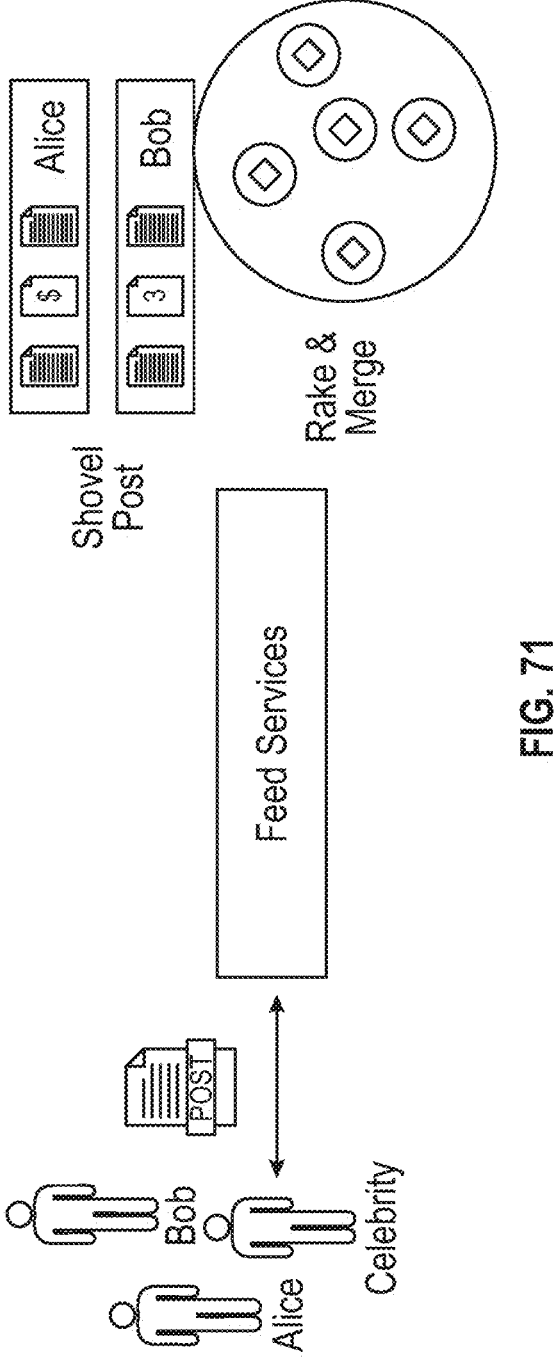
FIG. 71 depicts a high-speed social media platform architecture, according to at least one embodiment of the present disclosure.

FIG. 71 depicts a high-speed social media platform architecture.

Users create posts that are "shoveled" to distributed, high speed key value stores of their friends/followers.

Celebrity users' posts are treated differently b/c of the huge number of followers.

During the merge process, when a user's HOME page's posts are sequenced chronologically, posts from the celebrities they follow are merged into their FEED.

As a result, C3N can handle billions of user posts per second.

High Performance Characteristics

Figure 72:
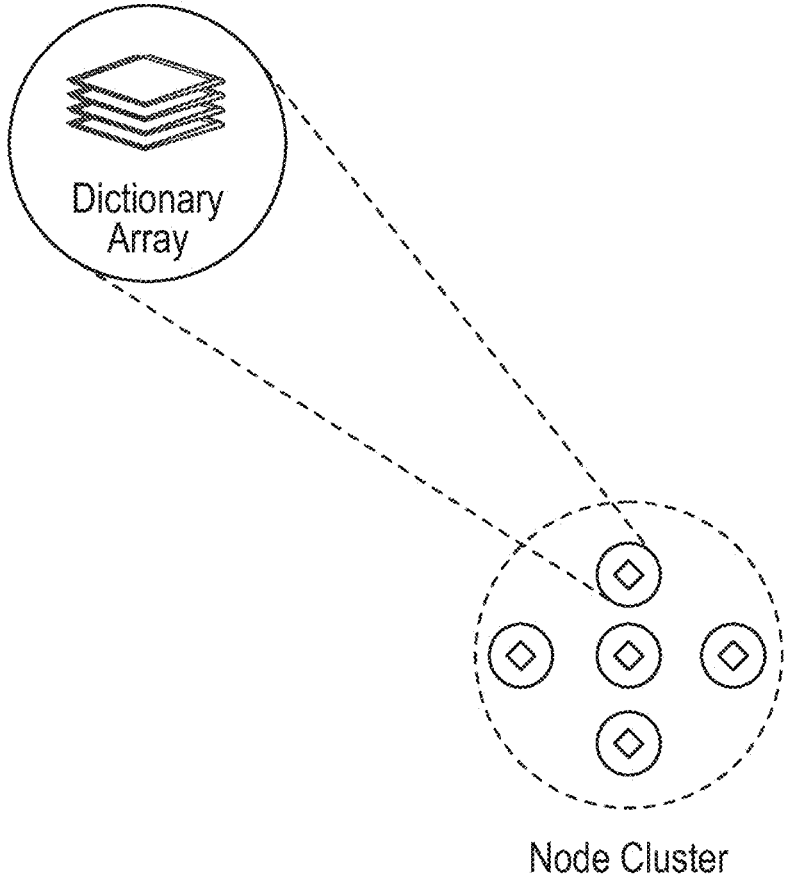
FIG. 72 depicts a dictionary array utilized in the context of a node cluster, according to at least one embodiment of the present disclosure.

FIG. 72 depicts a dictionary array utilized in the context of a node cluster. In at least one embodiment of the present disclosure, SuperApp achieves high performance by limiting the feed history to 24 hours or less. This keeps the amount of data that needs to be stored in the data dictionary nodes from growing without bounds and allows those nodes to store that data in memory rather than thrashing back and forth between RAM and the hard drive.

In at least one embodiment of the present disclosure, nodes can be scaled up when there is high demand and scaled back when there is not. Furthermore, because the user's location is known, the placement of nodes in their cluster can be optimized to be nearby, thus further improving performance.

In at least one embodiment of the present disclosure, C3N stores data in high speed key/value stores that scale well.

News Service

Patterns of data flow and technology are repeated over and over in C3N.

Shovel & Rake posts technique
Realtime Stream Processors
Metadata database & object store.
Dictionary Array In at least one embodiment of the present disclosure, the text in a news post will be filtered and sorted by the Shovel Post stream processors. Digital media like photos and videos will also be processed and placed in a digital media object store.

In at least one embodiment of the present disclosure, after the stream processing logic stores the text and media, the next step, Rake & Merge occurs. In order to put the post in the users' feed, the system must "rake" the posts from the dictionary arrays.

In at least one embodiment of the present disclosure, before finally delivering the content to the users, the system will determine if the user is following any Celebrities. If so, the system will rake in those posts and merge the results before displaying the timestamp sorted feed of posts to the user.

Figure 73:
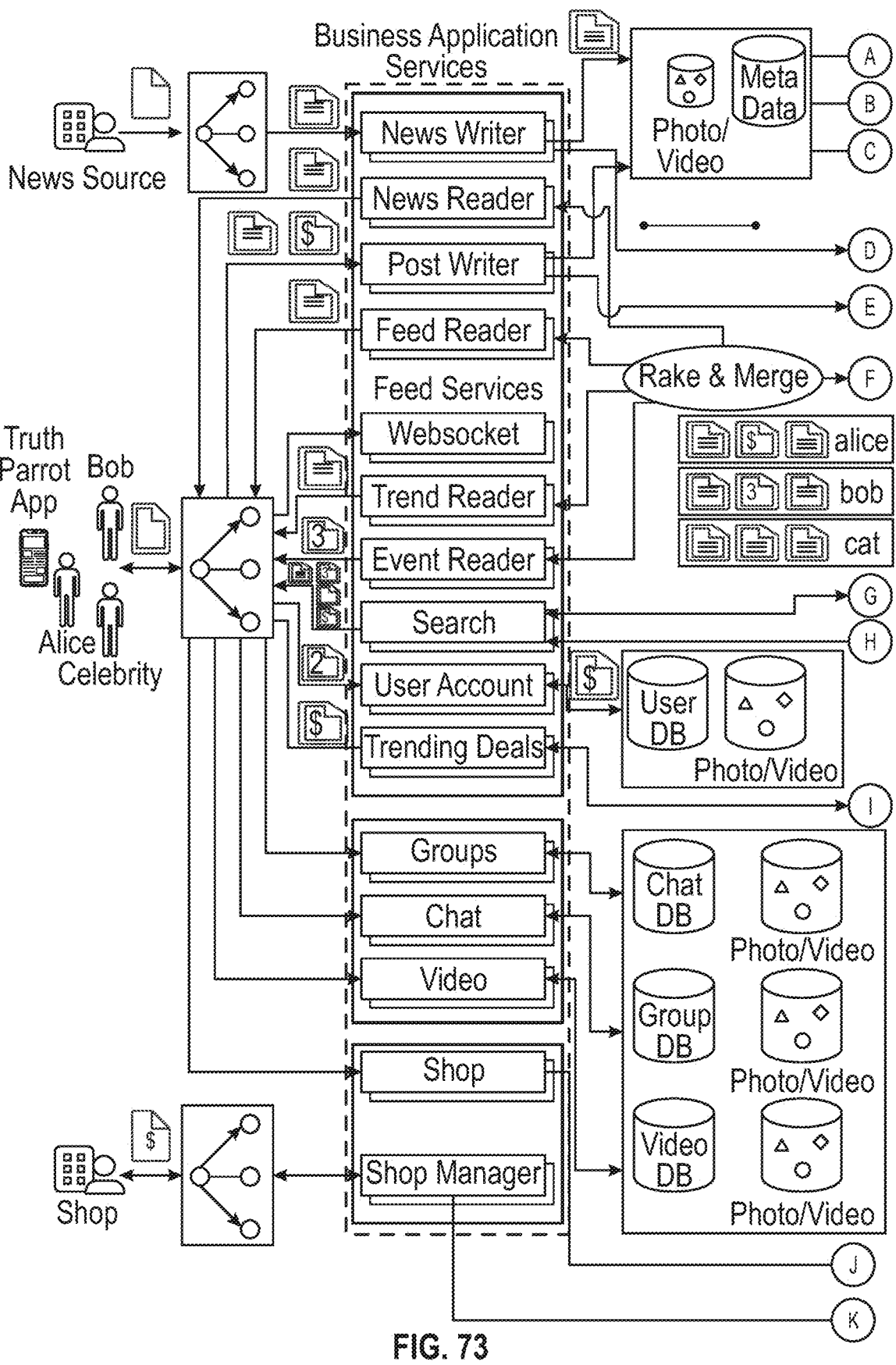
FIG. 73 depicts a high-level C3N social media architecture diagram, according to at least one embodiment of the present disclosure.
Figure 73:
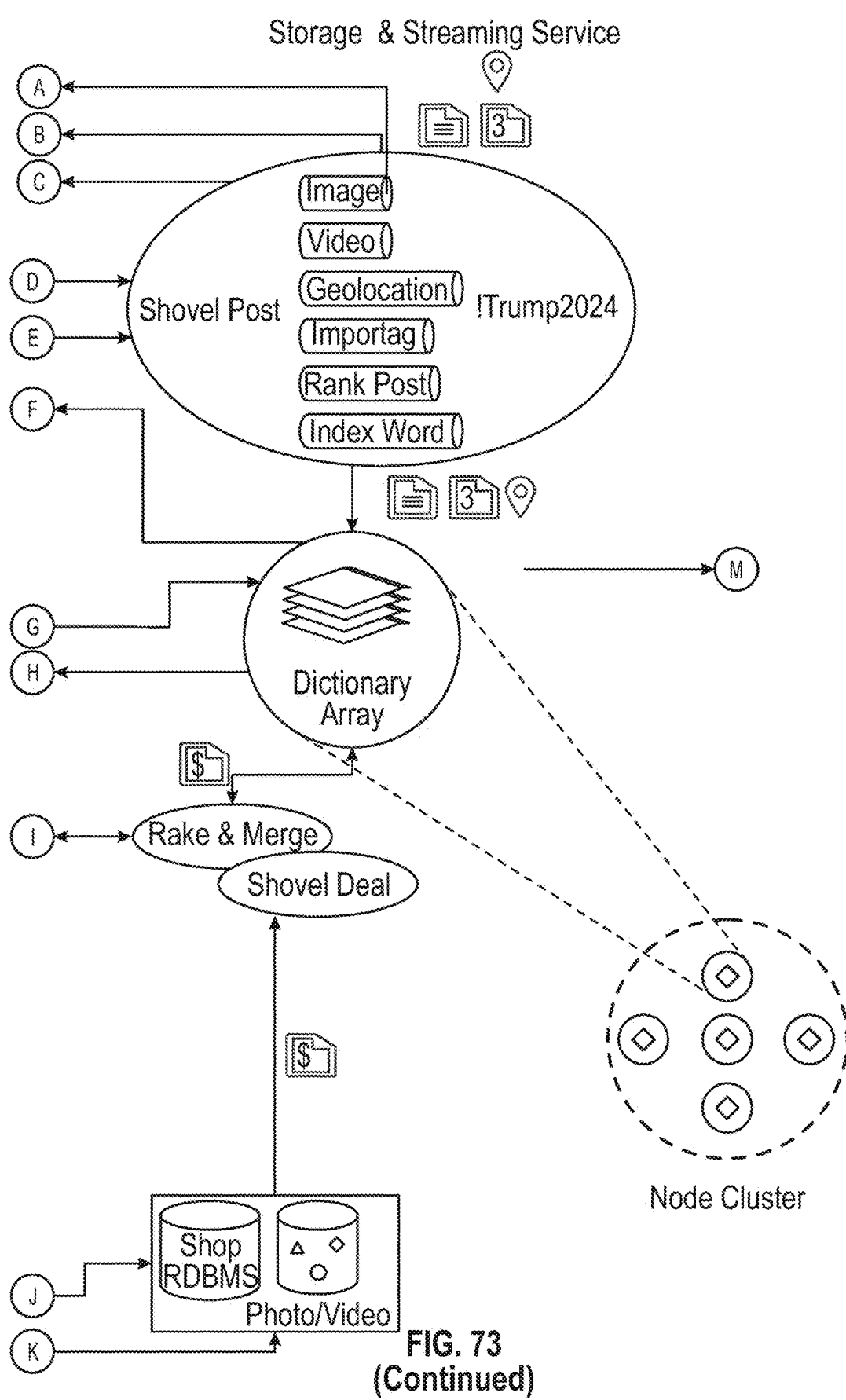
Figure 73:
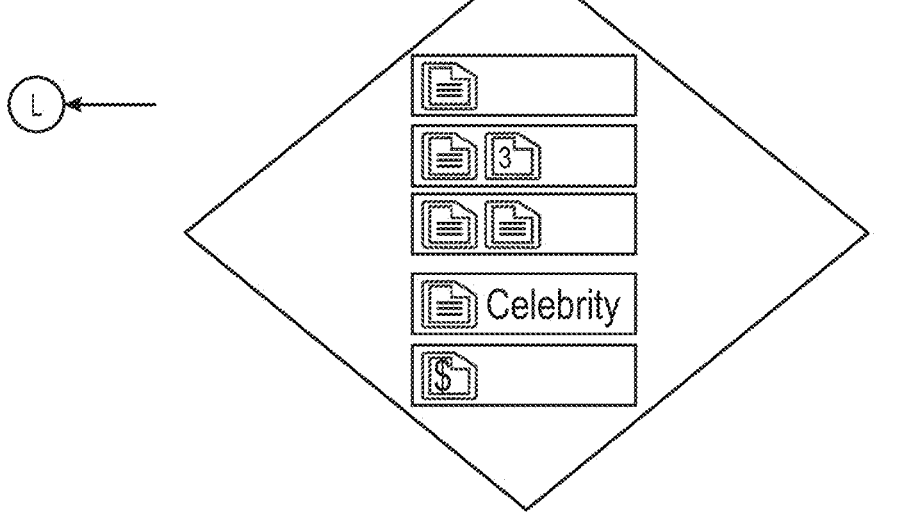

Other things that make this social media architecture superior to existing tech:

Designed for IoT & Grid Computing
Can run on low energy Raspberry Pi's
Highly Scalable
Consistent compiled executables that run in
Immutable Containerized environments
FIG. 73 depicts a high-level C3N social media architecture diagram.

Figure 74:
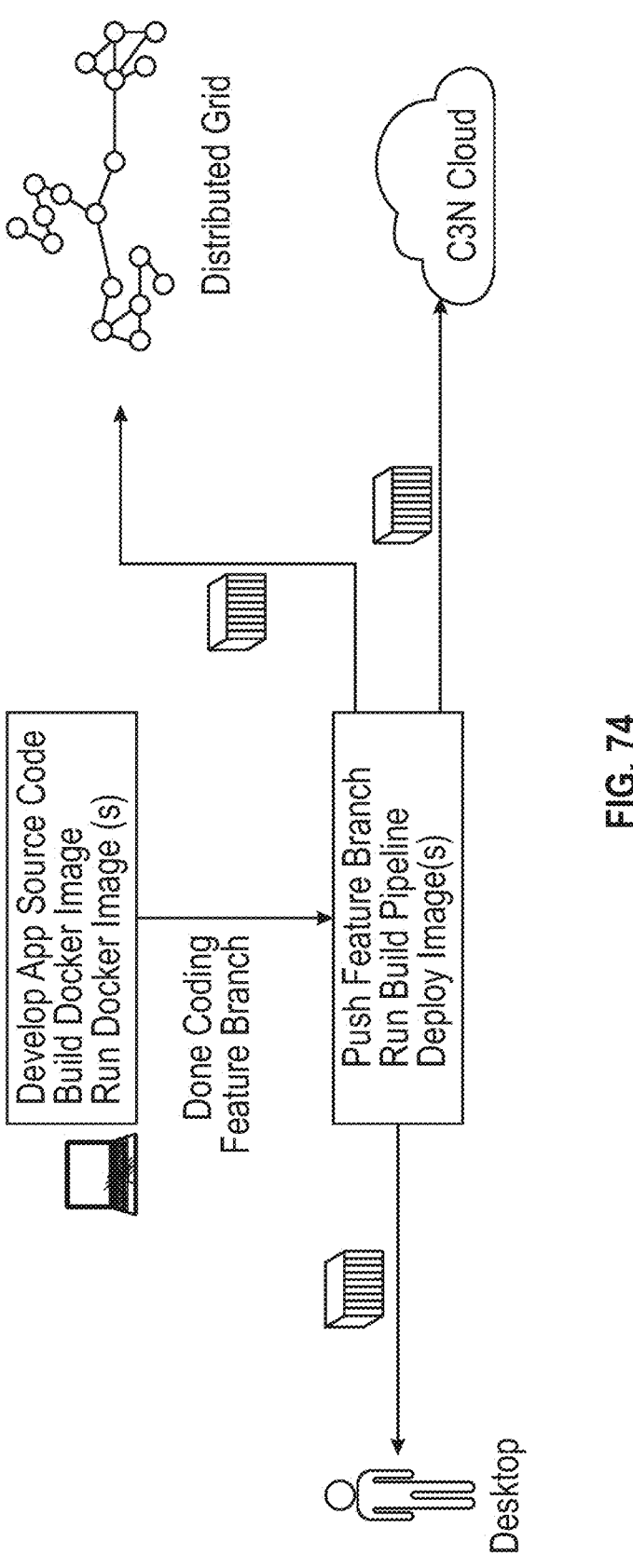
FIG. 74 depicts a deployment process for C3N applications, according to at least one embodiment of the present disclosure.

C3N Containerized environment Based Software Development, Build and Deployment Process FIG. 74 depicts a deployment process for C3N applications. Containers may be used to provide standards to development, devops, and production. A C3N Containerized environment may be deployed to C3N cloud, on-premises (e.g., desktop), C3N distributed cloud.

Where Things Run

C3N frontend apps are Progressive Web Apps (PWAs) and can run in any platform.

For the highest level of security and privacy, run the C3N (Linux) operating system on a desktop/laptop or on the C3N de-Googled Android phone.

C3N Mygrator

Figure 75:
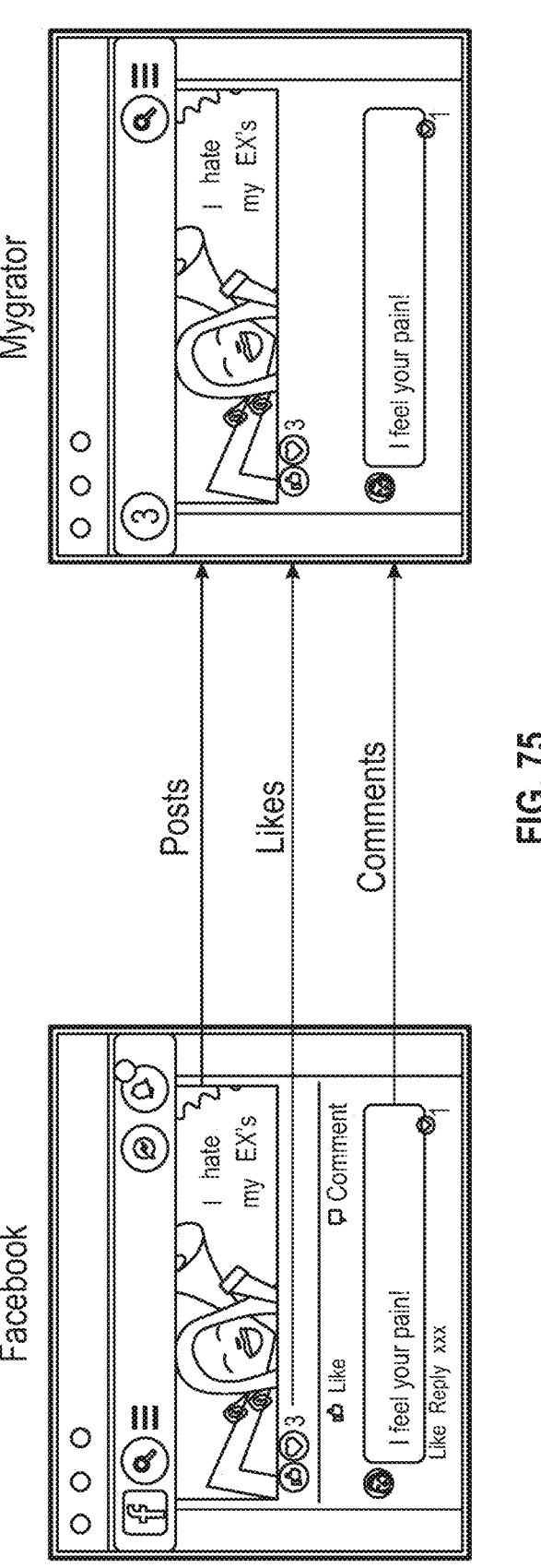
FIG. 75 depicts a high-level overview of Mygrator, according to at least one embodiment of the present disclosure.

FIG. 75 depicts a high-level overview of Mygrator.

C3N Mygrator may be used to easily copy social media content from existing social media apps like Facebook to the Mygrator archive. Users can copy their social media to any target app, e.g., TruthSocial.

Figure 76:
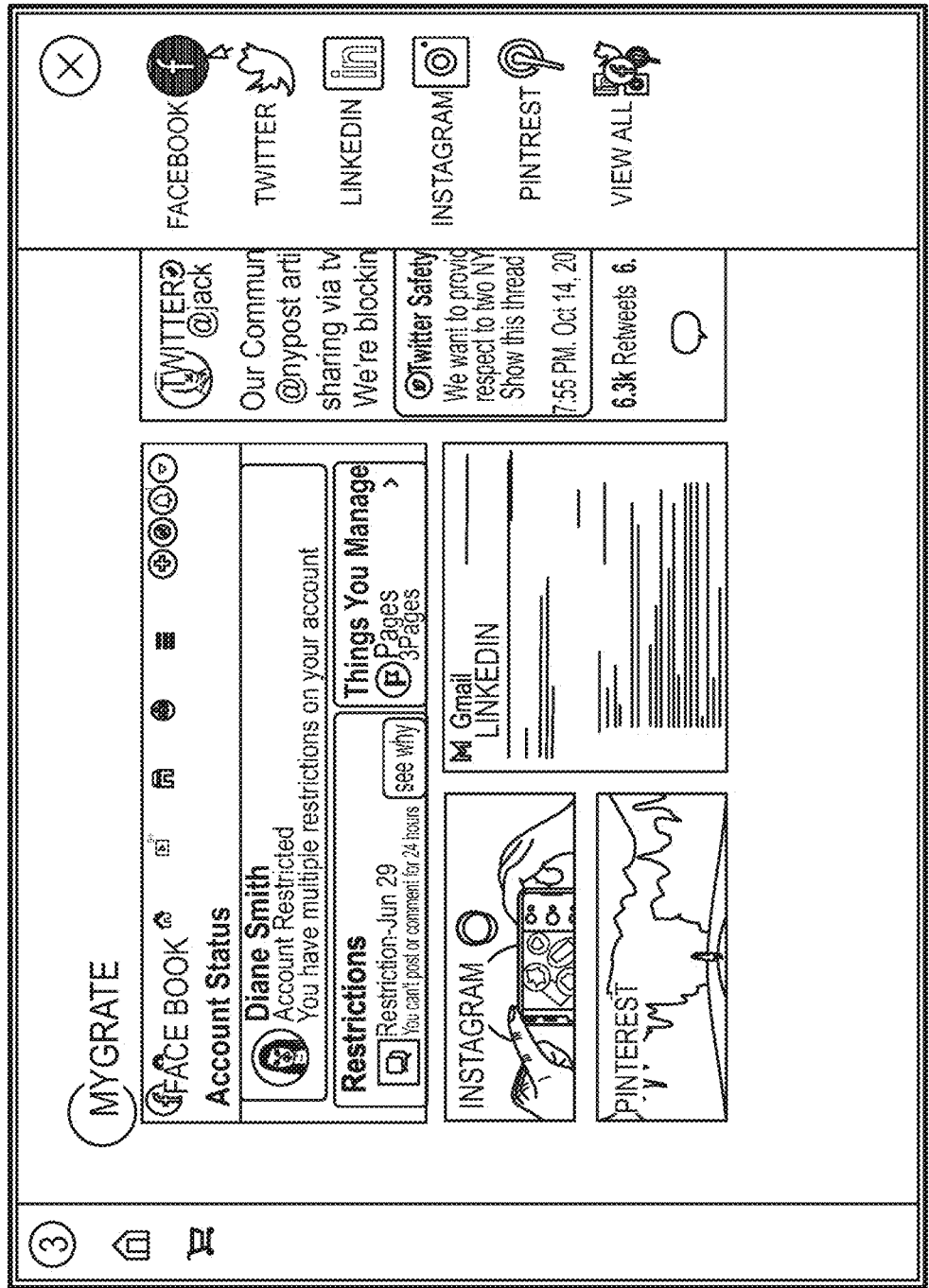
FIG. 76 depicts a graphical interface of C3N Mygrator, according to at least one embodiment of the present disclosure.

C3N Mygrator may be used in the following manner:

1) Select source social media app, as depicted in FIG. 76.

Figure 77:
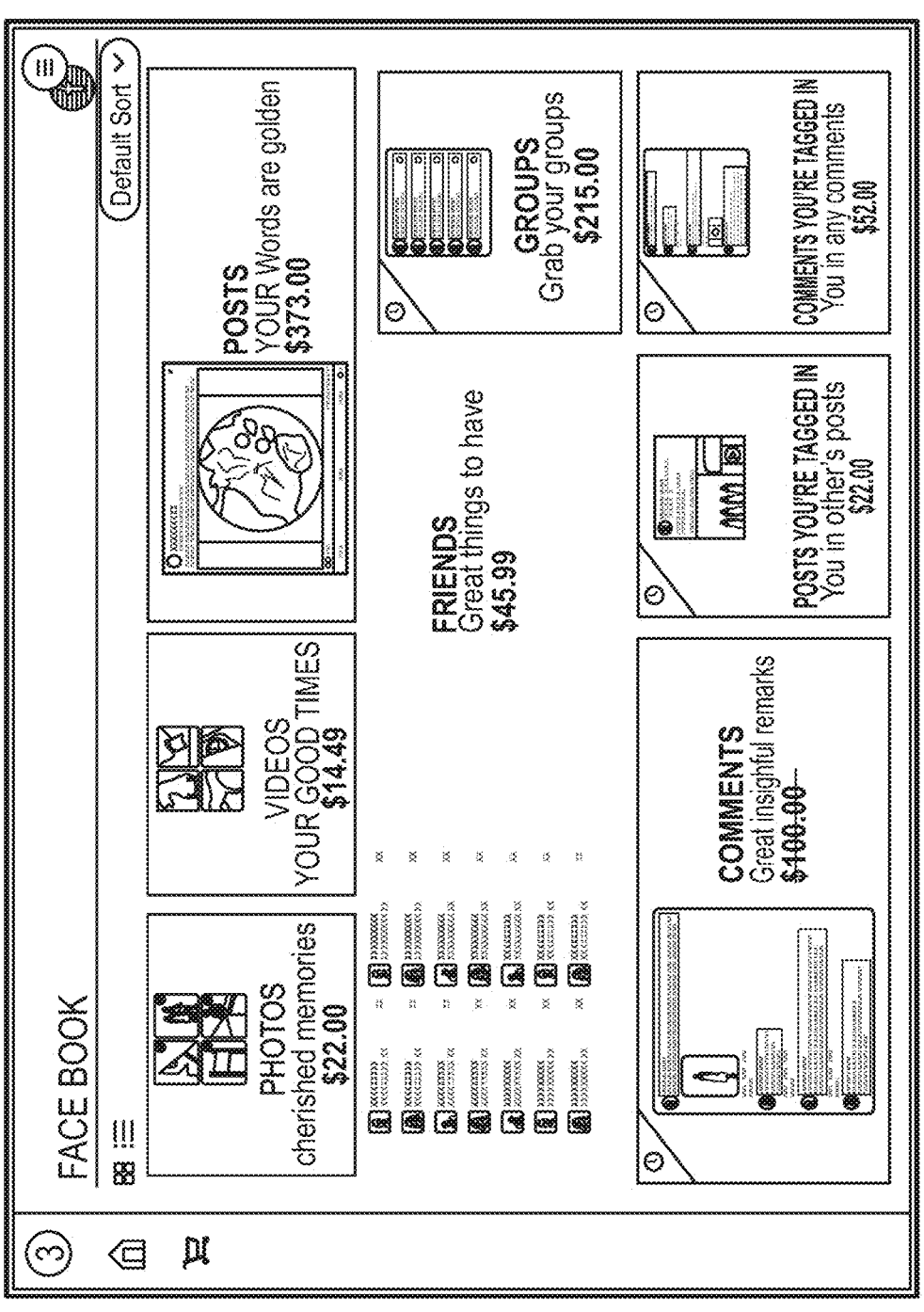
FIG. 77 depicts a graphical interface of C3N Mygrator, according to at least one embodiment of the present disclosure.

2) select social media types from the selected app (e.g., FB), as depicted in FIG. 77.

Figure 78:
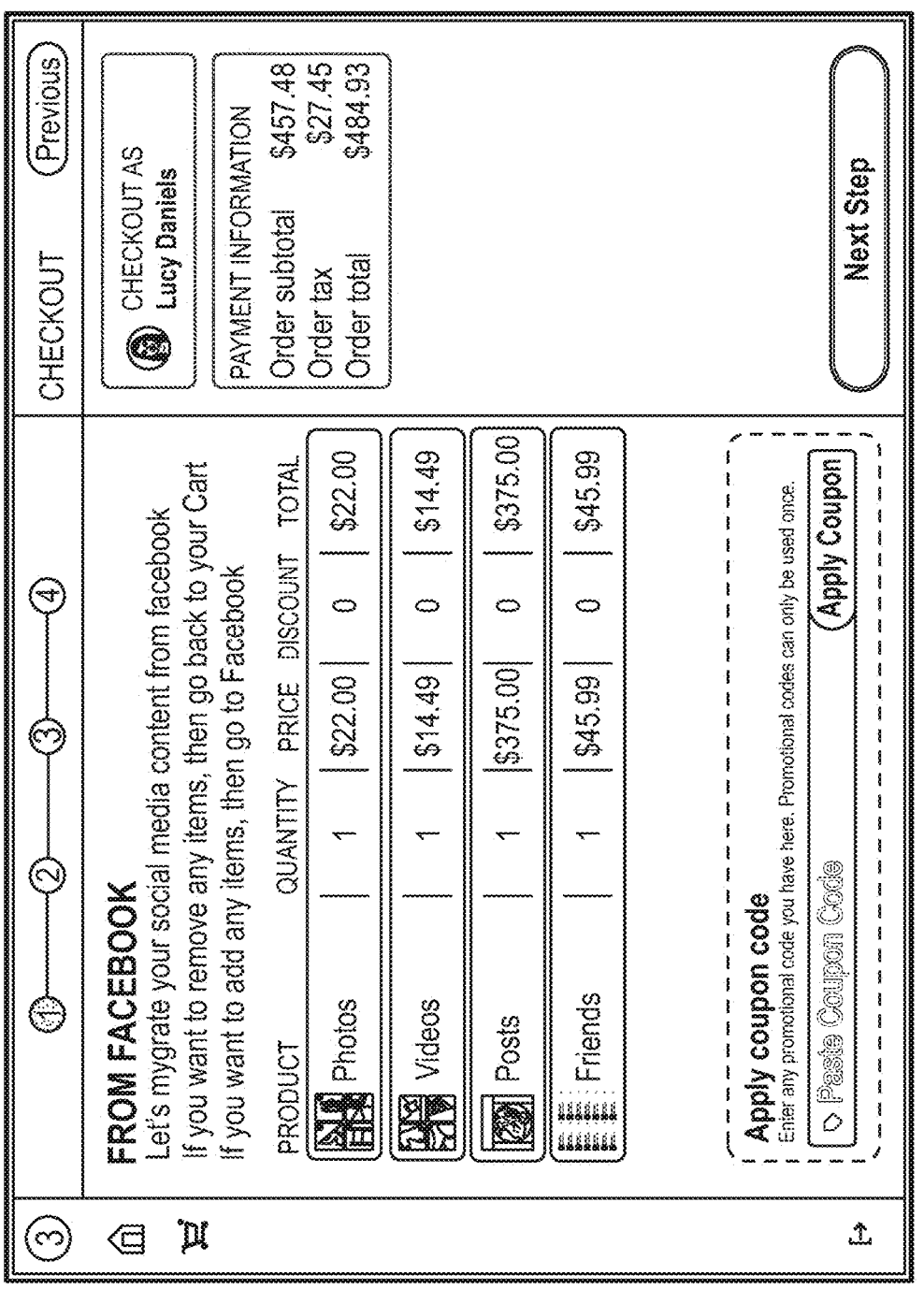
FIG. 78 depicts a graphical interface of C3N Mygrator, according to at least one embodiment of the present disclosure.

3) Checkout, as depicted in FIG. 78

Figure 79:
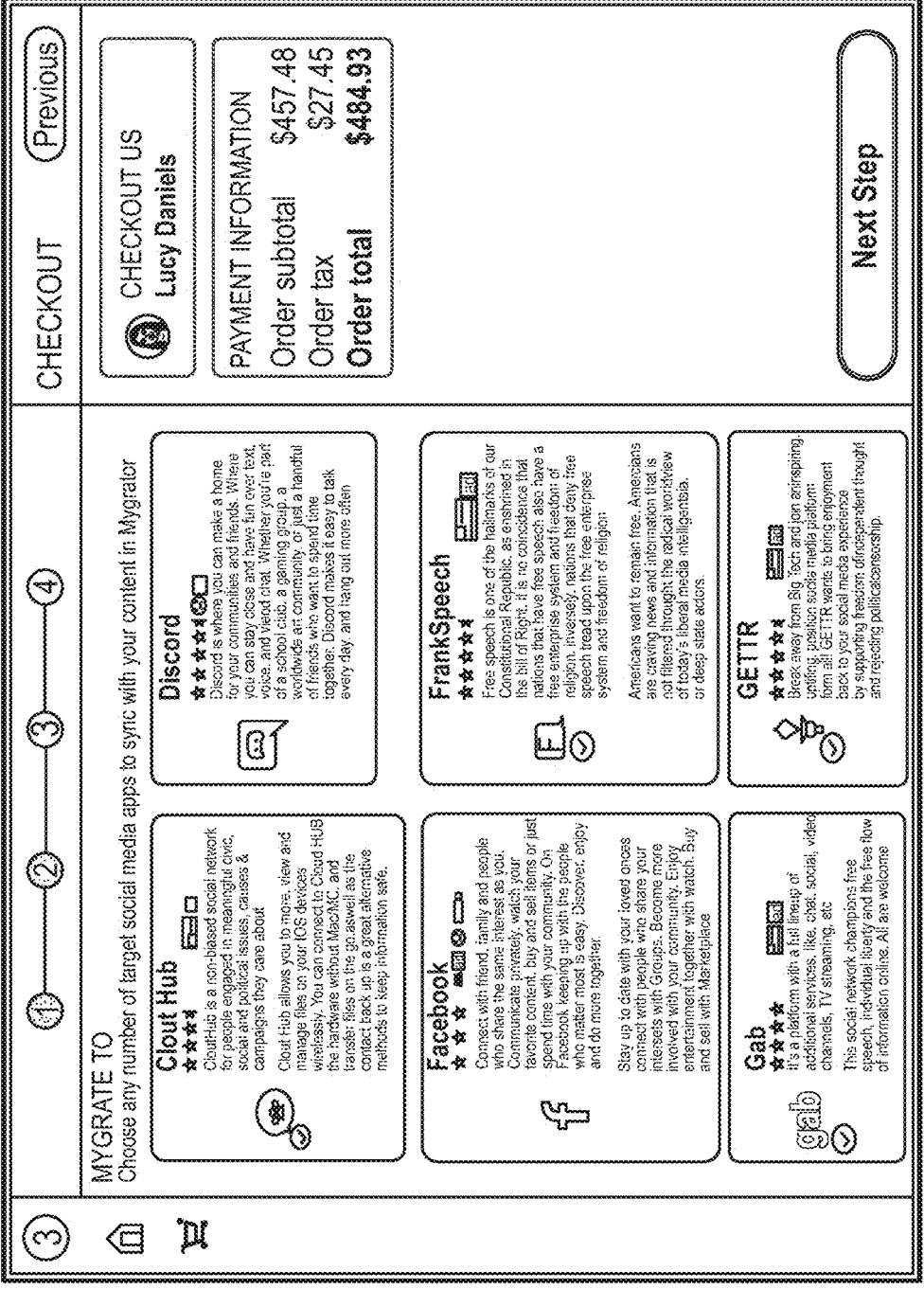
FIG. 79 depicts a graphical interface of C3N Mygrator, according to at least one embodiment of the present disclosure.

4) Select target app, as depicted in FIG. 79.

Figure 80:
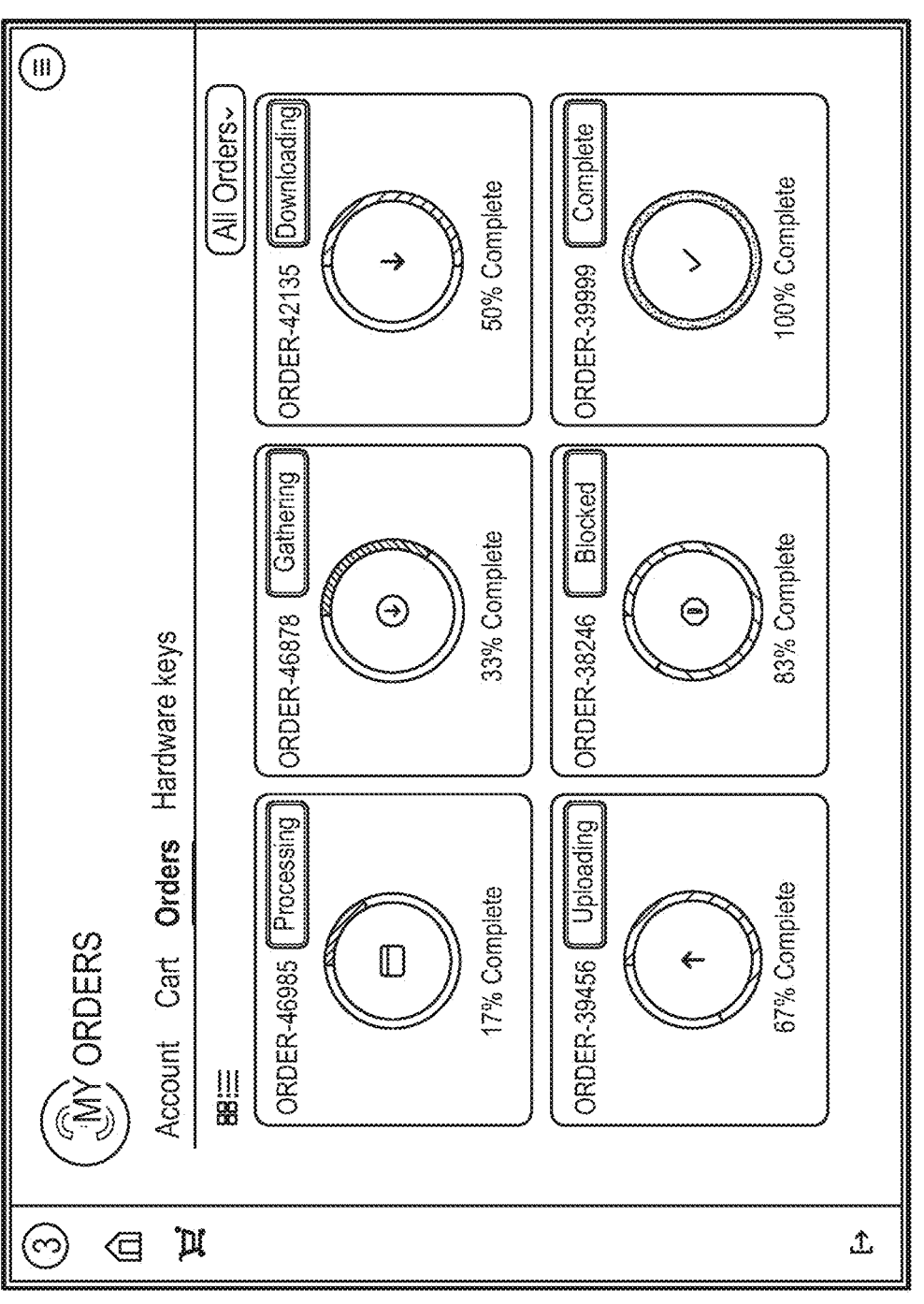
FIG. 80 depicts a graphical interface of C3N Mygrator, according to at least one embodiment of the present disclosure.

5) Monitor progress, as depicted in FIG. 80.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:

determining, by one or more processors of a computer system, a blockchain registration request for a prospective member to join a blockchain network, comprising person identifiable information (PII), payment information, and reference information;

providing by the one or more processors of the system, the payment information to a token exchange;

obtaining, by the one or more processors of the system, control of tokens that can be used on the blockchain network;

determining, by the one or more processors of the system and from the reference information, one or more references and corresponding set of reference contact information;

providing, by the one or more processors of the system, reference requests for the one or more references to vouch for the prospective member via the set of reference contact information;

obtaining, by the one or more processors of the system, one or more confirmations from the one or more references for the prospective member;

confirming, by the one or more processors of the system, contact information with the prospective member;

determining, by the one or more processors of the system and using a one-way function, a PII hash of the PII;

creating, by the one or more processors of the system, a blockchain account for the prospective member, wherein the tokens are deposited to the blockchain account, wherein the prospective member is in possession of a secret access key that is usable to control the blockchain account;

activating, by the one or more processors of the system, a smart contract of the blockchain network to transfer at least a portion of the tokens to another member in exchange for a non-fungible token that represents a ticket;

wherein a video call or video interview is conducted to obtain the PII, and wherein the PII is stored in memory and discarded after the PII hash is determined.

2. The method of claim 1, wherein an identification token and a hash of the secret access key are stored in a reference graph database.

3. The method of claim 1, wherein an initial trust score is calculated for the prospective member based at least in part on the token and trust of the one or more references.

4. A system, comprising:

one or more processors; and memory storing executable instructions that, as a result of execution, cause the system to:

determine a blockchain registration request for a prospective member to join a blockchain network, comprising person identifiable information (PII), payment information, and reference information;

provide the payment information to a token exchange;

obtain control of tokens that can be used on the blockchain network;

determine, and from the reference information, one or more references and corresponding set of reference contact information;

provide reference requests for the one or more references to vouch for the prospective member via the set of reference contact information;

obtain one or more confirmations from the one or more references for the prospective member;

confirm contact information with the prospective member;

determine, using a one-way function, a PII hash of the PII;

create a blockchain account for the prospective member, wherein the tokens are deposited to the blockchain account, wherein the prospective member is in possession of a secret access key that is usable to control the blockchain account;

activate a smart contract of the blockchain network to transfer at least a portion of the tokens to another member in exchange for a non-fungible token that represents a ticket;

wherein a video call or video interview is conducted to obtain the PII, and wherein the PII is stored in memory and discarded after the PII hash is determined.

5. The system of claim 4, wherein an identification token and a hash of the secret access key are stored in a reference graph database.

6. The system of claim 4, wherein an initial trust score is calculated for the prospective member based at least in part on the token and trust of the one or more references.

7. A non-transitory computer readable medium storing executable instructions that, as a result of execution by one or more processors, cause the one or more processors to:

determine a blockchain registration request for a prospective member to join a blockchain network, comprising person identifiable information (PII), payment information, and reference information;

52 provide the payment information to a token exchange;

obtain control of tokens that can be used on the blockchain network;

determine, and from the reference information, one or more references and corresponding set of reference contact information;

provide reference requests for the one or more references to vouch for the prospective member via the set of reference contact information;

obtain one or more confirmations from the one or more references for the prospective member;

confirm contact information with the prospective member;

determine, using a one-way function, a PII hash of the PII;

create a blockchain account for the prospective member, wherein the tokens are deposited to the blockchain account, wherein the prospective member is in possession of a secret access key that is usable to control the blockchain account;

activate a smart contract of the blockchain network to transfer at least a portion of the tokens to another member in exchange for a non-fungible token that represents a ticket, wherein a video call or video interview is conducted to obtain the PII, and wherein the PII is stored in memory and discarded after the PII hash is determined.

8. The non-transitory computer readable medium of claim 7, wherein an identification token and a hash of the secret access key are stored in a reference graph database.

9. The non-transitory computer readable medium of claim 7, wherein an initial trust score is calculated for the prospective member based at least in part on the token and trust of the one or more references.

10. The method of claim 1, wherein the PII hash stored on the blockchain network is smaller in size than the PII itself.

11. The method of claim 1, further comprising:

verifying, by the one or more processors of the system, that the prospective members has not been previously banned from the blockchain network by at least checking whether the PII hash was associated with a prior registration;

wherein the creating of the blockchain account for the prospective member is contingent upon the verifying being successful; and storing, by the one or more processors of the system, the PII hash on the blockchain network, wherein the PII itself is not stored in encrypted or plaintext form on the blockchain network.

12. The method of claim 1, wherein the PII is discarded prior to the creating of the blockchain account for the prospective member.

* * * * *